(12) United States Patent  
Grinstein

(10) Patent No.: US 8,997,246 B2  
(45) Date of Patent: *Mar. 31, 2015

(54) SYSTEM AND/OR METHOD FOR AUTHENTICATION AND/OR AUTHORIZATION VIA A NETWORK

(75) Inventor: Doron Grinstein, Valley Village, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1701 days.

This patent is subject to a terminal disclaimer.

(21) Appl. No.: 11/243,817

(22) Filed: Oct. 4, 2005

(65) Prior Publication Data

US 2007/0079369 A1  Apr. 5, 2007

(51) Int. Cl.
*H04L 29/06* (2006.01)
*G06F 15/16* (2006.01)
*G06F 21/31* (2013.01)
*G06F 21/62* (2013.01)

(52) U.S. Cl.
CPC .............. *G06F 21/31* (2013.01); *G06F 21/629* (2013.01)
USPC ..................................... 726/27; 726/4; 726/7

(58) Field of Classification Search
None
See application file for complete search history.

(56) References Cited

U.S. PATENT DOCUMENTS

| | | | |
|---|---|---|---|
| 5,638,513 A * | 6/1997 | Ananda ............................. | 726/5 |
| 5,991,877 A | 11/1999 | Luckenbaugh | |
| 6,014,666 A | 1/2000 | Helland et al. | |
| 6,056,786 A * | 5/2000 | Rivera et al. ................... | 717/168 |
| 6,158,010 A | 12/2000 | Moriconi et al. | |
| 6,487,646 B1 | 11/2002 | Adams et al. | |
| 6,502,193 B1 * | 12/2002 | Barber .............. | 726/4 |
| 6,598,167 B2 * | 7/2003 | Devine et al. ..... | 726/8 |
| 6,621,505 B1 | 9/2003 | Beauchamp et al. | |
| 6,671,813 B2 * | 12/2003 | Ananda ............. | 726/3 |
| 6,754,658 B1 * | 6/2004 | Matsuno .......... | 707/9 |
| 6,766,458 B1 | 7/2004 | Harris et al. | |
| 6,785,825 B2 * | 8/2004 | Colvin ............. | 726/28 |
| 6,920,455 B1 | 7/2005 | Weschler | |
| 6,961,712 B1 * | 11/2005 | Perkowski ....... | 705/27 |
| 7,483,988 B2 * | 1/2009 | Ono ................. | 709/227 |
| 7,515,873 B2 * | 4/2009 | Brown et al. ............... | 455/3.01 |
| 7,519,322 B2 * | 4/2009 | Brown et al. ............... | 455/3.01 |
| 7,647,625 B2 * | 1/2010 | Grinstein ........... | 726/4 |
| 7,668,316 B2 * | 2/2010 | Choi et al. ........ | 380/277 |
| 8,166,404 B2 * | 4/2012 | Grinstein ......... | 715/735 |
| 8,271,350 B2 * | 9/2012 | Lao et al. ........ | 705/26.41 |
| 8,363,716 B2 * | 1/2013 | Kalva et al. ....... | 375/240.01 |
| 8,595,703 B2 * | 11/2013 | Van Gogh et al. ............ | 717/126 |
| 2003/0154232 A1 | 8/2003 | Beringer et al. | |
| 2003/0187821 A1 | 10/2003 | Cotton et al. | |
| 2004/0049702 A1 | 3/2004 | Subramaniam et al. | |
| 2004/0110119 A1 | 6/2004 | Riconda et al. | |
| 2005/0027995 A1 | 2/2005 | Menschik et al. | |
| 2005/0044165 A1 | 2/2005 | O'Farrell et al. | |

(Continued)

OTHER PUBLICATIONS

Office action in co-pending U.S. Appl. No. 11/243,828, mailed Jun. 26, 2008, 11 pages.

(Continued)

*Primary Examiner* — Christopher Revak
(74) *Attorney, Agent, or Firm* — Patent Ingenuity, P.C.; Samuel K. Simpson

(57) ABSTRACT

The subject matter disclosed herein relates to authenticating an identity of users desiring access to an application program and determining whether an authenticated user is authorized to access one or more aspects of the application program.

68 Claims, 39 Drawing Sheets

(56) References Cited

U.S. PATENT DOCUMENTS

| | | | |
|---|---|---|---|
| 2005/0091276 A1 | 4/2005 | Brunswig et al. | |
| 2005/0132220 A1 | 6/2005 | Chang et al. | |
| 2006/0122946 A1* | 6/2006 | Fahrny et al. | 705/71 |
| 2006/0173869 A1 | 8/2006 | Byrne et al. | |
| 2007/0079357 A1* | 4/2007 | Grinstein | 726/2 |
| 2007/0245409 A1* | 10/2007 | Harris et al. | 726/5 |
| 2008/0091462 A1* | 4/2008 | Lao et al. | 705/1 |
| 2012/0117612 A1* | 5/2012 | Grinstein | 726/1 |
| 2014/0053227 A1* | 2/2014 | Ruppin et al. | 726/1 |
| 2014/0123296 A1* | 5/2014 | Subramanian et al. | 726/26 |

OTHER PUBLICATIONS

Response in co-pending U.S. Appl. No. 11/243,828, filed Sep. 26, 2008, 16 pages.
Final Office action in co-pending U.S. Appl. No. 11/243,828, mailed Dec. 23, 2008, 11 pages.
Response After Final in co-pending U.S. Appl. No. 11/243,828, filed Feb. 6, 2009, 19 pages.
Advisory Action in co-pending U.S. Appl. No. 11/243,828, mailed Feb. 13, 2009, 4 pages.
International Search Report and Written Opinion in co-pending application PCT/IB06/53586, mailed Oct. 31, 2008, 12 pages.
International Search Report and Written Opinion in co-pending application PCT/IB06/53591, mailed Sep. 12, 2008, 12 pages.
International Search Report and Written Opinion in co-pending application PCT/IB06/53626, mailed Jun. 18, 2008, 11 pages.
International Search Report and Written Opinion in co-pending application PCT/IB06/53624, mailed Jun. 20, 2008, 8 pages.
Request for Continued Examination and Response filed Apr. 23, 2009 in co-pending U.S. Appl. No. 11/243,828, 21 pages.
Office action mailed May 21, 2008 in co-pending U.S. Appl. No. 11/243,795, 15 pages.
Response filed Aug. 21, 2008 in co-pending U.S. Appl. No. 11/243,795, 17 pages.
Final Office action mailed Nov. 17, 2008 in co-pending U.S. Appl. No. 11/243,795, 10 pages.
Amendment After Final filed Jan. 21, 2009 in co-pending U.S. Appl. No. 11/243,795, 16 pages.
Advisory action mailed Jan. 29, 2009 in co-pending U.S. Appl. No. 11/243,795, 3 Pages.
Terminal Disclaimer and Supplemental Response After Final filed Feb. 5, 2009 in co-pending Patent U.S. Appl. No. 11/243,795, 4 pages.
U.S. Appl. No. 11/243,828, filed Oct. 4, 2005, Grinstein.
U.S. Appl. No. 11/243,816, filed Oct. 4, 2005, Grinstein.
U.S. Appl. No. 11/243,795, filed Oct. 4, 2005, Grinstein.
Microsoft, Federated Identity Management Interoperability, WS-Federation Passive Requestor Profile Interoperability Workshop, May 2004.
Eugene Kuznetsov, Federated identity management and Web services, ZDNet News, Jan. 13, 2005.
Oracle, Deploying Oracle Identity Management With Multi-Master Replication, Oracle Application Server Release, Apr. 2005, pp. 2-34, Oracle, Redwood Shores, CA.
Microsoft, Microsoft Identity and Access Management Series, release 1.1, 2004, pp. 3-19, Microsoft Corporation.
Microsoft, Microsoft Identity and Access Management Series, Fundamental Concepts paper, release 1.0, 2004, pp. 7-78, Microsoft Corporation.
Sun Microsystems, The Business Case for Identity Management, A Business White Paper, Sep. 2004, pp. 1-12, Sun Microsystems.
Michael Mesaros, Richard Strohm, Oracle Identity Management Concepts and Architecture, Dec. 2003, pp. 3-13, Oracle, Redwood Shores, CA.
Michael Mesaros, Uppili Srinivasan, Introduction to Oracle Identity Management, Dec. 2003, pp. 2-6, Oracle, Redwood Shores, CA.
Oracle, Oracle Identity Management Feature Overview, Nov. 2003, Oracle, Redwood Shores, CA.
Anne Cheney, White Paper—eTrust Identity and Access Management Suite, Feb. 2004, pp. 2-17, Computer Associates International, Inc., CA.
Sun Microsystems, Identity Grid, A Business White Paper, May 2004, pp. 3-10.
Sun Microsystems, Identity Federation: Transcending the Boundaries of Business for Secure Collaboration, White Paper, Mar. 2005, pp. 1-12.
Michael P. Mesaros, Oracle Identity Management: Integration with Windows, Dec. 2004, pp. 3-10, Oracle, Redwood Shores, CA.
N.N. Vuong, G.S. Smith, Y. Deng, Managing Security Policies in a Distributes Environment Using eXtensible Markup Language (XML), pp. 405-411, ACM 2001.
B.C. Neuman, Proxy-based Auth. and Accounting for Distributed Systems, Proc. of the 13th Int. Conf. on Distributed Computing Systems, May 1993, pp. 283-291, Pittsburgh.
K. Beznosov, Object Security Attributes: Enabling Application-specific Access Control in Middleware, Quadrasis, Hitachi computer Products, Waltham MA.
T.Y.C. Woo, S.S. Lam, Designing a Distributed Authorization Service, 1998 IEEE, pp. 419-429.
V. Varadharajan, C. Crall, J. Pato, Authorization in Enterprise-wide Distribution System—A Practical Design and Application.
BEA Systems, BEA Fills the Gap in Application Security with BEA WebLogic Enterprise Security, Press Release, Oct. 2003.
BEA Systems, BEA AquaLogic Product Family, BEA White Paper, Jun. 2005, pp. 5-20, San Jose, California.
Notice of Allowance mailed May 7, 2009 in co-pending U.S. Appl. No. 11/243,795, 8 pages.
Issue Fee filed Jun. 18, 2009 in co-pending U.S. Appl. No. 11/243,795, 3 pages.
Final Office Action mailed Jun. 11, 2010, U.S. Appl. No. 11/243,828, 10 pages.
Response to Final Office Action filed Jul. 13, 2010, 31 pages.
Advisory Action mailed Aug. 3, 2010, 3 pages.
Final Office Action mailed May 18, 2010, U.S. Appl. No. 11/243,816, 18 pages.
Response to Final Office Action filed Jul. 19, 2010, U.S. Appl. No. 11/243,816, 28 pages.
Advisory Action mailed Aug. 5, 2010, U.S. Appl. No. 11/243,816, 5 pages.
Applicant Initiated Interview Request Form mailed Oct. 12, 2010 for U.S. Appl. No. 11/243,828, 1 page.
Request for Continued Examination mailed Oct. 12, 2010 for U.S. Appl. No. 11/243,828, 2 pages.
Notice of Appeal mailed Aug. 18, 2010 for U.S. Appl. No. 11/243,816, 1 page.
Non-Final Office Action mailed Feb. 4, 2011 for U.S. Appl. No. 11/243,828, 8 pages.
Appeal Brief mailed Jan. 18, 2011 for U.S. Appl. No. 11/243,816, 104 pages.

* cited by examiner

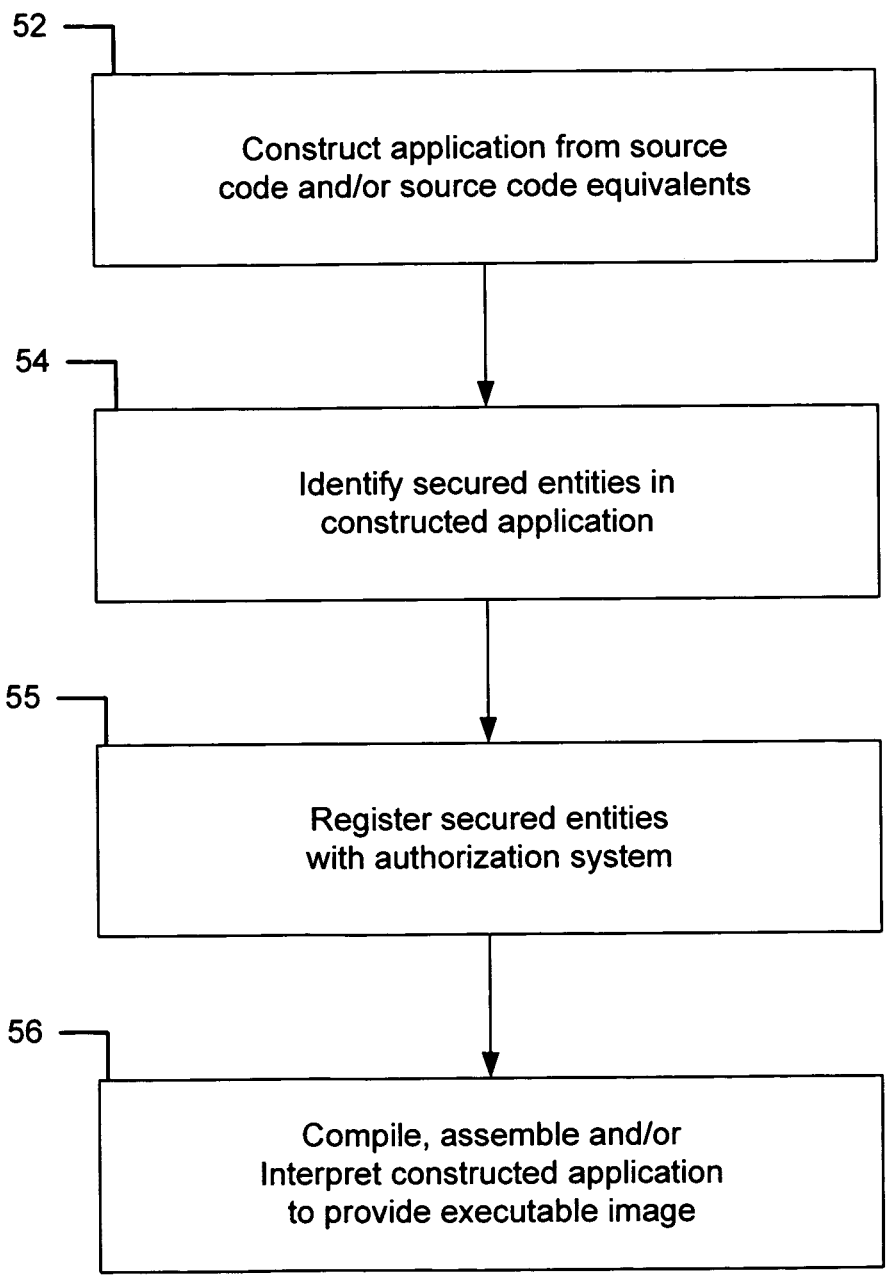

SYSTEM AND/OR METHOD FOR AUTHENTICATION AND/OR AUTHORIZATION VIA A NETWORK

BACKGROUND

1. Field

The subject matter disclosed herein relates to secure information systems.

2. Information

Enterprise data networks typically serve individual users working in different functions of an enterprise. Accordingly, information technology in the enterprise typically hosts a diverse set of applications including, for example, electronic mail, accounting, payroll, customer service and/or the like. To provide application security, access to enterprise applications typically requires some form of authentication of the user such as, for example, determining that the user is a member of the enterprise, and authorization of the user such as by determining that the user is associated with a particular group. Through such authorization, accordingly, the user may gain access to particular computing resources that may be otherwise unavailable to unauthorized users.

BRIEF DESCRIPTION OF THE FIGURES

Non-limiting and non-exhaustive embodiments will be described with reference to the following figures, wherein like reference numerals refer to like parts throughout the various figures unless otherwise specified.

FIG. 1B is a flow diagram illustrating a process embodiment for integrating an application according to an embodiment.

FIG. 19 is a GUI screen shot illustrating roles associated with a user according to an embodiment.

FIGS. 30 and 31 are GUI screen shots illustrating an association of attributes with a user and/or role according to an embodiment.

DETAILED DESCRIPTION

Figure 1A:
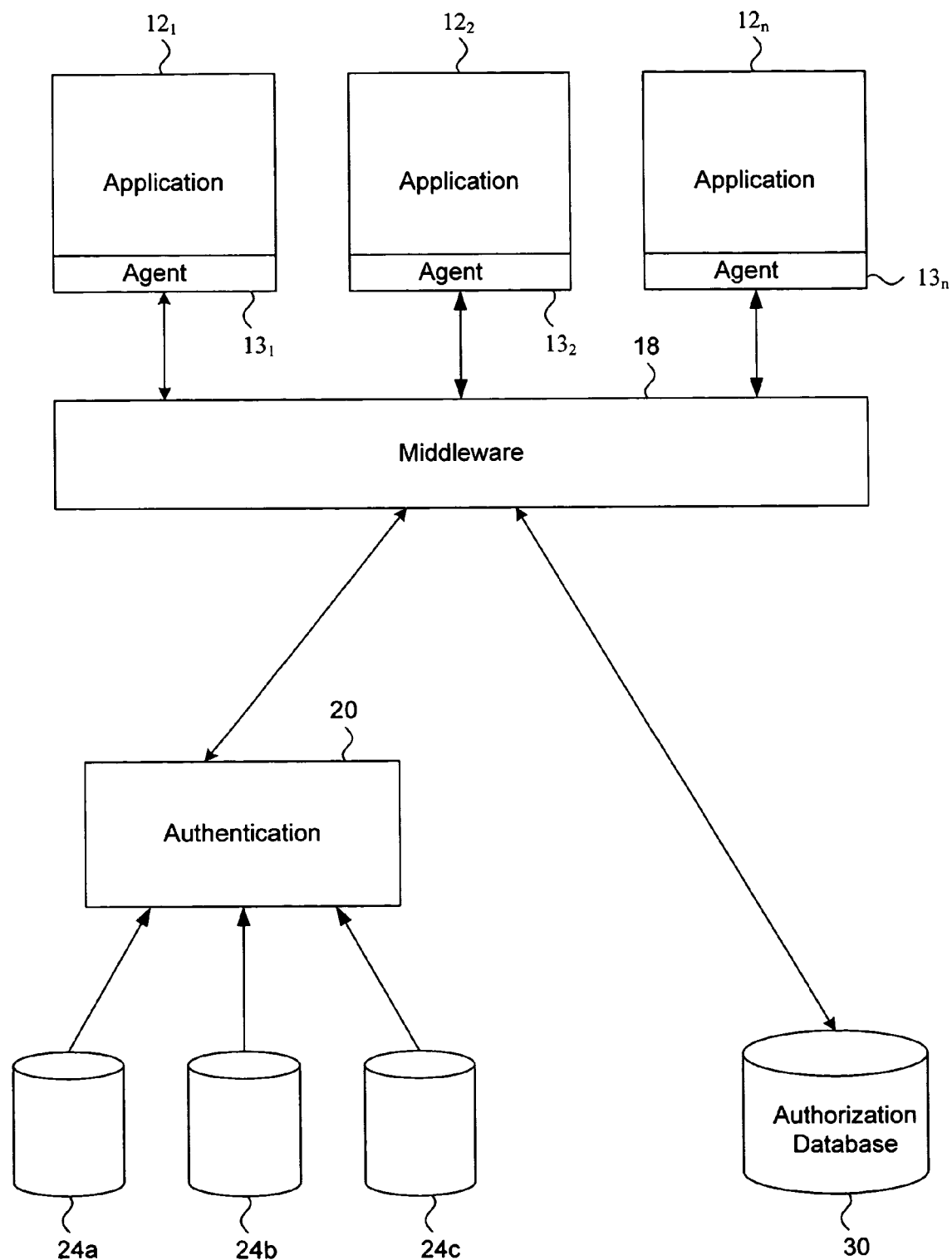
FIG. 1A is a schematic diagram of a system to authenticate and/or authorize a user for accessing one or more of a plurality of applications according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a storage medium in combination with processing circuitry to execute such machine-readable instructions. However, these are merely examples of structures which may provide logic and claimed subject matter is not limited in this respect.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "determining" and/or the like refer to the actions and/or processes that may be performed by a computing platform, such as a computer or a similar electronic-computing device, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, process described herein, with reference to flow diagrams or otherwise, may also be executed and/or controlled, in whole or in part, by such a computing platform.

In one embodiment, a computing platform may comprise one or more "communication adapters" to enable communication between processes executing on the computing platform and a network. Such a communication adapter may comprise a device capable of transmitting information to and/or receiving information from a communication channel and/or data link. In one particular embodiment, for example, a communication adapter may be capable of transmitting information to and/or receiving information from a data transmission medium according to a predefined communication protocol. However, this is merely an example of a communication adapter and claimed subject matter is not limited in this respect.

A "computer program" has referred to herein relates to an organized list of instructions that, when executed, causes a computer and/or machine to behave in a predetermined manner. Here, for example, a computer program may comprise machine-readable instructions that are executable to perform one or more desired tasks. In one particular embodiment, although claimed subject matter is not limited in these respects, a computer program may define inputs and outputs such that execution of the program may provide outputs based, at least in part, on the inputs. However, these are merely examples of a computer program and claimed subject matter is not limited in these respects.

According to an embodiment, a computer program may comprise one or more "software components" comprising instructions that are executable as an integrated part of the computer program. Here, for example, computer program may comprise multiple software components that are individually created to perform associated functions of the computer program. The different components may then be integrated together to provide a functioning computer program. However, these are merely examples of a computer program and claimed subject matter is not limited in these respects.

An "application" as referred to herein relates to a computer program or group of computer programs capable of providing a desired result and/or action. In a particular embodiment, for example, such an application may comprise one or more computer programs that perform tasks in support of an enterprise. For example, although claimed subject matter is not limited in these respects, an application may comprise one or more end-user computer programs such as database programs, spreadsheets, word processors, computer programs that are accessible through a network browser, electronic mail, interactive games, video and/or image processing programs, calendars, financial application software, inventory control systems and/or the like. However, these are merely examples of an application and claimed subject matter is not limited in these respects.

A "Web application" as referred to herein relates to an application comprising multiple software components that communicate with one another over an Internet Protocol (IP) infrastructure. In one particular embodiment, although claimed subject matter is not limited in these respects, software components of a Web application may transmit documents among one another over an IP infrastructure in any one of several standard formats including, for example, any one of several markup languages. However, this is merely an example of a Web application and claimed subject matter is not limited in these respects.

A "user" as referred to herein relates to an individual and/or entity comprising an identity and is capable of receiving and/or employing a resource from an application. In one particular embodiment, although claimed subject matter is not limited in this respect, a user may comprise an individual in an organization and/or enterprise that is capable of interacting with applications hosted by information services provided to individuals in the organization and/or enterprise. In an alternative embodiment, a user may comprise a system, organization, application and/or other type of entity capable of interacting with such applications. However, these are merely examples of a user and claimed subject matter is not limited in this respect.

According to an embodiment, a user may "access" an application and/or a portion thereof by interacting with the application in some manner. Here, for example, a user may access an application and/or a portion thereof by executing the application and/or portion thereof, providing inputs to the application and/or receiving outputs from the application and/or portion thereof. However, these are merely examples of how a user may access an application and/or portion thereof, and claimed subject matter is not limited in these respects.

"Authentication" as referred to herein relates to a process of verifying an identity of an individual and/or entity. Such an identity may be authenticated using any one of several methods such as, for example, comparing an individual's physical appearance with a government issued picture identification document, comparing a username and password entered in a computer system to pre-stored information, comparing provided information with unique known identification information, comparing information from a portable electronic device to a known sequence of numbers, and/or comparing a biometric specimen and/or sample with a biometric signature. However, these are merely examples of methods that may be used for authentication and claimed subject matter is not limited in these respects.

While authentication may verify an identity of an individual and/or entity, such authentication may not necessarily, by itself, determine whether the individual and/or entity should have access to a resource. "Authorization" as referred to herein relates to a process of granting and/or denying an entity's and/or individual's access to a resource. In one particular embodiment, although claimed subject matter is not limited in this respect, an authorization process may determine whether an entity and/or individual should have access to an application and/or portion thereof according to a predetermined policy. However, this is merely an authorization process and claimed subject matter is not limited in these respects.

"Metadata" as referred to herein relates to information descriptive and/or characteristic of the content, quality, condition, availability, location and other characteristics of information. In one particular example, although claimed subject matter is not limited in this respect, metadata may comprise information descriptive of a data object which may potentially be accessed by a user without the user having full advanced knowledge of existence and characteristics of the data object. In another example, metadata may describe how and when and by whom a particular set of data was collected, and/or how the collected data is formatted. However, these are merely examples of metadata and claimed subject matter is not limited in these respects.

"Security metadata" as referred to herein relates to information and/or data that is representative of and/or derived from one or more security policies associated with an organization and/or enterprise. In one particular embodiment, although claimed subject matter is not limited in these respects, security metadata may comprise "application security metadata" which relates to information representative of and/or derived from one or more security policies governing access by one or more users to one or more applications and/or portions thereof. Here, for example, application security metadata may comprise information to determine whether a particular user or users of a particular characteristic should have access to an application and/or portion thereof. However, these are merely examples of security metadata and application security metadata, and claimed subject matter is not limited in these respects.

A "security metadata request" as referred to herein relates to requests for obtaining security metadata. In one particular example, a security metadata request may be provided in response to an attempt to access a resource where access to the resource is controlled according to a security policy. However, this is merely an example of a security metadata request and claimed subject matter is not limited in these respects.

"Authentication metadata" as referred to herein relates to information that descriptive of and/or characterized by identities of individuals or other entities. In a particular example, although claimed subject matter is not limited in this respect, authentication metadata may comprise predetermined information for use in connection with an authentication process. In particular embodiments, for example, such authentication metadata may comprise a photograph identification document, pre-stored usernames and/or passwords, biometric signatures and/or the like. However, these are merely examples of authentication metadata and claimed subject matter is not limited in these respects.

"Authorization metadata" as referred to herein relates to information that is descriptive of and/or characterized by one or more policies to grant and/or deny one or more individuals access to one or more resources. Here, for example, authorization metadata may comprise information that may be used by an authorization process to determine whether a particular entity and/or individual should access one or more aspects of an application and/or portion thereof according to a policy. However, this is merely an example of authorization metadata and claimed subject matter is not limited in this respect.

According to an embodiment, an application developer may write lines of an application in "source code" using any one of several programming languages such as, for example, C, C++, C#, Pascal, Java, FORTRAN and/or the like. An application written by a developer in source code may then be compiled, assembled and/or interpreted to provide an executable image comprising instructions that may be installed and/or executed in a computing platform. However, this is merely an example of how source code may be processed to provide an image that may be installed and/or executed on a computing platform and claimed subject matter is not limited in these respects. To make modification to such an installed executable image for an application, a developer may modify the original source code used to make the installed executable image and then compiles, assembles and/or interprets the modified source code to provide a new executable image.

"Middleware" as referred to herein relates to software capable of connecting two otherwise separate computer programs. In a particular embodiment, for example, middleware may comprise one or more software components enabling a database system to communicate with Web service. Also, for example, middleware may pass data between an application and one or more other computer programs according to a predetermined format such as, for example, by exposing a web service or other consumable predefined protocol as a service. Here, in a particular embodiment, such middleware may enable modification of one or more other computer programs communicating with an application without modification of the application. However, these are merely examples of middleware and claimed subject matter is not limited in these respects.

A "Web service" as referred to here relates to a method of integrating applications using an Internet protocol (IP) infrastructure. In particular examples of a Web service, although claimed subject matter is not limited in these respects, standard protocols may be employed to transmit data objects among components over an Internet protocol such as, for example, HTTP, HTTPS, XML, SOAP, WSDL and/or UDDI standards. Here, XML may be used to tag data objects, SOAP may be used to transfer data objects, WSDL may be used to describe available services and UDDI may be used to list available services. However, these are merely examples of protocols that may enable a Web service and claimed subject matter is not limited in these respects. In one particular embodiment, although claimed subject matter is not limited in these respects, a Web service may allow independently created and implemented applications from different network sources to communicate with one another. In another example, a Web service may comprise a "remote service" that is capable of communicating with one or more components of an application over a data link. It should be understood, however, that these are merely examples of a Web service and that claimed subject matter is not limited in these respects.

An "agent" as referred to herein relates to a process that executes on a first device and is capable of communicating with a second device over a network or independently of a network. In one particular embodiment, for example, an agent process may collect information associated with the first device, a user of the device and/or program(s), and enable transmission of the collected information to the second device. In another embodiment, an agent may receive control signals from the second device to take some action in connection with the first device. However, these are merely examples of how an agent may enable communication between devices and the claimed subject matter is not limited in these respects.

FIG. 1A is a system 10 to authenticate and/or authorize a user as a precondition for accessing one or more of a plurality of applications 12 and/or portions thereof according to an embodiment. Applications 12 may be hosted on one or more computing platforms such as, for example, one or more application servers and/or devices (not shown) for access by users in an enterprise computing and/or data network. Such applications may include, for example, any of the aforementioned applications. Again, however, these are merely examples of applications that may be hosted on an enterprise network and claimed subject matter is not limited in these respects. Prior to enabling a user to access an application 12 and/or portion thereof, the application 12 and/or portion thereof may first require authentication of the user by, for example, verifying the user's identity. Here, such authentication may entail a prompt of a user to provide information and/or other evidence to authenticate the user's identity such as, for example, a password, a biometric signature and/or the like. However, these are merely examples of information that may be used to authenticate a user and claimed subject matter is not limited in these respects.

In addition to requiring authentication of its identity prior to accessing an application 12 and/or portion thereof, an application may also require authorization of the authenticated entity or user prior to accessing one or more aspects of the application 12. Here, depending on an identity of the user for example, a user may be authorized to initiate and/or perform one or more functions and/or operations in connection with the application 12 but may be unauthorized to initiate and/or perform one or more other functions and/or operations in connection with the application. In one example, an application 12 may be capable of displaying a document to a user. Based, at least in part, on the user's identity, a user may have authorization to view the document but not have authorization to edit the document. Such authorization to edit the document may be reserved for other users. However, this is merely one particular example of a function and/or operation of an application that may be accessible by a user and claimed subject matter is not limited in these respects.

According to an embodiment, a "security metadata service" may enable applications 12 to perform an authentication process and/or authorization process in response to requests to access applications 12 and/or portions thereon (e.g., data and/or functionality within applications). In one particular example, although claimed subject matter is not limited in this respect, such a security metadata service may provide an application 12 with authentication and/or authorization metadata in response to attempt to access the application 12, and a subsequent request by the application 12 for the metadata. Here, such a security metadata service may comprise instances of an agent 13 hosted with applications 12 on related computing platforms to process security metadata requests from applications 12. However, this is merely an example of one aspect of a security metadata service according to a particular embodiment and claimed subject matter is not limited in this respect.

According to an embodiment, in response to a request to access an application 12 and/or portion thereof by a user (for example, by selecting an icon of a desktop graphical user interface (GUI) according to a particular example embodiment), the application 12 and/or related instance of agent 13 may request middleware 18 to authenticate the requesting user. Here, for example, middleware 18 may request an authentication server 20 to authenticate the user. In response to such a request, authentication server 20 may query one or more authentication sources 24 for information indicating the identity of the user. In one embodiment, authentication sources may comprise any one of several commercially available authentication services such as Siteminder from Netegrity Inc. and/or Active Directory from Microsoft Inc. In other embodiments, authentication sources may comprise databases storing biometric signatures, smartcard data and/or the like. However, these are merely examples of authentication sources comprising information that may be used to verify an identity of a user and claimed subject matter is not limited in these respects.

Based, at least in part, on information from authentication sources and in response to the authentication request from middleware 18, authentication server 20 may determine whether or not a user can be authenticated successfully. Upon authenticating a user, authentication server 20 may transmit a true response of this authentication of the user back to middleware 18.

In addition to receiving a valid and/or true response to an authentication request, middleware 18 may query authorization database 30 to obtain authorization metadata associated with the authenticated user and information about the requested application 12 and/or portion thereof. In an alternative embodiment, although claimed subject matter is not limited in this respect, middleware 18 may query authorization database 30 through an authorization server (not shown) by transmitting one or more messages to the authorization server. The authorization server may then transmit authorization metadata to middleware 18 based, at least in part, on responses to queries to authorization database 30. According to a particular embodiment, although claimed subject matter is not limited in this respect, this message from middleware 18 may comprise information identifying a user requesting access to an application and information identifying an application to which access is sought. Accordingly, middleware 18 may query authorization database 30 to obtain authorization metadata based, at least in part, on an authenticated identity of the user and an application and/or portion thereof to which access is requested. Here, a response to such a query may comprise authorization metadata indicating an extent (e.g., an extent of rights and/or privileges) to which a user is authorized to access an application and/or portion thereof to which authorization is requested. Accordingly, middleware 18 may provide an authorization assertion comprising authorization metadata to a requesting application 12 and/or corresponding instance of agent 13, enabling the user to access the requesting application 12 and exercise one or more functional abilities based, at least in part, on the authorization metadata.

According to an embodiment, authorization database 30 may store authorization metadata for a plurality of applications 12. Accordingly, requests for authorization metadata from middleware 18 may specify a requesting user and a particular application 12 and/or portion thereof to which authorization for access is requested. Middleware 18 may then query authorization database 30 for authorization data based, at least in part, on information associated with a user and information representative of a particular application 12 to which authorization for access is requested.

According to an embodiment, applications 12 may be compiled, assembled and/or interpreted from source code to provide an executable image for installation on one or more computing platforms (not shown) independently of middleware 18. Installed applications 12 may then be linked with instances of agent 13 and/or middleware 18 at runtime. In one embodiment, for example, middleware 18 may be hosted on a computing platform (not shown) that is separate from an application 12 and/or application servers hosting applications 12 and/or instances of agent 13. Here, such an application 12 and/or application servers and a server hosting middleware 18 may communicate through a Web service over data links according to any one of several communication protocols such as, for example, SOAP/XML/HTTP/HTTPS and/or the like. However, these are merely examples of communication protocols that are capable of integrating applications using a Web service and claimed subject matter is not limited in these respects. In alternative embodiments, middleware 18 may be compiled separately from applications 12 as illustrated above but co-hosted with one or more of applications 12 on an application server. Accordingly, in particular embodiments, an application 12 may also communicate with middleware 18 via an operating system of a server hosting both the application 12 and middleware 18. Again, however, this is merely an example of how a separately compiled application and middleware may communicate with one another, and claimed subject matter is not limited in these respects.

According to an embodiment, middleware 18 may comprise a common interface with applications 12 and/or instances of agent 13 that enables applications 12 to provide requests for authentication and/or authorization according to a common format irrespective of particular applications 12. Here, for example, middleware 18 may receive information from applications 12 and/or instances of agent 13 to authenticate a user, such as a user ID and password in a particular embodiment, in a format that is common across all applications 12. Similarly, middleware 18 may transmit assertions of authentication and/or authorization to applications 12 in a format that is common across all applications 12. This enables a decoupling of the process of authentication and/or authorization from applications 12. Here, the processes of authentication and/or authorization may be performed by authentication server 20 and middleware 18, independently of particular applications 12. As illustrated below in connection with specific embodiments, modifications to authentication and/or authorization policies may be affected by modifying contents of authentication sources 24 and/or authorization database 30, and without changes to source code of particular applications 12.

According to an embodiment, although claimed subject matter is not limited in this respect, in addition to, or as part of an authentication assertion in response to an authentication request, authentication server 20 may also provide middleware 18 a unique session identifier (USID) associated with the authenticated user. In formulating a query to authorization database 30 for authorization metadata, middleware 18 may present a USID and information representative of particular application(s) to which authorization is being requested.

In one particular embodiment, although claimed subject matter is not limited in this respect, a "session" may commence upon issuance of a USID at authentication and may expire following a predetermined period. While a USID may be created in response to an attempt to access an initial application 12, a USID may be re-used for subsequent attempts to access the same and/or other applications 12 and/or portions thereof during a session. Here, a record of authenticated users and their respective USIDs during a session may be maintained. If an authenticated user attempts to access another subsequent, different application 12, middleware 18 need not request an additional authentication of the authenticated user from authentication server 20. Middleware 18 may query authorization database 30 for authorization metadata based, at least in part, information representative of a particular subsequent application to which authorization is being requested and a USID obtained in response to an attempt to access a previous application.

According to an embodiment, an application 12 may comprise one or more "secured entities" comprising one or more objects to which access may be controlled according to an authorization policy. Such secured entities may include, for example, documents, data, user interface items (e.g., input and/or display portions of a GUI) and/or the like. However, these are merely examples of secured entities that may be associated with an application and claimed subject matter is not limited in these respects. In one embodiment, although claimed subject matter is not limited in this respect, information representative of secured entities associated with an application may be stored with and/or expressed in authorization metadata stored in authorization database 30.

According to an embodiment, authorization metadata stored in database 30 may associate one or more secured entities of an application with one or more "functional abilities" or "functions" defining one or more operations and/or actions in connection with the one or more secured entities. If authorized for a particular functional ability, a user may perform the functional ability associated with the one or more secured entities of the application. In one particular embodiment, although claimed subject matter is not limited in this respect, a secured entity of an application may comprise a document that is associated with functional abilities. Here, such functional abilities may comprise, for example, an ability to read and/or view the document on a display, print the document and/or edit the document. In particular embodiments, a functional ability may, although not necessarily, represent a permitted action in connection with one or more associated secured entities. While authorization metadata may authorize a user to read and/or view the document on a display, a user may not necessarily have authorization to edit and/or print the document. However, these are merely examples of functional abilities associated with a secured entity of an application to which a user may or may not be authorized to perform, and claimed subject matter is not limited in these respects.

According to an embodiment, access to one or more resources may be governed by one or more "security business rules." Such security business rules may be based, at least in part, on a security policy governing an enterprise and/or organization. In one particular embodiment, although claimed subject matter is not limited in this respect, one or more security business rules may determine which individuals in an organization and/or enterprise have authority to view and/or obtain certain information maintained by the organization and/or enterprise. In another particular embodiment, one or more security business rules may determine which individuals in an organization and/or enterprise have authority to modify certain information maintained by the organization and/or enterprise. In yet another particular embodiment, one or more security business rules may determine which individuals in an organization and/or enterprise have authority to access an application. However, these are merely examples of security business rules and claimed subject matter is not limited in these respects.

According to an embodiment, authorization metadata associated with an enterprise and/or organization may define one or more "roles" with which an authenticated user may be associated. In a particular embodiment, although claimed subject matter is not limited in these respects, such roles may be based, at least in part, on one or more security business rules governing an organization and/or enterprise. Here, authorization metadata may associate a role with one or more functional abilities of an application. A user identified as having a particular role associated with the application may be authorized to perform functional abilities associated with the role. In one particular example, although claimed subject matter is not limited in this respect, authorization metadata may define an "auditor" role and a "controller" role associated with an accounting application where a balance sheet is defined as a secured entity. Here, a user identified as a controller may have the functional abilities to view and/or print the balance sheet and to enter debits and/or credits to the balance sheet. A user identified as an auditor, on the other hand, may have the functional ability to view and/or print the balance sheet, but not to record debits and/or credits to the balance sheet. It should be understood, however, that these are merely examples of roles that may be associated with an application and that claimed subject matter is not limited in these respects.

According to an embodiment, although claimed subject matter is not limited in this respect, a role may be "application agnostic" by being defined independently of any particular single application. For example, two or more applications may independently associate functional abilities with the same role. Continuing with the example illustrated above, a role of "controller" may be associated with one or more functional abilities of an accounting application such as entering debits and/or credits. A different application, such as an application for maintaining information to be reported to the Security and Exchange Commission, for example, may also associate one or more functional abilities with a user having a role as "controller" including, for example, editing documents to be filed with government entities. However, this is merely a particular example of how a role may be "application agnostic" and claimed subject matter is not limited in this respect.

With roles in authorization database 30 defined independently of particular applications, for example, middleware 18 may provide an "application agnostic metadata service." As illustrated below, middleware 18 may determine a role associated with a user in response to, for example, the user's attempt to access a particular application and/or portion thereof. Any functional abilities defined in connection with the particular application and associated with the user's role may then be granted to the user to enable such access to the particular application and/or portion thereof. However, this is merely an example of an application agnostic metadata service and claimed subject matter is not limited in these respects.

According to an embodiment, a user may be associated with one or more "attributes" irrespective of applications. For example, attributes of a user may comprise personal information such as, for example, social security information, residence address, date of birth, existence of a criminal record, height, weight, ethnicity and/or the like. In another example, attributes of a user may comprise information relating the user with an enterprise such as, for example, employee number, department, start date, years of employment, monthly and/or annual income, management grade level, eligibility for retirement and/or the like. However, these are merely examples of attributes that may be associated with a user and claimed subject matter is not limited in these respects.

According to an embodiment, authorization metadata associated with a user's ability to access an application 12 may be determined, at least in part on attribute data which is representative of one or more attributes associated with the user. In one particular embodiment, although claimed subject matter is not limited in these respects, authentication server 20 may be capable of accessing attributes associated with users by, for example, querying an authentication source 24 or other source of data. For example, middleware 18 may obtain attribute data from authentication server 20, and query authorization database 30 based, at least in part, on the attribute data. Here, middleware 18 may communicate with authentication database using a Web service or other communication means. In response to a query from middleware 18, authorization database 30 may then determine authorization metadata for a user based, at least in part, on the attribute data, and transmit corresponding authorization metadata back to middleware 18. According to an embodiment, authorization database 30 and/or middleware 18 may determine authorization metadata based, at least in part, on one or more user attributes using any one of several techniques such as, for example, a rule-based algorithm. However, these are merely examples of how an authorization metadata for an application may be determined, at least in part on user's attributes and claimed subject matter is not limited in this respect.

According to an embodiment, a user may be associated with one or more "classes" of users that may be defined independently of particular applications. Roles defined (e.g., for a particular enterprise and/or organization) in authorization database 30 may be associated with a particular class of users such that, for example, a member of the particular class of users may be associated with the roles. Here, such a user that is a member of the class of users may then access secured entities of particular applications according to particular roles associated with the class of users. In an alternative embodiment, a user's membership in a class associated with roles of a particular application may exclude the user from having roles. Here, a user's membership in such a class may be used to deny access to secured entities of the particular application as set forth by the roles. However, this is merely an example of how classes of users may be associated with roles of particular applications and claimed subject matter is not limited in this respect.

According to an embodiment, although claimed subject matter is not limited in this respect, a user may be associated with a particular class of users based, at least in part, on attributes associated with the user as illustrated above. For example, a class resolution service may determine a class of a user in response to a query from middleware 18 using, for example, a Web service. Here, middleware 18 may obtain attribute data associated with a user as illustrated above, for example, and then formulate a query to the class resolution service based upon the obtained attribute data. Upon receiving a response from the class resolution service indicating a class associated with the user, middleware 18 may then query authorization database 30 to determine one or more roles associated with the user as illustrated above, for example.

According to an embodiment, although claimed subject matter is not limited in this respect, in response to an attempt to access at least a portion of an application 12 by a user, middleware 18 may obtain authorization metadata from authorization database 30 (e.g., using a Web service or other means as illustrated above) indicating one or more roles associated with the application 12. Middleware 18 may then call a class resolution service to determine whether there exists any classes associated with the roles associated with the application 12, and whether the user is a member of any such class associated with the roles. In addition to passing information identifying roles associated with the application 12, such a call from middleware 18 to a class resolution service may also pass attribute data associated with a user attempting to access application 12 and/or a portion thereof. The class resolution service may then identify any classes associated with roles of application 12 and determine whether the user is a member of any such identified class based, at least in part, on the passed attribute data.

FIG. 1B is a flow diagram illustrating a process embodiment 50 for integrating an application according to an embodiment. According to an embodiment, an application developer may construct an application using a computing platform from source code and/or source code equivalents at block 52. Here, portions of an application may be constructed from any one of several programming languages such as, for example, C, C++, C#, Visual Basic, Java and/or the like. However, these are merely examples of programming languages that may be used for constructing portions of an application from source code and claimed subject matter is not limited in these respects. At block 54, a developer may identify secured entities in a constructed application and register the secured entities with an authorization system at block 55. The developer may then execute a procedure to compile, assemble and/or interpret the application from source code to provide an executable image at block 56.

According to an embodiment, although claimed subject matter is not limited in these respects, an application may be constructed at block 52 to comprise instructions capable of detecting an attempt to access a secured entity of the program. In one embodiment, a secured entity may comprise a button on a GUI and an attempt to access such a secured entity may comprise an attempt to select the button using a pointing device. In another embodiment, a secured entity may comprise a document and an attempt to access such a secured entity may comprise an attempt to print, view or modify the document. In yet another embodiment, a secured entity may comprise a software component (e.g., a function) and an attempt to access such a secured entity may comprise an attempt to execute the software component. However, these are merely examples of secured entities of an application and attempts to access same, and claimed subject matter is not limited in these respects.

According to an embodiment, although claimed subject matter is not limited in this respect, block 55 may comprise providing metadata to an authorization system that is descriptive of secured entities defined in the application constructed at block 52. Such metadata may associate one or more functional abilities with particular secured entities identified at block 54, for example. Upon registration of the application, the authorization system may assign a globally unique system identifier to the registered application that may be used for identifying the application and/or metadata associated with the application for the life of the application.

According to an embodiment, although claimed subject matter is not limited in this respect, an application constructed at block 52 may further comprise instructions to determine whether a user attempting to access a secured entity is authorized to access the secured entity. In one particular embodiment, although claimed subject matter is not limited in these respects, such instructions in the application may determine whether a particular user is authorized based, at least in part, on authorization metadata received from an authorization system. As illustrated below, such authorization metadata received from an authorization system may be based, at least in part, on metadata provided at block 55 as illustrated above.

As illustrated by a particular example below, a secured entity may relate to a software component (e.g., a function) in an application that is created from source code. In this particular example, an administrator may define a secured entity associated with an application and/or portion thereof with a handle and/or identifier "Mickey." Such a secured entity may be defined by an administrator in an authorization database at block 55 independently of application source code by, for example, accessing an authorization database through a Web interface as illustrated below with reference to FIG. 7. Here, the administrator may identify a particular secured entity being created, and one or more secured operations (e.g., read, insert, update, delete, execute and/or the like) associated with the secured entity. The source code provided below illustrates a use of secured entity "Mickey" encoded to determine whether a user has rights to execute a particular portion of a software component for converting temperature from Fahrenheit to Celsius.

```
1.1   public double ConvertFtoC (double f)
1.2   {
1.3      Authorization.Rights [ ] rights =
         {Authorization.Rights.Execute};
1.4      If (agent.HasEntityAccess ("Mickey", rights))
1.5         return (f – 32.0) * (5.0/9.0);
1.6      else
1.7      {
1.8         MessageBox.Show ("You are not allowed");
1.9         Return 0;
1.10     }
1.11  }
```

Line 1.3 may comprise an instantiation of an array of an authorization rights elements to perform one or more particular secured operations associated with a secured entity. Here, "rights" are defined to comprise execution rights. Line 1.4 may comprise a call to an instance of an agent (e.g., an instance of an agent 13, FIG. 1A) to determine whether a user has rights to execute the secured entity "Mickey". Line 1.5 may return a conversion from a temperature "f" in Fahrenheit to Celsius if authorization metadata provided by the instance of the agent in response to the call indicates that the user is authorized to execute "Mickey." Otherwise, line 1.8 may display a message "You are not allowed" if the authorization metadata indicates that the user is not authorized to execute "Mickey."

According to an embodiment, authorization metadata may comprise information descriptive of secured entities of a registered application associated with its globally unique identifier in authorization database 30. As illustrated below, an administrator may access authorization database 30 to define functional abilities of a registered application based, at least in part, on secured entities of the application.

Line 1.4 may call an instance of an agent in response to an attempt to execute secured entity "Mickey" irrespective of a particular user attempting to execute this secured entity to determine whether the user is authorized. Once the secured entity is defined in an authorization database and source code of "Mickey" is compiled, an administrator may continue to define which users are authorized to execute Mickey according to any authorization policy by merely modifying authorization metadata associated with Mickey in an authorization database and without modifying source code of "Mickey."

In the example illustrated above, the source code of Mickey may be compiled and executed as part of an application hosted on a computing platform. Execution and/or runtime behavior of such an application may be affected, altered and/or controlled based, at least in part, on authorization metadata associated with the application and a user attempting to execute Mickey. For example, runtime behavior of such an application may be affected, controlled and/or altered based, at least in part, on a role associated with the user, and functional abilities associated with the role for example, according to authorization metadata. However, as can be observed from the source code of Mickey, such source code is "role agnostic" in that source code, in and of itself, does not represent and/or express any dependencies on any particular role associated with a user. Nevertheless, information provided at line 1.3, including authorization information based at least in part on a role associated with a user, for example, may affect, control and/or alter execution and/or runtime behavior of an application including a compilation of Mickey through a condition at line 1.4. However, this merely an example of how runtime behavior of an application and/or a portion thereof may be affected, controlled and/or altered based, at least in part, on authorization metadata and claimed subject matter is not limited in these respects. Here, accordingly, changes to roles affecting runtime behavior of an application and/or portion thereof may be modified and/or altered without modification of source code of the application.

As pointed out above with reference to FIG. 1A, middleware 18 and/or an instance of agent 13 may re-use a USID generated from an authentication process in response to an attempt to access an initial application for access to a subsequent application. According to an embodiment, middleware 18 and/or an instance of agent 13 may similarly save and/or cache attribute data of a user obtained from authentication server 20 in response to an attempt to access an initial application for authorization of a user to access the same and/or a different application. Here, middleware 18 and/or an instance of agent 13 may save and/or cache USID and/or attribute data in a predetermined memory location of a computing platform, for example, for a predetermined and/or set period. During this set period, the USID and/or attribute data may be re-used for authorization of a user for a subsequent request for accessing an application and/or portion thereof. In a particular embodiment, although claimed subject matter is not limited in this respect, cached information may be flushed from cache following this period and/or in response to other events and/or conditions.

Figure 1C:
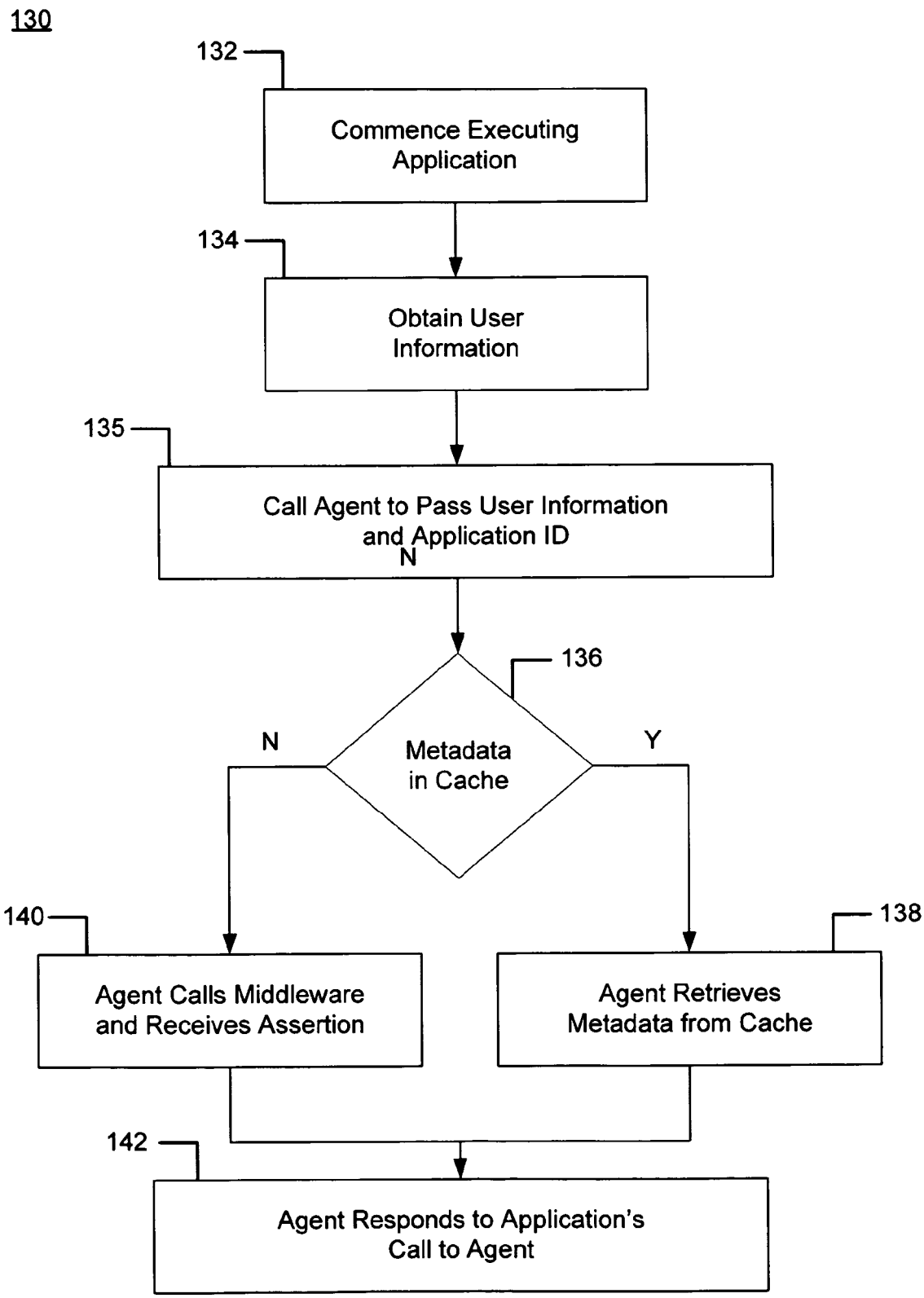
FIG. 1C is a flow diagram illustrating a process embodiment to determine authorization metadata associated with a user according to an embodiment.

FIG. 1C is a flow diagram illustrating a process embodiment 130 to determine authorization metadata associated with a user according to an embodiment. In a particular embodiment, although claimed subject matter is not limited in this respect, all or a portion of process embodiment 130 may be executed and/or performed by an application 12 and/or an instance of agent 13. Execution of an application 12 may commence at block 132 in response to an event such as, for example, a selection from a GUI. However, this is merely an example of an event that may initiate execution of an application and claimed subject matter is not limited in these respects. At block 134, the application may obtain user information which is indicative of a user's identity. In one embodiment, block 134 may prompt a user for user information comprising credentials such as, for example a user ID and password. In other embodiments, block 134 may obtain user information such as biometric information. Again, however, these are merely examples of user information that may be indicative of a user's identity and claimed subject matter is not limited in these respects.

At block 135, an application 12 may call an instance of an agent 13 to pass user information obtained at block 134 and an application ID associated with the calling application. At diamond 136, the called instance of an agent may determine whether metadata associated with the user and the calling application 12 is stored locally in a cache. If the metadata is stored locally in a cache, the called instance of an agent 13 may retrieve the locally stored metadata at block 138. If metadata is not stored locally in cache as determined at diamond 136, the called instance of an agent 13 may call middleware 18 to obtain metadata associated with the user and the calling application 12 at block 140. The called instance of an agent 13 may then provide metadata (e.g., from cache or a call to middleware 18) to the calling application 12.

In one embodiment, although claimed subject matter is not limited in this respect, metadata obtained at blocks 140 and/or 138 may be stored in a local cache for a predetermined period of time. After expiration of the period without any access by an instance of an agent, for example, the metadata may be "flushed" from the local cache. It should be understood, however, that this is merely an example embodiment and that claimed subject matter is not limited in this respect.

In response to a call from an instance of an agent 13 at block 140, middleware 18 may initiate transmission of an authentication request based, at least in part, on user information (e.g., obtained at block 134) to authentication server 20 and receive a USID and/or user attributes from authentication server 20 as illustrated above. In one particular embodiment, although claimed subject matter is not limited in these respects, middleware 18 may form a query to authorization database 30 which is based, at least in part, on the application ID, USID and/or attribute data. Authorization metadata received in response to the query may indicate, for example, whether a user is authorized to access the application and/or portion thereof, authorized to perform functions in connection with any secured entities of the application, and/or the like.

According to an embodiment, although claimed subject matters is not limited in this respect, all or a portion of process 130 may be executed on a mobile computing platform (e.g., notebook computer, personal digital assistant, cell phone, and/or the like) comprising a communication adapter to permit communication between processes hosted on the mobile computing platform and a network. In one particular embodiment, such a mobile computing platform may be capable of hosting "rich-client" applications that are hosted on the mobile computing platform. Alternatively, the mobile computing platform may enable a user to interact with web applications through the communication adapter. The mobile computing platform may be connected to the network to communicate with middleware 18 to obtain authentication and/or authorization metadata, enabling a user to execute an application (e.g., rich-client application and/or web application) as illustrated above. The mobile computing platform may also locally store the metadata (e.g., in a memory device)

that does not require a connection to a network for retrieval. Such a memory device for locally storing metadata may comprise, for example, a system memory (e.g., one or more random access memory devices) and/or a non-volatile memory device (e.g., disk drive and/or flash memory device). Following obtaining metadata (e.g., in response to an agent call to middleware 18 at block 140), the mobile computing platform may enable a user to access secured entities of an application even if the mobile platform becomes disconnected from a network connecting the mobile platform to middleware 18. Here, such applications may obtain locally stored authentication and/or authorization metadata from the mobile computing platform without communicating with a network through a communication adapter.

In a particular embodiment, although claimed subject matter is not limited in these respects, middleware 18 may employ a Web service to query authentication server 20 and authorization database 30 in response to a call at block 140. Similarly, authorization database 30 may provide metadata to middleware 18 in response to such a query using a Web service according to one or more of the aforementioned web service protocols. It should be understood, however, that this is merely an example of how information may be transmitted in response to a query for authorization metadata and claimed subject matter is not limited in this respect.

Figure 2:
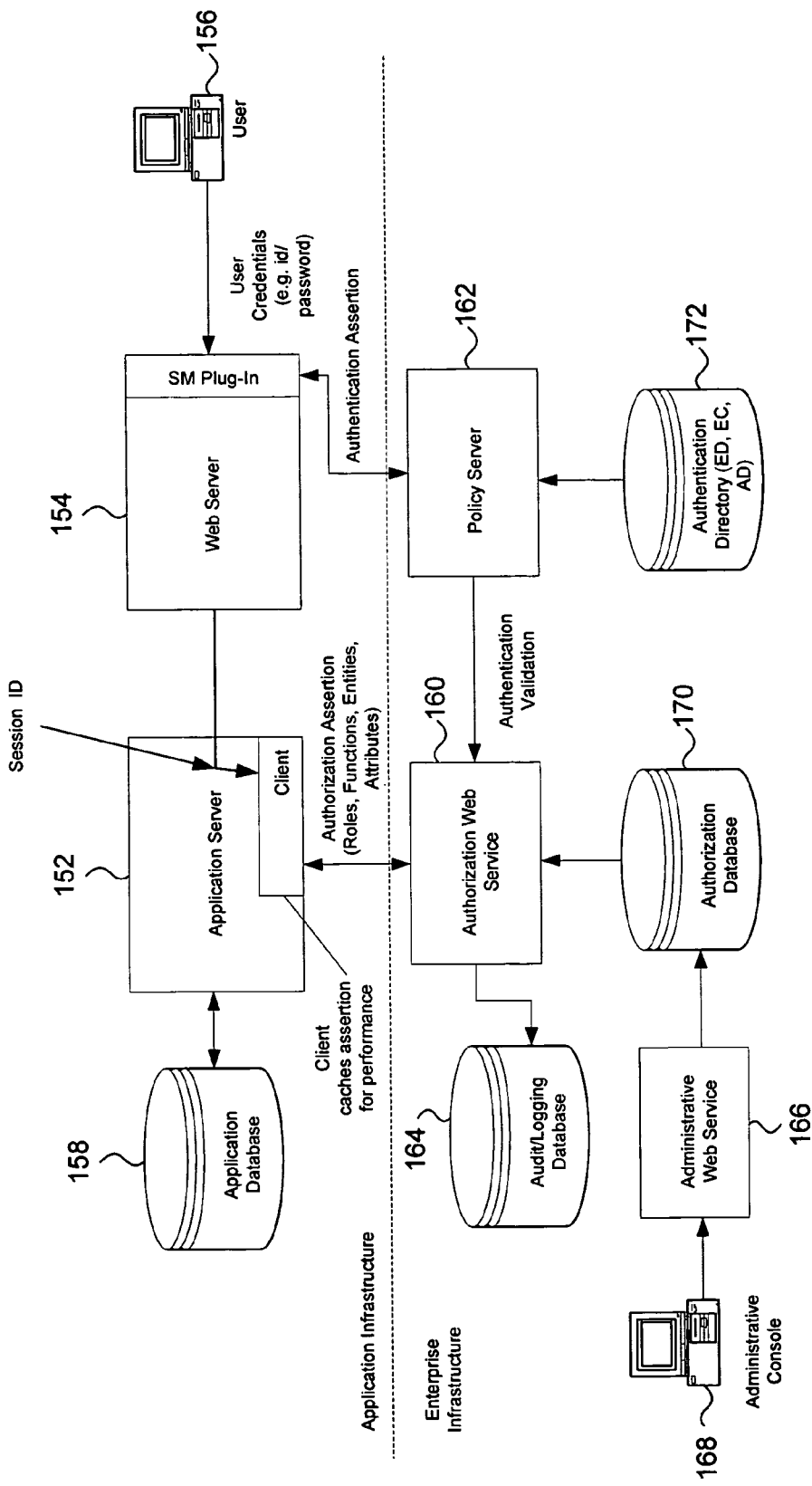
FIG. 2 is a schematic diagram of a system to authenticate and/or authorize a user for accessing a Web application according to an embodiment.

According to an embodiment, applications 12 (FIG. 1A) may comprise Web applications and rich-client applications. In one particular example, as illustrated in FIG. 2, a user 156 may access such a Web application hosted on an application server 152 through a web server 154. Here, for example, the user may interact with web server 154 via a GUI enabled browser hosted on computing platform 156 according to any one of several web protocols such as, for example, HTTP. However, these are merely examples of how an application may be accessed via a web protocol and claimed subject matter is not limited in these respects. Here, the user may receive a prompt to provide authentication information such as, for example, a user ID and password.

A policy server 162 may interact with web server 154 and authentication directory 172 to assert an authentication of a user which is attempting to access an application through web server 154. Web server 154 may then determine a session ID associated with the authenticate user and pass that session ID to application server 152. Also, an authorization web service 160 may query authorization database 170 for authorization metadata and provide retrieved authorization metadata to application server 152 to be cached with the session identifier as illustrated above, for example. Also, authorization metadata associated with users, and applications and/or portions thereof may be modified in authorization database 170 through administrative web service 66 without modification of source code for applications to execute on application server 152. This is illustrated below according particular embodiments illustrated below with reference to FIGS. 4A through 36. It should be understood, however, that these are merely examples of how authorization metadata in an authorization database may be modified and claimed subject matter is not limited in these respects.

Figure 3:
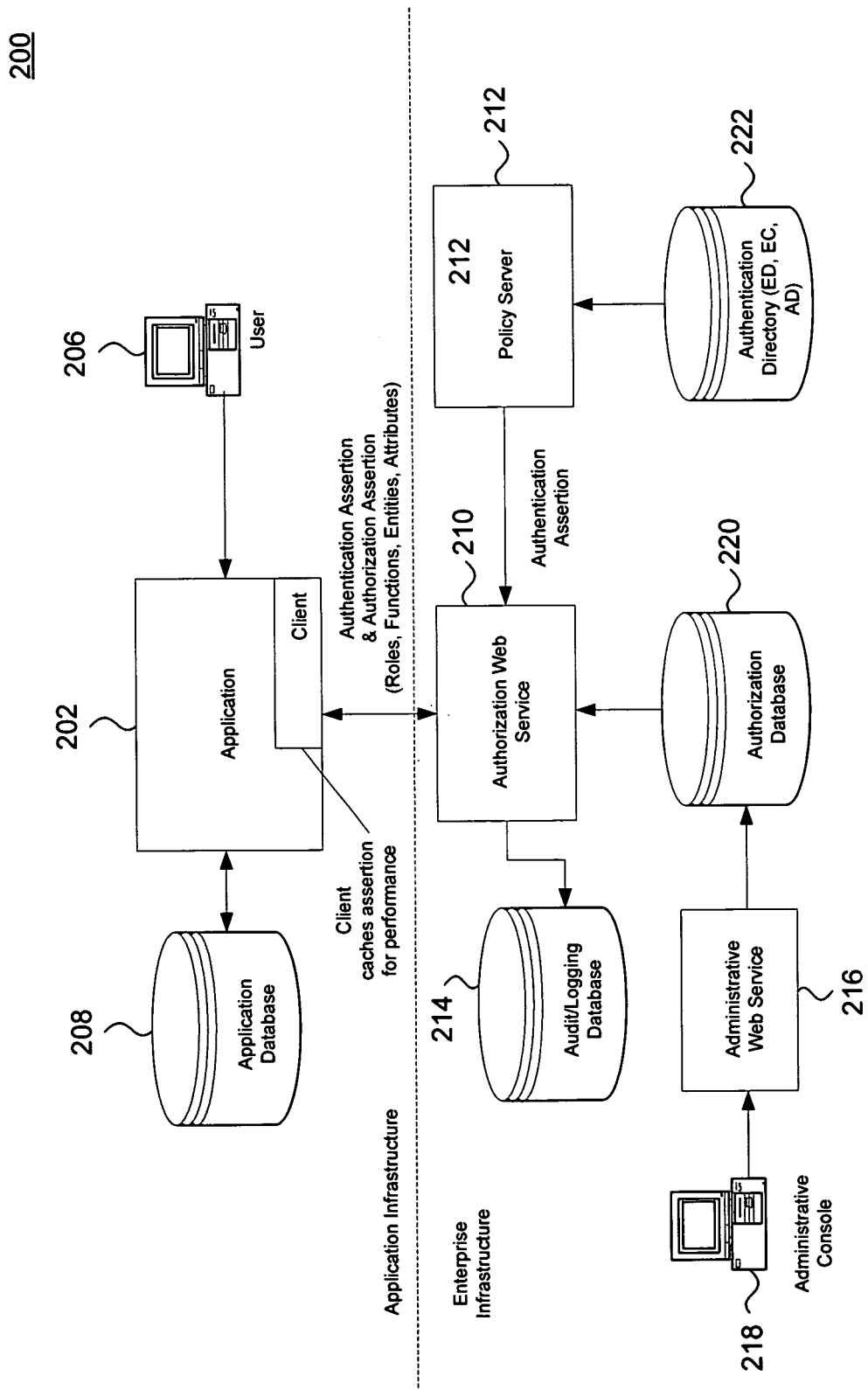
FIG. 3 is a schematic diagram of a system to authenticate and/or authorize a user for accessing a rich-client application according to an embodiment.

In another particular example, as illustrated in FIG. 3, a user 206 may access a rich-client application hosted locally with user 206 (e.g., on a PC platform and/or hand held device with a GUI to receive inputs from user 206). In this particular embodiment, a user 206 may interact directly with an application 202 and an authorization web service 210 may assert an authentication of user 206 and authentication metadata associated with user 206 based, at least in part, on authentication information provided by user 206 to application 202.

Here, authorization web service 210 may query policy server 212 to obtain an authentication assertion. Based, at least in part, on the authentication assertion, authorization web service 210 may query authorization database 220 to obtain authorization metadata to provide along with the authentication assertion to application 202. Application 202 may then cache authentication and authorization metadata received in the authentication and authorization assertions as discussed above. Also, as illustrated above with reference to FIG. 2, according to a particular embodiment, authorization metadata associated with users, and applications and/or portions thereof may be modified in authorization database 220 through administrative web service 216 without modification of source code of application 202 as illustrated above.

As pointed out above, according to an embodiment, a user may access multiple applications during a session from a single USID. Here, once a user is authenticated for a session (e.g., upon attempting to access an application) and receives a corresponding USID, a user may access other applications without having to re-authenticate. In a particular embodiment where a user is initially authenticated upon accessing a Web application through a browser, a USID assigned to the user may be stored in a cookie that may be detected by an agent of a Web service to authorize the user for accessing a subsequent Web application without an additional authentication procedure. Where a subsequent application comprises a rich-client application, for example, the USID may be stored and accessed from a persistent cookie. In another embodiment where a user is initially authenticated upon accessing a rich-client application, a USID assigned to the user may be stored by a local operating system (e.g., as a command line parameter) to be used in accessing a subsequent rich-client application. Alternatively, where a user is initially authenticated upon accessing a rich-client application, a USID assigned to the user may be maintained in a Web service by an agent to be re-used for access of a web-based application. However, these are merely examples of how a user may access multiple applications with a single USID during a session and claimed subject matter is not limited in these respects.

According to an embodiment, FIGS. 4 through 36 illustrate processes for setting and/or modifying an authorization database such as, for example, any one of authorization databases 30, 170 and/or 220 illustrated above. However, these are merely examples of authorization databases that may be modified as illustrated with reference to FIGS. 4 through 36 and claimed subject matter is not limited in these respects. As pointed out above, authorization metadata in an authorization database may be derived, at least in part, from one or more security business rules. Also, by employing a security metadata service and middleware as illustrated above, an administrator may modify authorization metadata associated with and/or affecting an application without modifying source code of the application. Accordingly, an administrator may modify authorization metadata in response to changes in the one or more security business rules without modifying source code of affected applications.

In particular embodiments, although claimed subject matter is not limited in this respect, FIGS. 4 through 36 comprise graphical user interface (GUI) screen shots from an administrative console such as, for example administrative consoles 168 and/or 218 illustrated above. However, these are merely examples of administrative consoles that may enable an administrator to set and/or modify an authorization database and claimed subject matter is not limited in these respects.

Figure 4A:
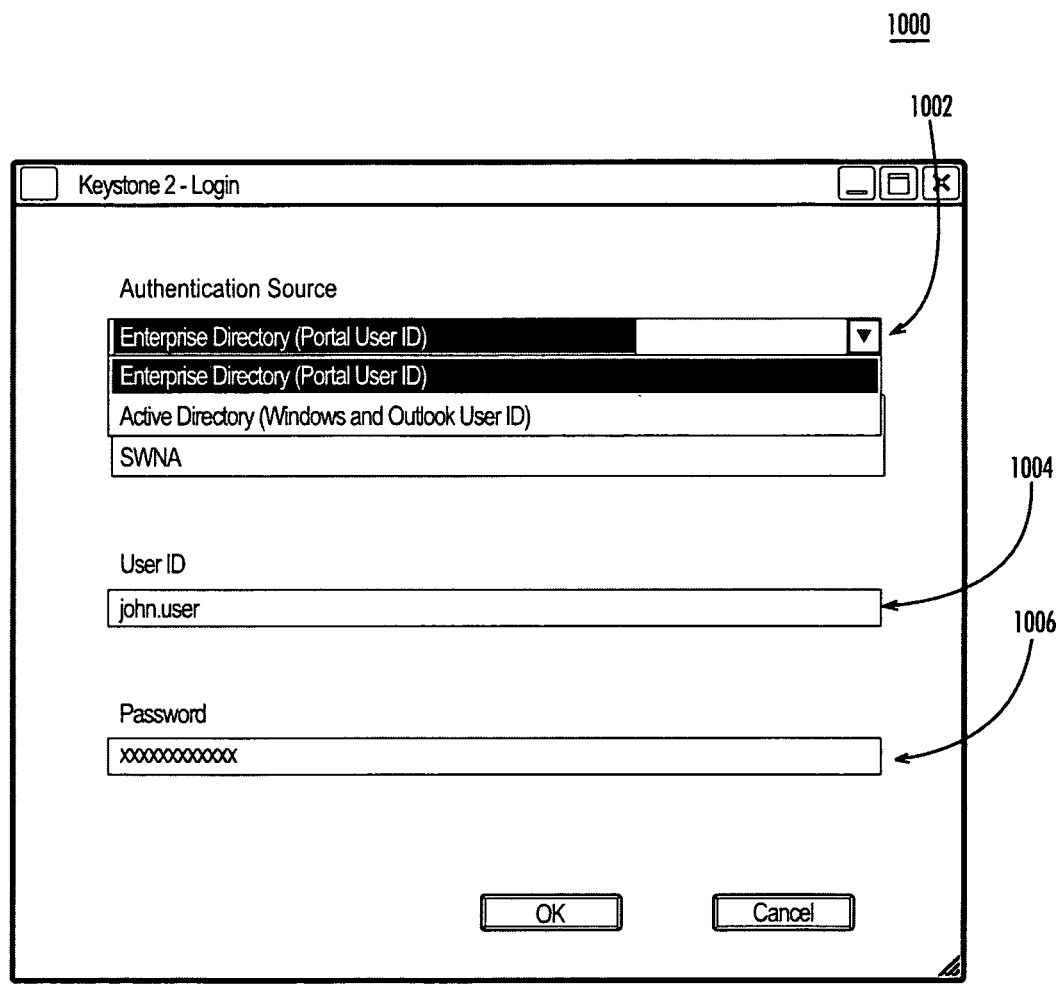
FIG. 4A is a graphical user interface (GUI) screen shot illustrating an administrative login.

FIG. 4A is a graphical user interface (GUI) screen shot 1000 illustrating an administrative login to an administrative service such as, for example, administrative services. Here, an administrator may select an authentication source at drop-down box 1002, enter a user ID in box 1004 and a password at box 1006. Here, the authentication source selected at drop-down box 1002 may authenticate the user based, at least in part, on the user ID and password provided at boxes 1004 and 1006. However, these are merely examples of information that may be used to authenticate an administrator and claimed subject matter is not limited in these respects. Once authenticated, a session with the administrative service begins and the administrative service may assign a user ID to the administrator which is to be used to uniquely identify the administrator throughout the session. During the session, the administrator may modify authentication sources and/or information in an authorization database as illustrated below.

Figure 4B:
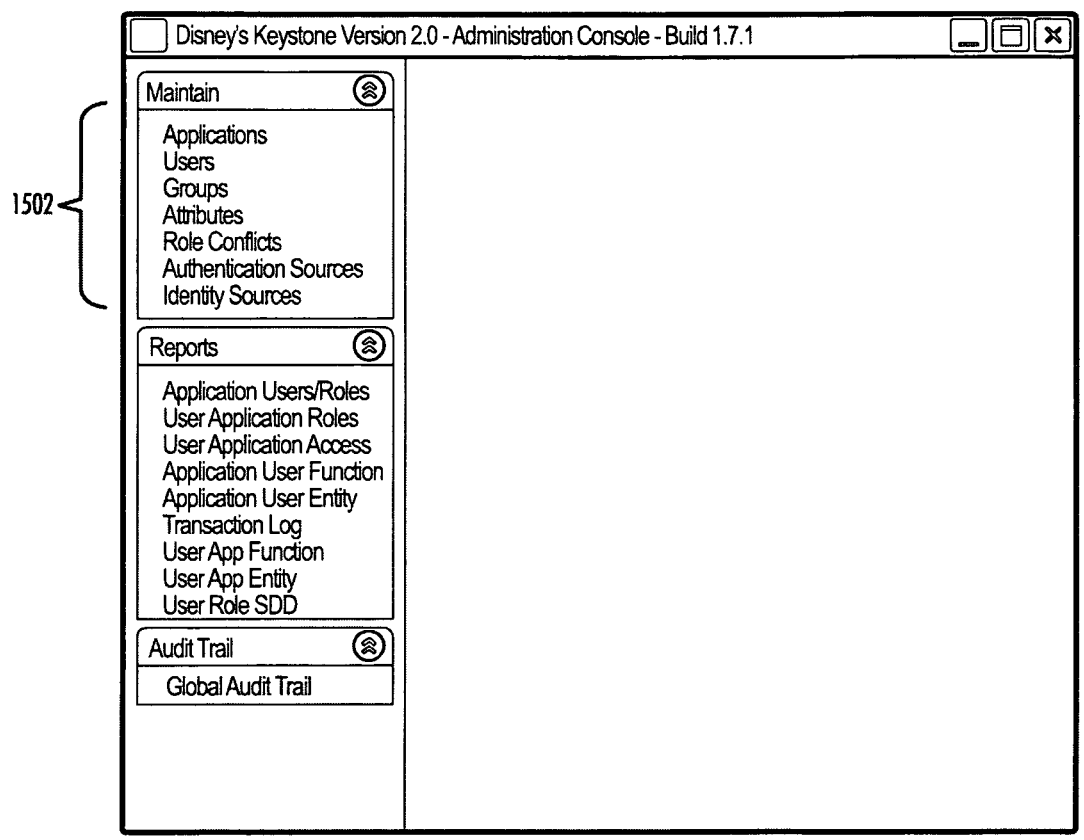
FIG. 4B is a GUI screen shot illustrating an administrative console according to an embodiment.

FIG. 4B is a GUI screen shot 1500 illustrating an administrative console according to an embodiment. In one particular embodiment, although claimed subject matter is not limited in this respect, GUI screen shot 1500 may be displayed on an administrative console following an administrative login and authentication as illustrated with reference to FIG. 4A, for example. Through GUI screen shot 1500, an administrator may perform authorized activities through an administrative Web service (e.g., administrative Web service 66 or 116) to, among other things, modify authentication sources and/or authentication metadata in an authorization database, and generate reports. A menu 1502 lists selectable entities for modifying authentication sources and/or information in an authorization database. Here, the current user is authorized to modify authorization metadata in an authorization database through selection of buttons labeled "Applications," "Users," "Groups," "Attributes" and "Roles," but is not authorized to modify authentication sources through selection of buttons labeled "Authentication Sources" and/or "Identity Sources."

Figure 5:
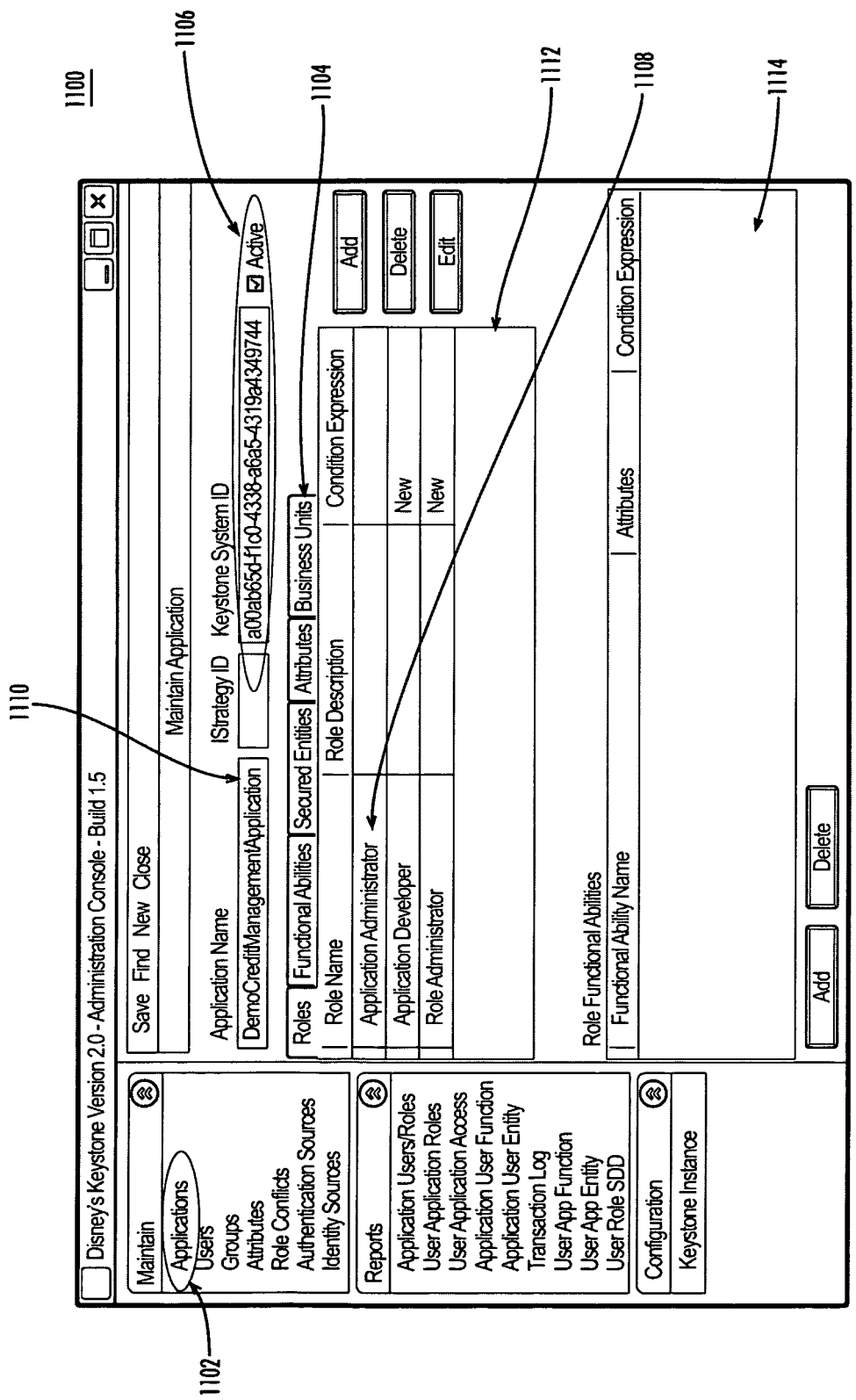
FIG. 5 is a GUI screen shot illustrating an addition of an application to be accessible through an authorization process according to an embodiment.

FIG. 5 is a GUI screen shot 1100 illustrating an addition of an application to be accessible through an authorization procedure according to an embodiment. GUI screen shot 1100 may appear on an administrative console in response to selection of a button 1102 labeled "Applications." A currently selected application "DemoCreditManagementApplication" is displayed in box 1110 and may be selected by entering the application name into box 1110 in the currently illustrated embodiment. Box 1106 may display an application ID comprising a globally unique system ID (GUSID) associated with the currently selected application. Here, such a GUSID may be associated with an application upon registration with an authorization server as discussed above. In an alternative embodiment, an application may be selected through a drop-down menu. As illustrated below, selection of tabs 1104 enables modification of authorization metadata representing, for example, roles, functional abilities, secured entities and/or attributes associated with the currently selected application in the authorization database. In this particular example, the tab labeled "Roles" is selected and roles associated with one or more functional abilities of the selected application appear in box 1112 listed as "Application Administrator," "Application Developer" and "Role Administrator." A currently selected role "Application Administrator" is shown at highlighted entry 1108 and box 1114 shows that no functional abilities are associated with the this role.

Figure 6:
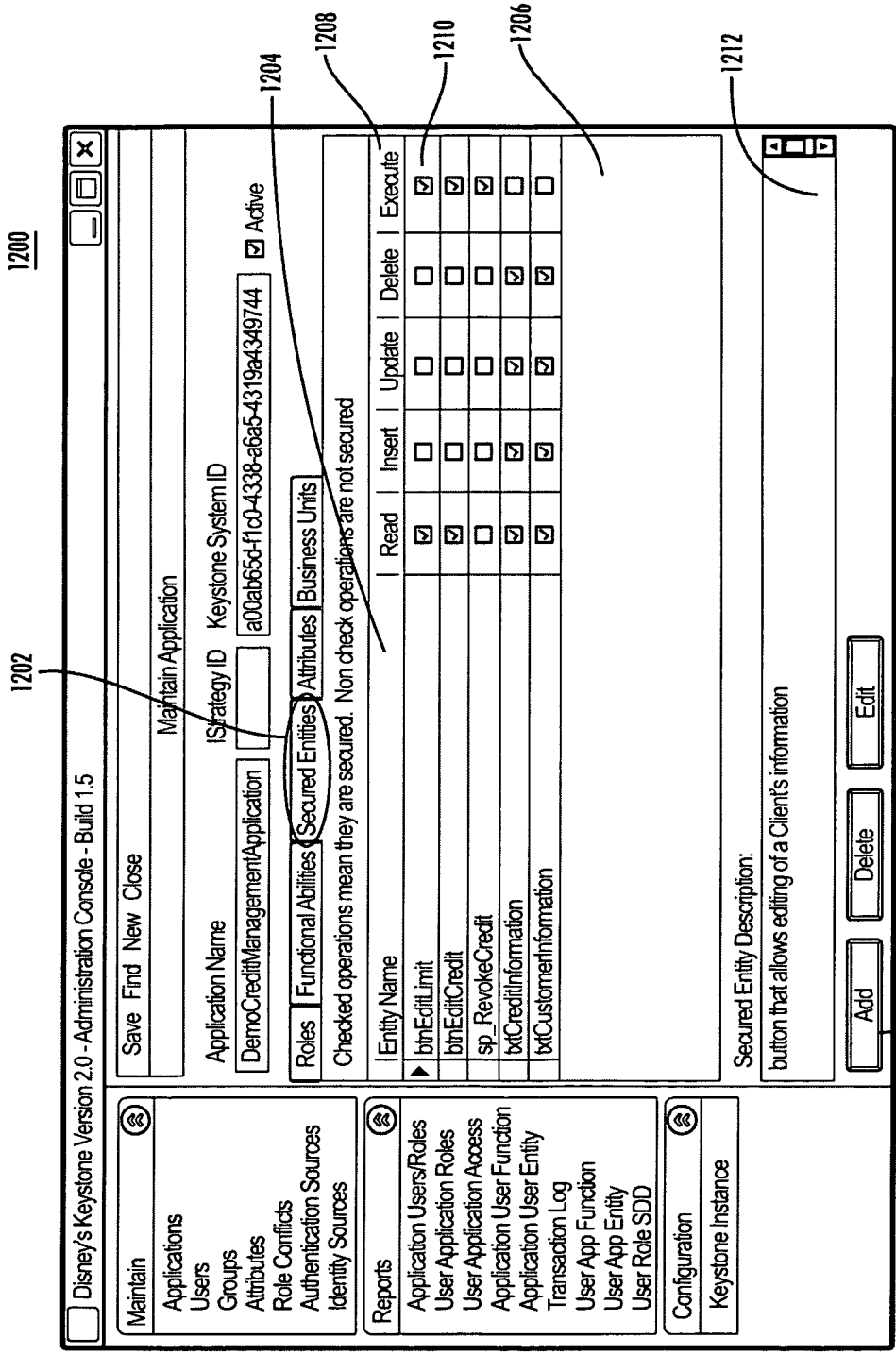
FIG. 6 is a GUI screen shot illustrating identification of secured entities of an application according to an embodiment.

FIG. 6 is a GUI screen shot 1200 illustrating identification of secured entities of a currently selected application according to an embodiment. A tab 1202 labeled "Secured Entities" and secured entities identified for the currently selected application are listed in box 1206. Operations 1208 that may be associated with a secured entity are shown as "Read," "Insert," "Update," "Delete" and "Execute." However, these are merely examples of operations that may be associated with a secured entity and claimed subject matter is not limited in these respects. Here, an administrator may select one or more operations on a secured entity to which access may be controlled or require authorization. In the presently illustrated embodiment, a entity may comprise a secured entity if at least one operation is selected for that entity. However, this is merely an example of how an administrator may define a secured entity for a particular application and claimed subject matter is not limited in this respect.

Figure 7:
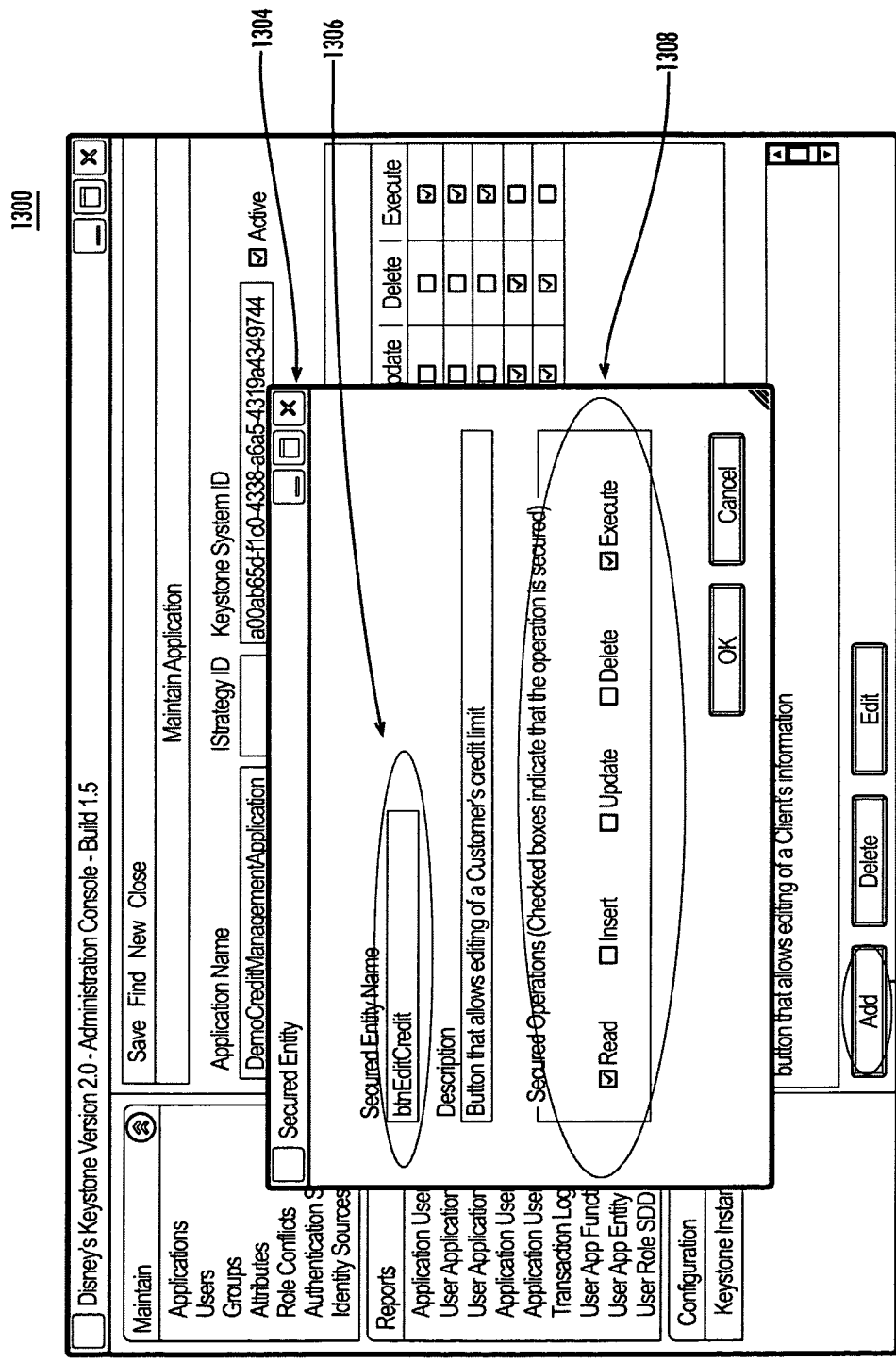
FIG. 7 is a GUI screen shot illustrating an addition of a definition of a secured entity of an application according to an embodiment.

FIG. 7 is a GUI screen shot 1300 illustrating an addition of a definition of a secured entity to an application according to an embodiment. Here, screen 1304 may appear overlaid screen shot 1200 in response to selection of "Add" button 1214. An administrator may enter a name of an added secured entity at box 1306, and check off desired secured operations associated with the added secured entity at 1308.

Figure 8:
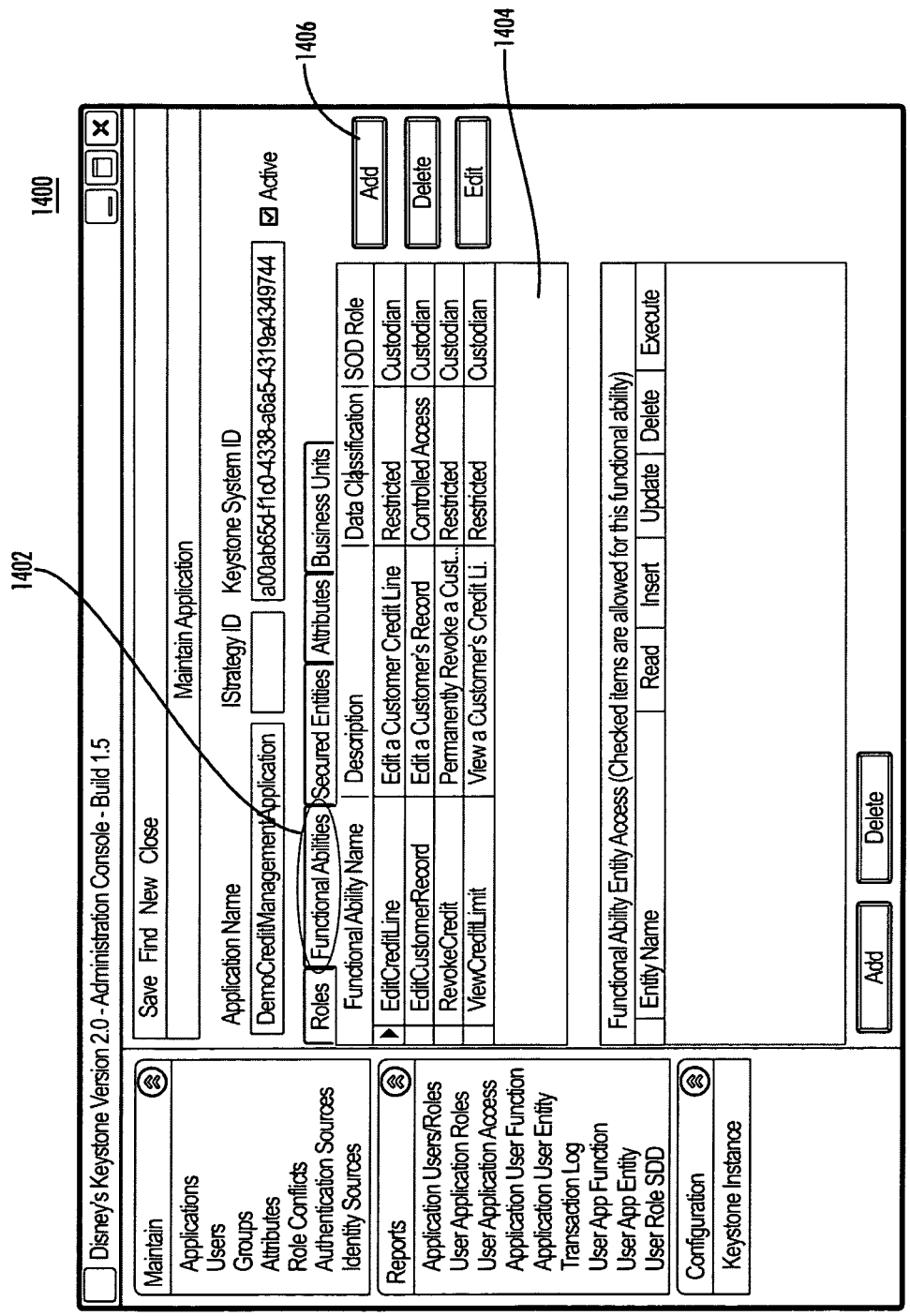
FIG. 8 is a GUI screen shot illustrating identification of functional abilities for an application according to an embodiment.
Figure 9:
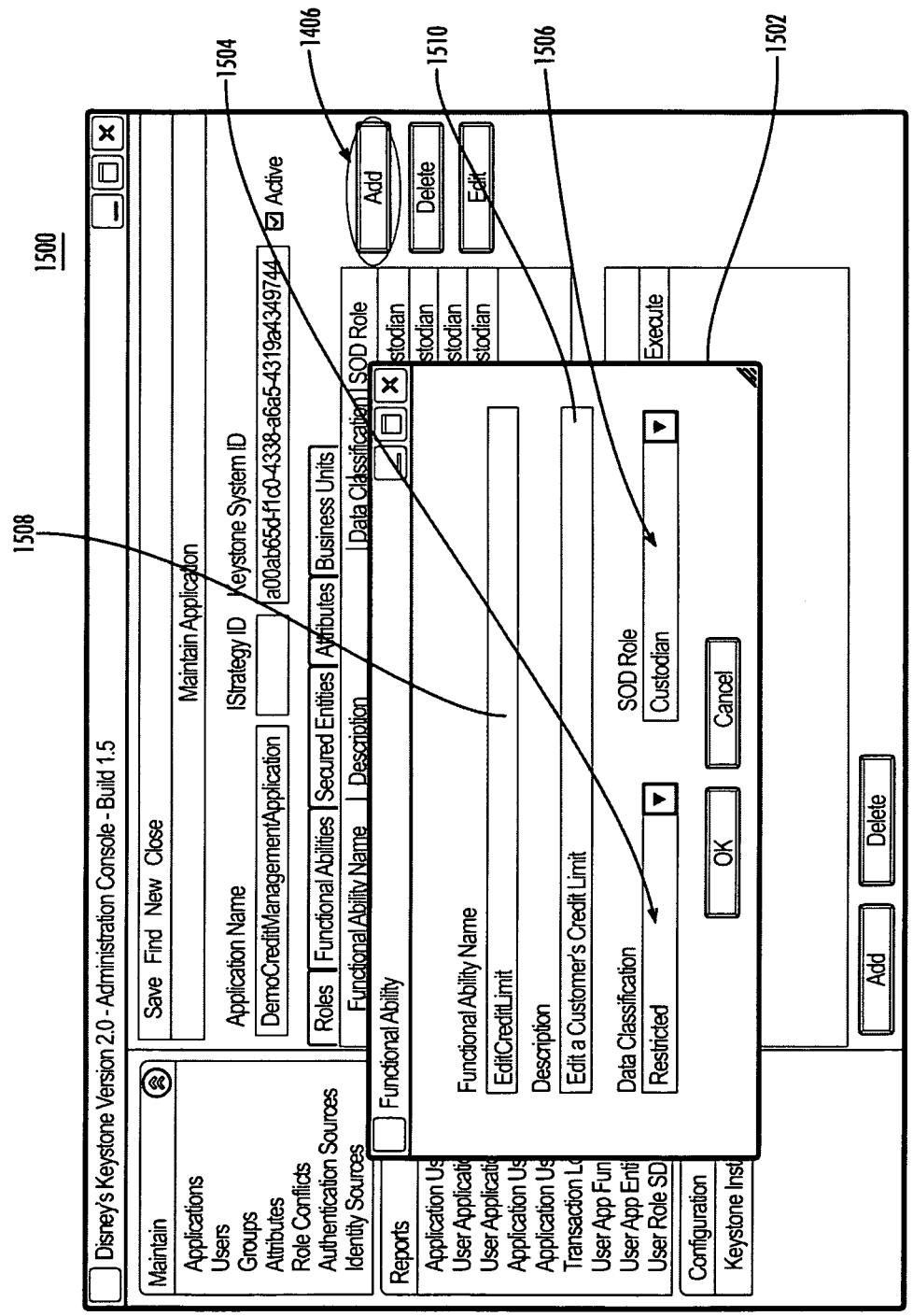
FIG. 9 is a GUI screen shot illustrating an addition of a definition of a functional ability to an application according to an embodiment.
Figure 10:
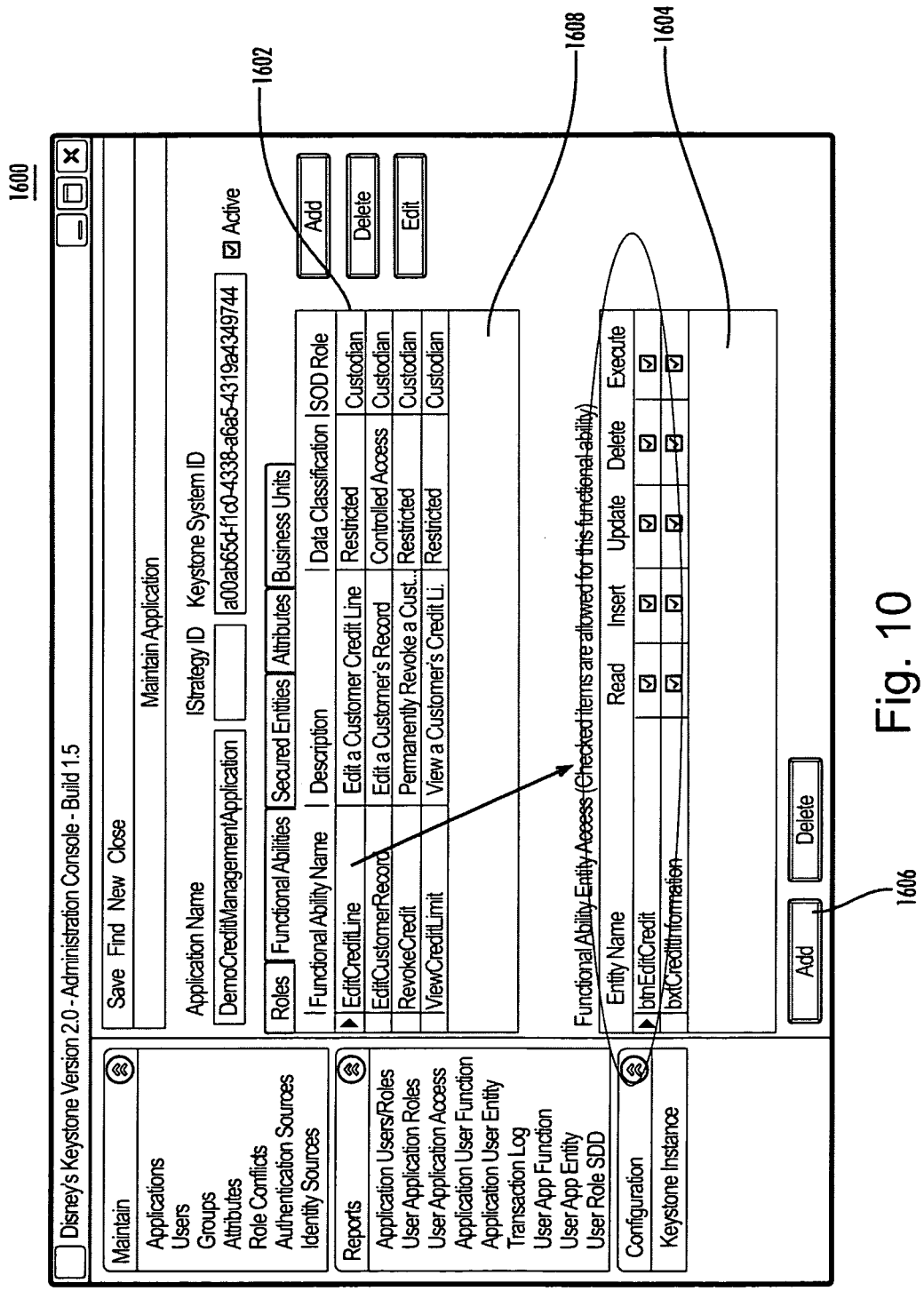
FIG. 10 is a GUI screen shot illustrating an association of a functional ability with a secured entity according to an embodiment.
Figure 11:
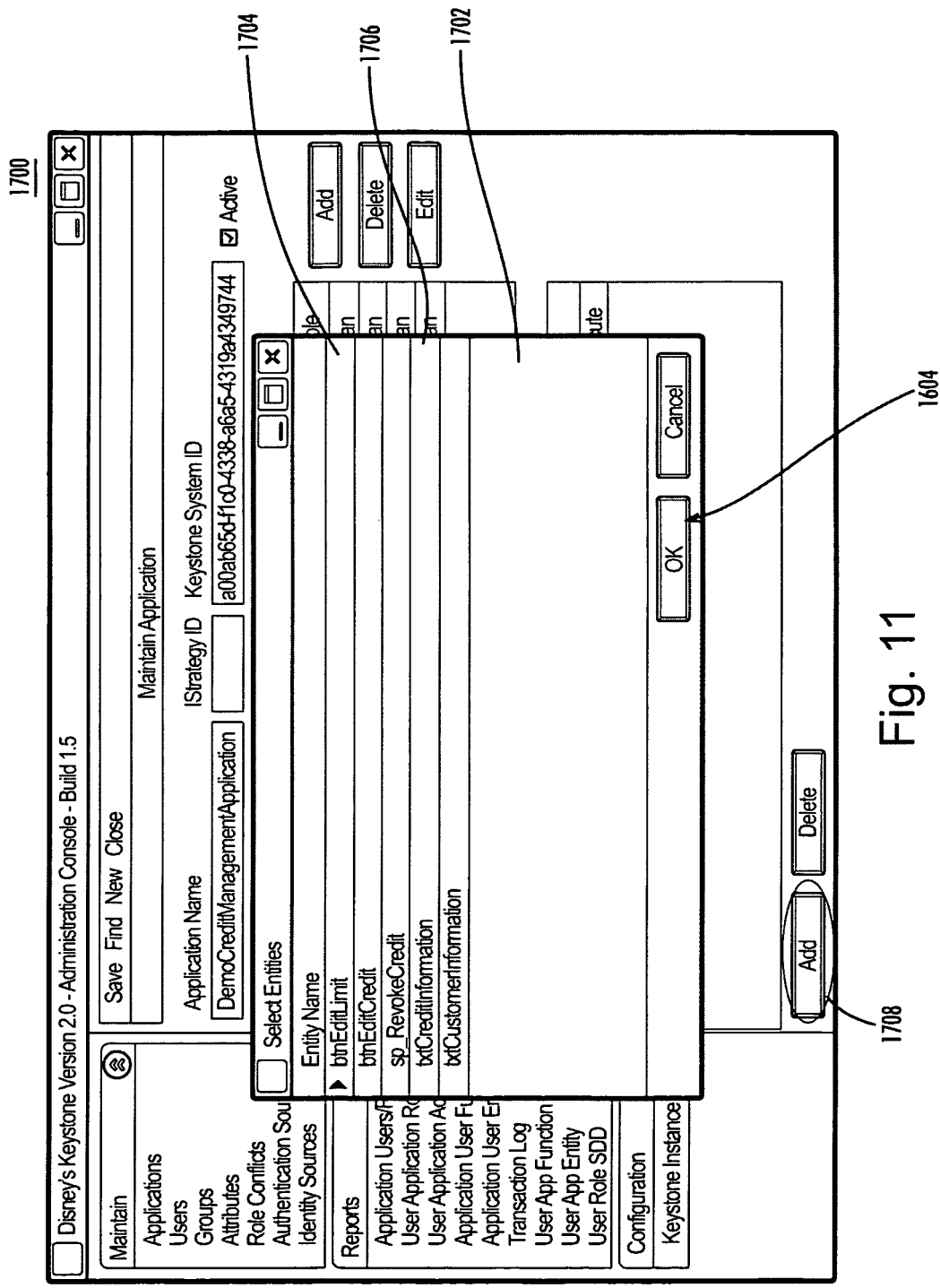
FIG. 11 is a GUI screen shot illustrating an addition of a secured entity for association with a functional ability according to an embodiment.

FIG. 8 is a GUI screen shot 1400 illustrating identification of functional abilities for a currently selected application according to an embodiment. Tab 1402 labeled "Functional Abilities" is selected and functional abilities associated with the selected application are listed in box 1404. An additional functional ability may be defined for the currently selected application by selecting button 1406 labeled "Add," resulting in an overlay of box 1502 as shown in GUI screen shot 1500 of FIG. 9. Here, an administrator may enter a name for the new functional ability at line 1508 and a brief description of the added functional ability at line 1510. Here, functional abilities associated with a secured entity may be associated with one or more operations affecting the secured entity FIG. 10 is a GUI screen shot 1600 illustrating an association of a functional ability with a secured entity according to an embodiment. In the presently illustrated embodiment, secured entities may be associated with a newly created and/or existing functional ability. Functional abilities associated with a currently selected application are shown in box 1608 with functional ability "EditCreditLimt" shown selected at line 1602. Box 1604 lists secured entities defined in the currently selected application that are currently associated with the selected functional ability. Selection of button 1606 labeled "Add" may overlay 1702 listing secured entities defined in the currently selected application as shown in GUI screen shot 1700 of FIG. 11. Here, secured entities associated with the currently selected functional ability are highlighted at lines 1704 and 1706 and additional functional abilities may be defined by selecting a desired additional secured entity and selecting button 1708 labeled "OK."

Figure 12:
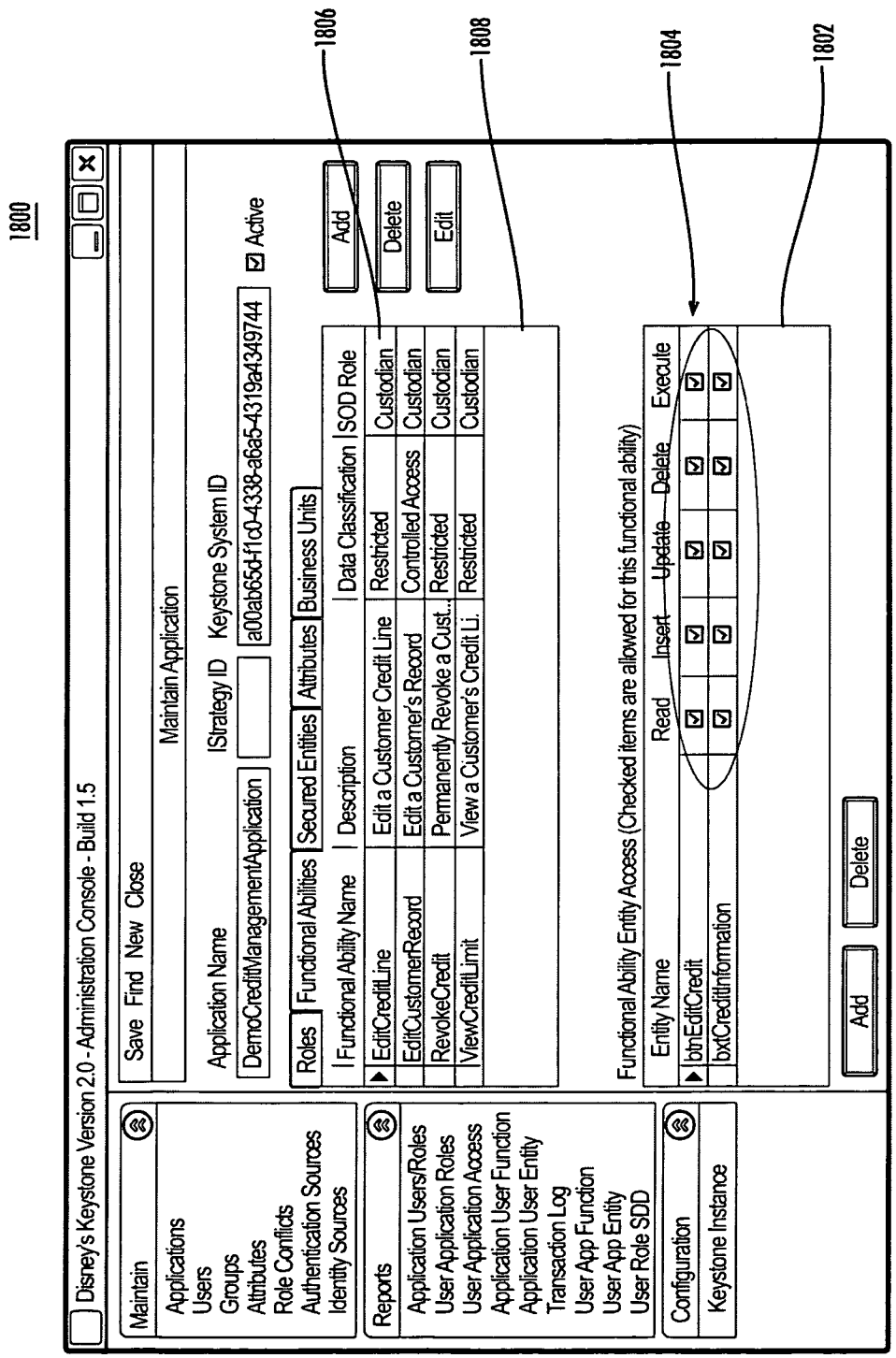
FIG. 12 is a GUI screen shot illustrating setting available operations for a secured entity associated with a functional ability according to an embodiment.

FIG. 12 is a GUI screen shot 1800 illustrating setting available operations of a secured entity associated with a functional ability according to an embodiment. Box 1808 shows a functional ability "EditCreditLimit" selected at line 1806 and box 1802 shows secured entities that are associated with this selected functional ability. Operations "Read," "Insert," "Update," "Delete," and "Execute" may be secured by checking appropriate boxes, or unsecured by unchecking appropriate boxes. In this particular embodiment, although claimed subject matter is not limited in these respects, the securing and/or unsecuring of operations associated with secured entities may override default settings made through GUI screen shot 1200 as illustrated above with reference to FIG. 6 for the selected functional ability.

Figure 13:
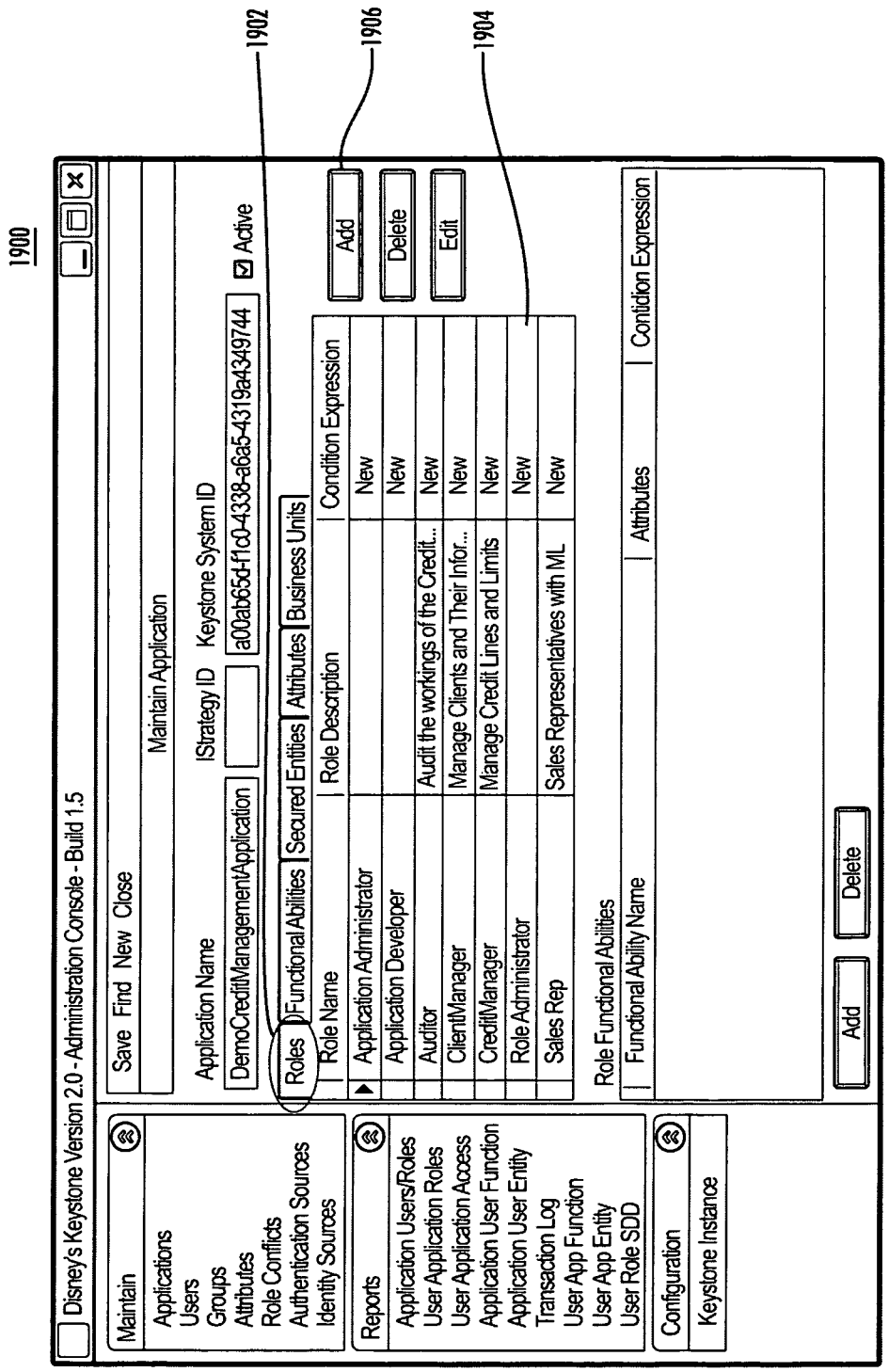
FIG. 13 is a GUI screen shot illustrating a definition of user roles for an application according to an embodiment.
Figure 14:
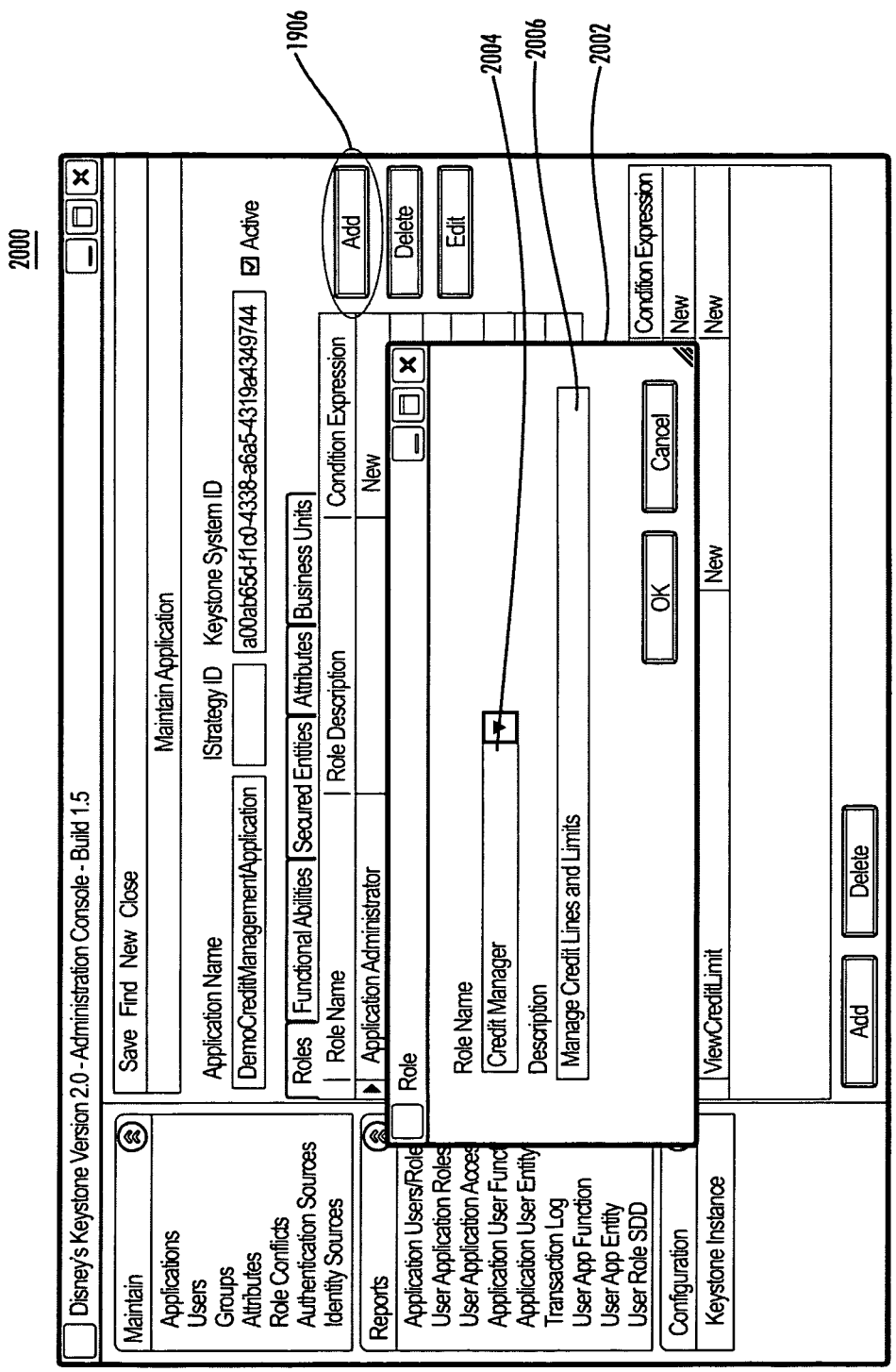
FIG. 14 is a GUI screen shot illustrating an addition of a user role for an application according to an embodiment.

FIG. 13 is a GUI screen shot 1900 illustrating a definition of user roles for an enterprise and/or organization according to an embodiment. Selection of tab 1902 labeled "Roles" provides a list of roles which are associated with a currently selected application in box 1904. An additional role may be associated with the currently selected application by selecting button 1906 labeled "Add" to overlay box 2002 as shown in GUI screen shot 2000 of FIG. 14. Here, a name of an additional role may be provided at line 2004 and a description of the added role may be provided at line 2006.

Figure 15:
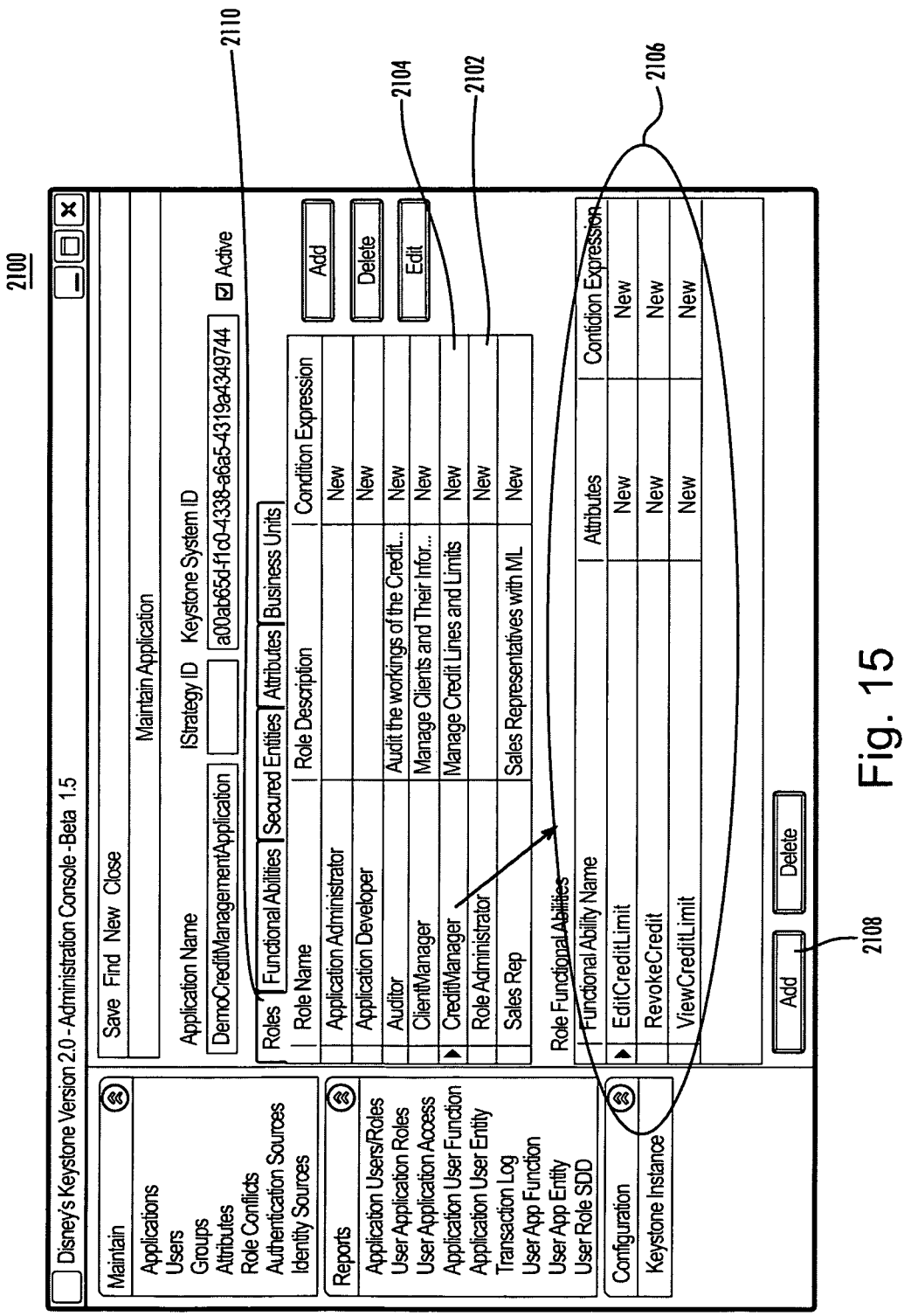
FIG. 15 is a GUI screen shot illustrating an association of a role with one or more functional abilities according to an embodiment.

FIG. 15 is a GUI screen shot 2100 illustrating an association of a role with one or more functional abilities of an application according to an embodiment. With tab 2110 labeled "Roles" selected, box 2102 lists newly associated and/or previously associated with a currently selected application. Box 2106 lists functional abilities that are associated with a selected role which is highlighted at line 2104. At FIG. 16, selection of button 2208 labeled "Add" may overlay box 2202 as shown in GUI screen shot 2200 shown in FIG. 16. Box 2202 lists functional abilities that are associated with the currently selected application, with functional abilities currently associated with a currently selected role highlighted at lines 2204. Here, an additional functional ability selected at line 2206 may be associated with a currently selected role by selecting button 2210 labeled "OK."

Figure 16:
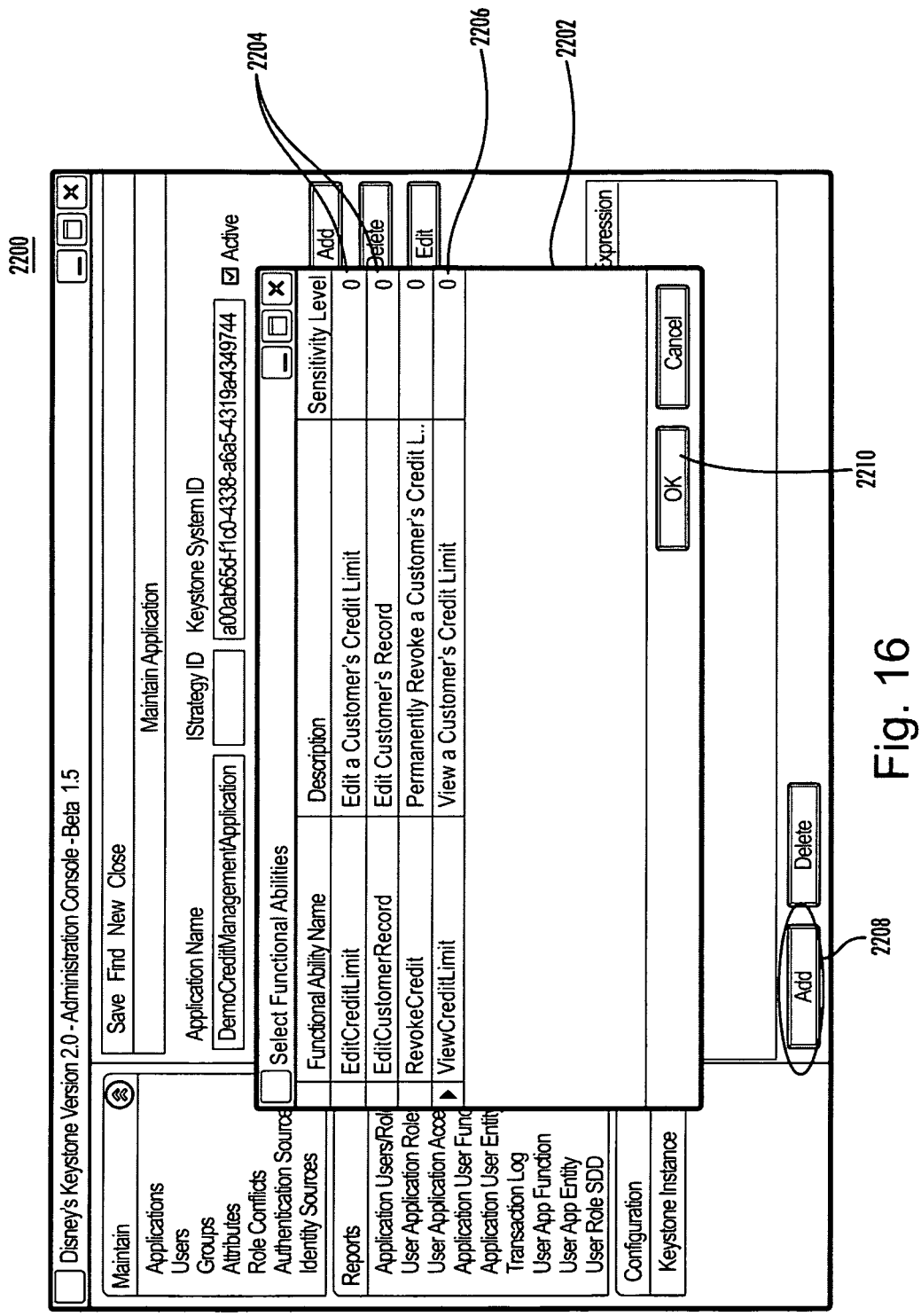
FIG. 16 is a GUI screen shot illustrating a modification of functional abilities associated with a role according to an embodiment.
Figure 17:
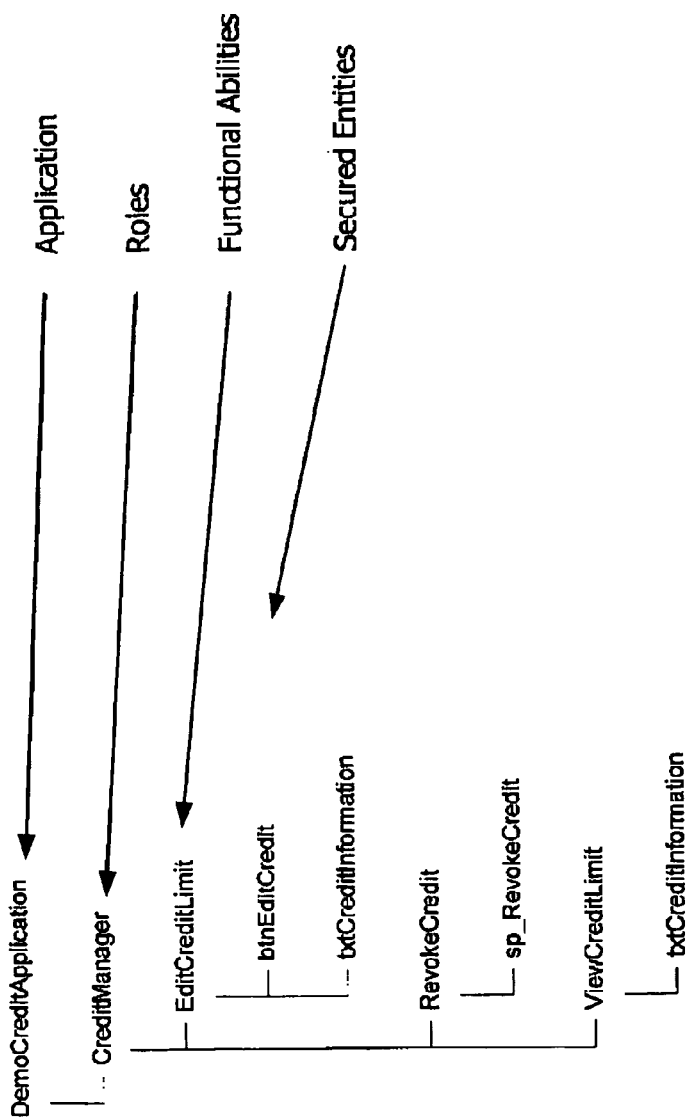
FIG. 17 is a schematic diagram illustrating a hierarchy of authorization metadata associated with an application according to an embodiment.

FIG. 17 is a schematic diagram of a graph 2400 illustrating a hierarchy of authorization metadata associated with an application "DemoCreditApplication" according to a particular embodiment illustrated in FIGS. 15 and 16. Here, graph 2400 shows the role "CreditManager" being associated with functional abilities "EditCreditLimt," "RevokeCredit" and "ViewCreditLimit" as shown in box 2106 of GUI screen shot 2100. Also, Graph 2400 shows the functional ability "EditCreditLimit" being associated with secured entities "btnEditCredit" and "txtCreditlnformation" as illustrated in box 1802 of GUI screen shot 1800. It should be understood, however, that this is merely an example of a hierarchy of authorization metadata associated with a particular application and that claimed subject matter is not limited in this respect.

FIGS. 5 through 16 illustrate how an administrator may modify authorization metadata in an authorization database through an administrative Web service. Here, roles, functional abilities and/or secured entities may be defined and/or modified for a particular application throughout the life of the application without editing and recompiling source code for the application as noted above.

Figure 18:
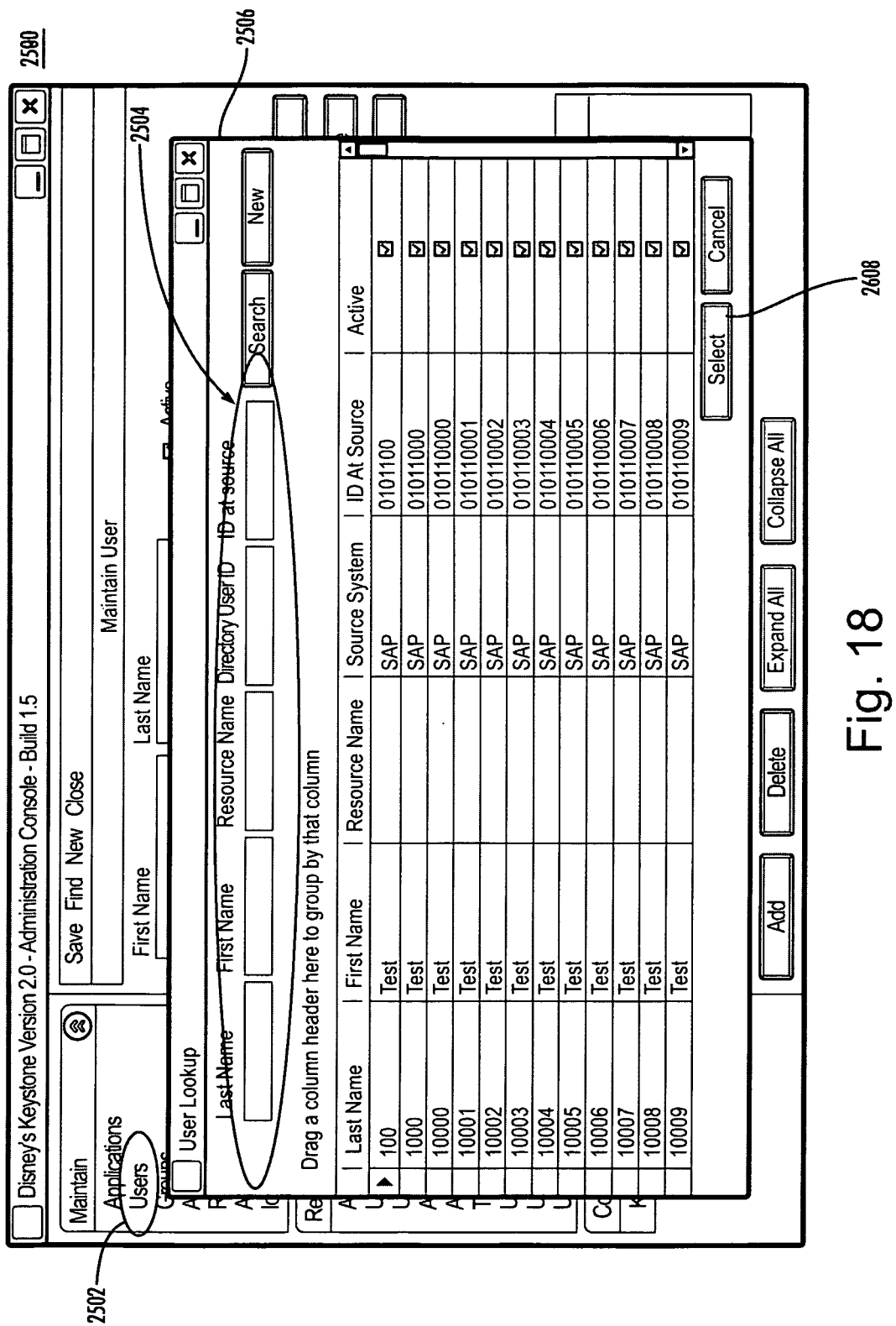
FIG. 18 is a GUI screen shot illustrating an addition of a user to users associated with a role according to an embodiment.
Figure 19:
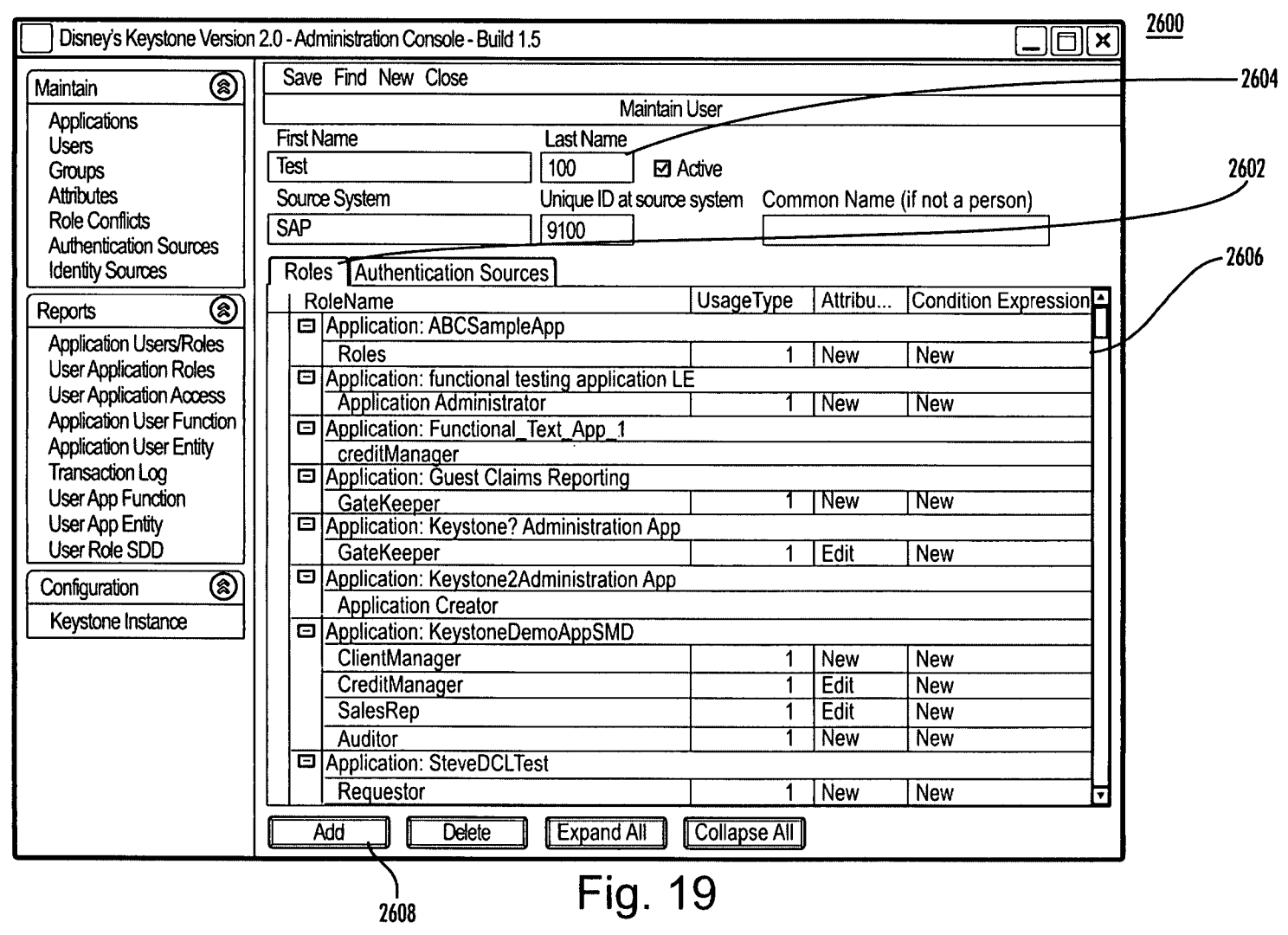
Figure 20:
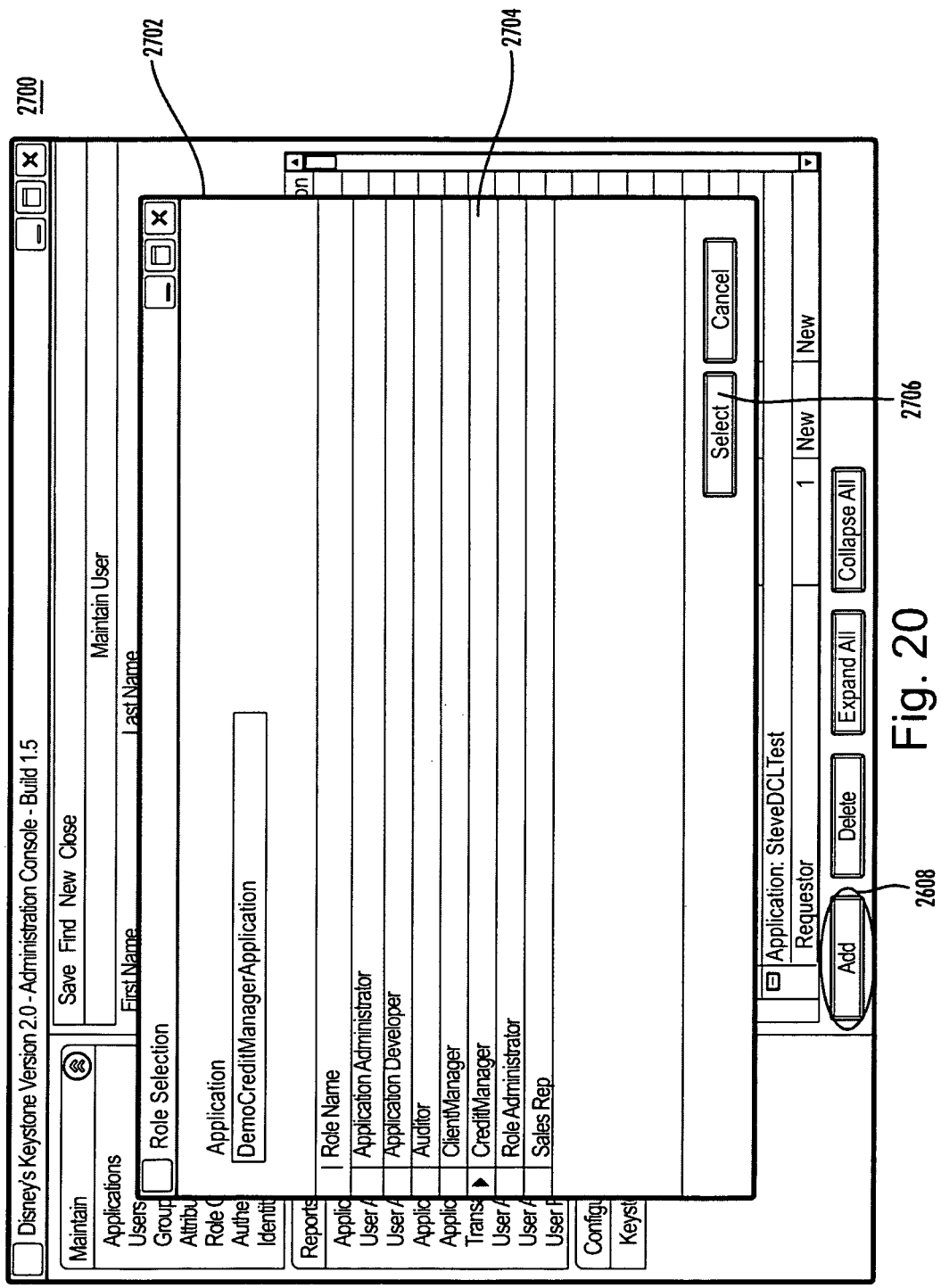
FIG. 20 is a GUI screen shot illustrating a process to modify roles associated with a user according to an embodiment.

FIGS. 18 through 20 are GUI screen shots illustrating an addition of a user to users associated with a role according to an embodiment. Here, selection of button 2502 labeled "Users" in the administrative console display may overlay box 2506. Providing information in any of fields 2504 enables a search to locate a user to be added to users associated with a role (e.g., defined for an organization and/or enterprise). Selection of button 2608 labeled "Select" may provide GUI screen 2600 shown in FIG. 19. With tab 2602 labeled "Roles" selected, box 2606 may provide a list of applications and roles associated with the listed applications as reflected in authorization metadata stored in an authorization database. By scrolling in box 2606 to locate and select application "DemoCreditManagementApplication" (not shown) and then selecting button 2608 labeled "Add" may overlay box 2702 shown in FIG. 20 which lists roles currently associated with this application. Here, by selection of role "CreditManager" and button 2706 labeled "Select", the currently selected user may be added to users having this role (and any functional abilities associated with the role).

According to an embodiment, a user having a role in an organization and/or enterprise may have the ability to delegate that role to other users in an enterprise. Here, for example, such a user may, through accessing a Web service, for example, assign his/her role to other users. In one particular embodiment, although claimed subject matter is not limited in this respect, a first user may be able to delegate authority to a second user for assignment of the first user's role to a third user. In yet another embodiment, although claimed subject matter is not limited in this respect, a first user may be able to delegate authority to a second user for assignment of authority to delegate to a third user. Here, for example, the third user may have the authority to assume the role of the first user, assign the role of the first user to a fourth user and/or delegate authority to a fourth user for assignment of the first user's role.

Figure 21:
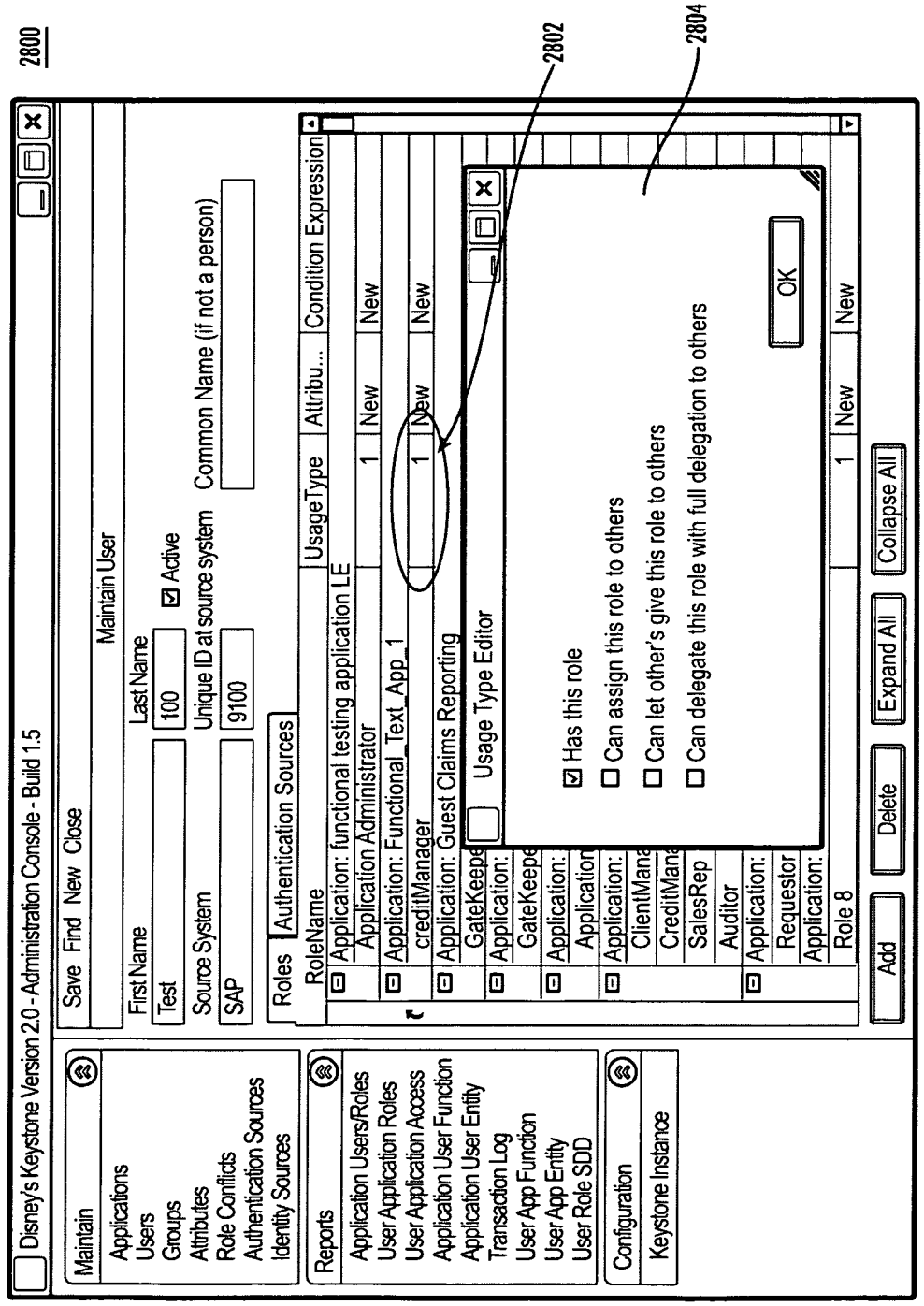
FIG. 21 is a GUI screen shot illustrating an indication of an authority to assign and/or delegate a role according to an embodiment.

According to an embodiment, selection of a numeral displayed in a "Usage Type" field of GUI screen shot 2600 may overlay a usage type editor box 2804 as shown in GUI screen shot 2800 of FIG. 21. Authority to assign and delegate authority to assign a role may be selected by selecting an appropriate box. For example, checking the box next to "Has this Role" may merely indicate that the currently selected user has the role but does not have any authority to assign the role to others. Checking the box next to "Can assign this role to others" may indicate that the currently selected user has authority to assign the role to others, but does not have authority to delegate such assignment to other users. Checking the box next to "Can let others give this role to others" may indicate that the currently selected user has the authority to delegate assignment of the role to others, but does not have authority to delegate with full delegation to others. Checking the box next to "Can delegate this role with full delegation to others" may indicate that the currently selected user has authority to delegate assignment of the role to others, who may then delegate authority to assign and/or delegate assignment of the role to others.

Figure 22:
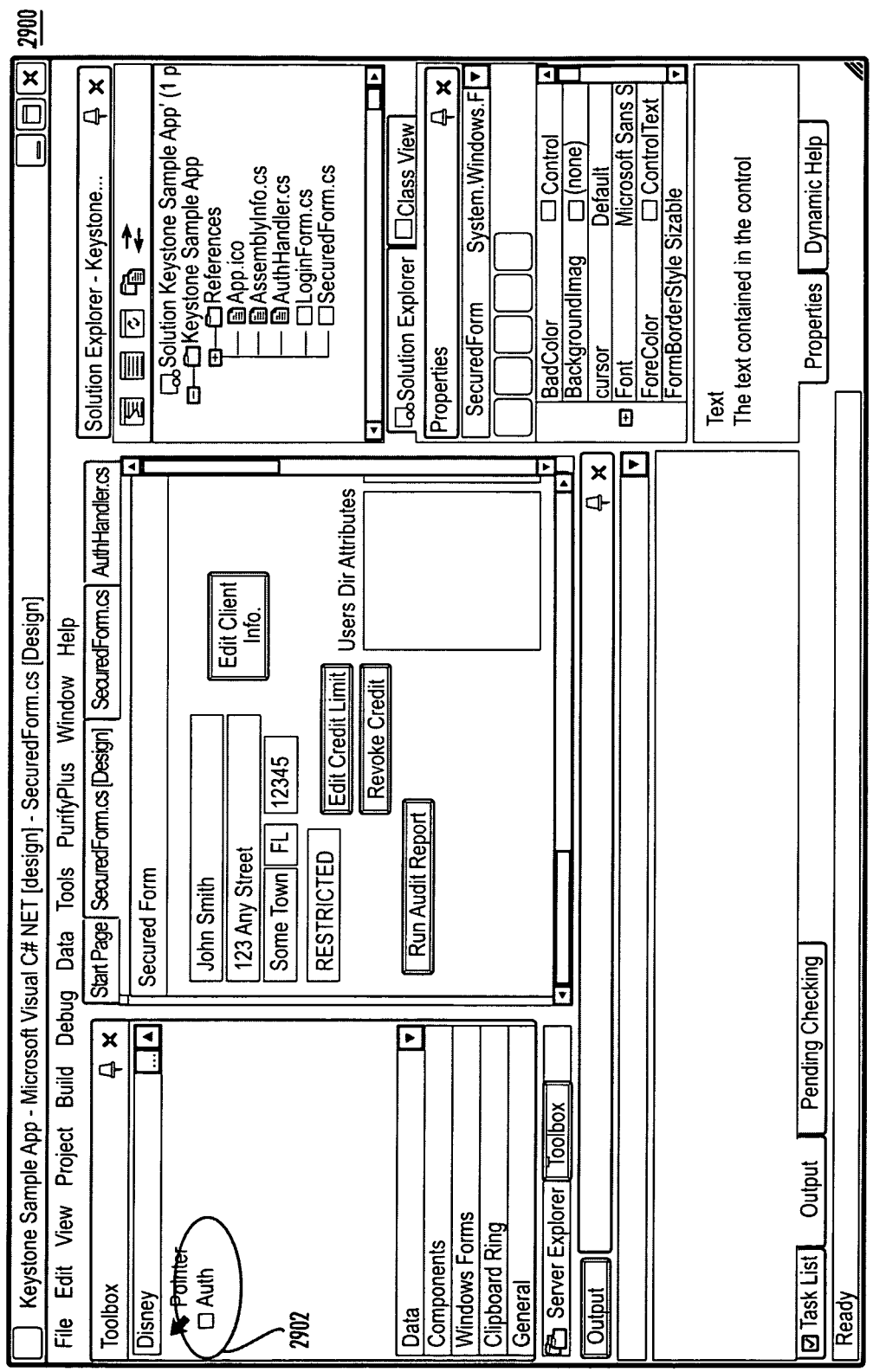
FIG. 22 is a GUI screen shot illustrating an authorization component according to an embodiment.
Figure 23:
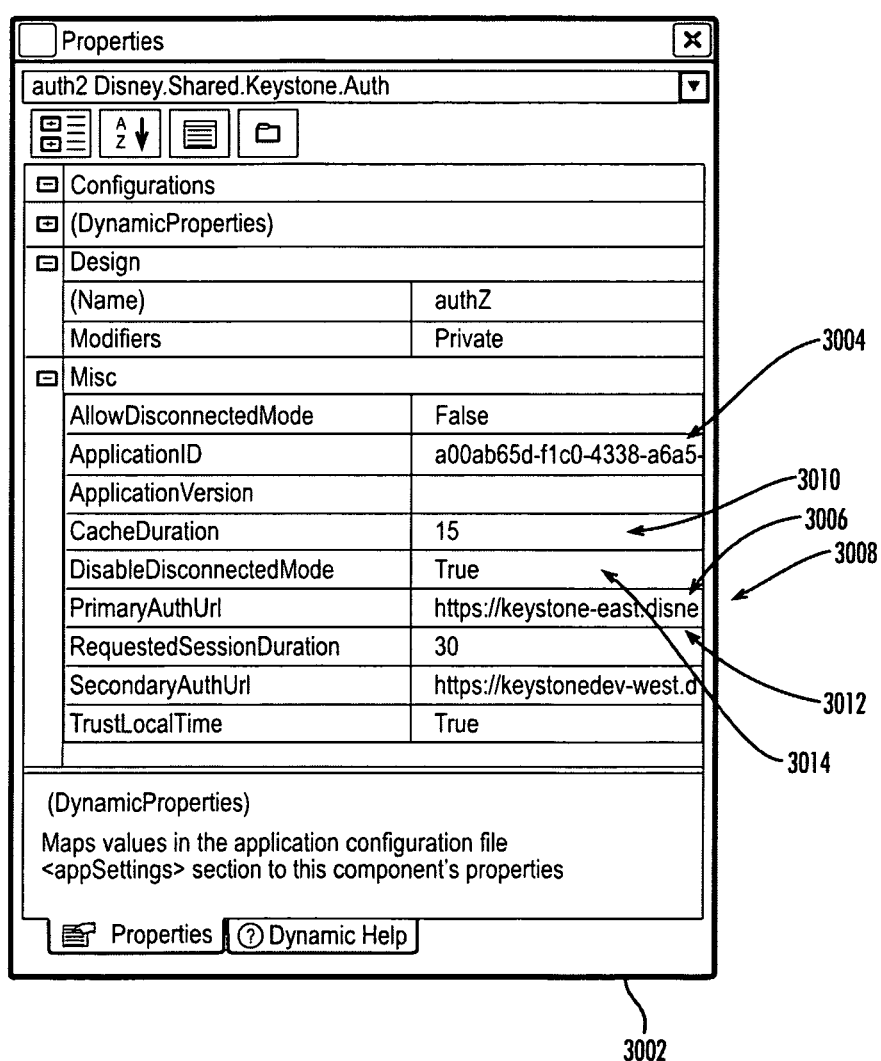
FIG. 23 is a GUI screen shot illustrating properties of a component.

FIG. 22 is a GUI screen shot illustrating an authorization component according to an embodiment. Selection of button 2902 labeled "Auth" may overlay a box 3002 shown in GUI screen shot 3000 of FIG. 23. An authorized user may then set various global system parameters such as, for example, a duration at line 3010 to cache data (e.g., USID, attributes and/or authorization metadata), for example, at an agent co-located with an application and/or middleware prior to flushing as illustrated above. An authorized user may also set a duration at line 3012 indicating a length of a session following an initial authentication of a user before authentication is required again.

According to an embodiment, an administrator may set one or more conditions on roles defined for an organization and/or enterprise. For example, an administrator may determine times (e.g., days of week and/or time of day) that a role may exist and/or not exist. Similarly, an administrator may determine times that a role may or may not exist for a particular user. However, these are merely examples of how conditions may be placed on roles defined for an organization and/or enterprise associated with an application and claimed subject matter is not limited in these respects.

Figure 24:
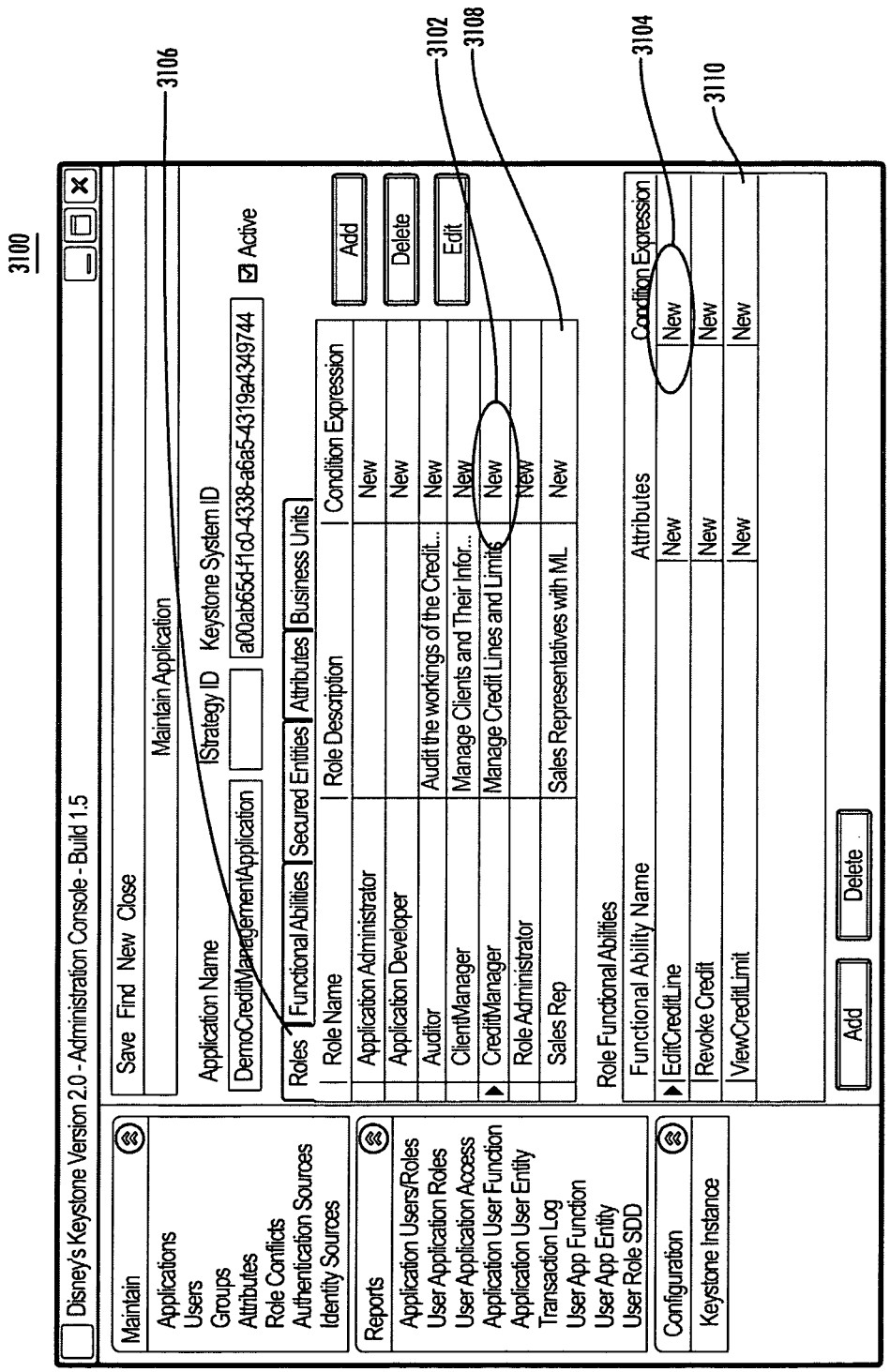
FIG. 24 is a GUI screen shot illustrating setting conditions of a role associated with an application according to an embodiment.

FIG. 24 is a GUI screen shot 3100 illustrating setting conditions of a role defined for an organization and/or enterprise according to an embodiment. While tab 3106 labeled "Roles" is selected, roles associated with the currently selected application are listed in box 3108 and functional abilities of a currently selected role in box 3108 are listed in box 3110. An administrator may place conditions on the existence of a role by selecting a button 3102 corresponding with the role, and then making appropriate entries to a GUI form as illustrated below with reference to FIGS. 26 and/or 27, for example. Similarly, independent of any conditions placed on the existence of a role in general, an administrator may place conditions on the existence of a functional ability associated with a role. Here, for example, to place conditions on a functional ability defined for a role an administrator may select button 3104 corresponding to the functional ability, and then make appropriate entries to a GUI form as illustrated below with reference to FIGS. 26 and/or 27, for example.

Figure 25:
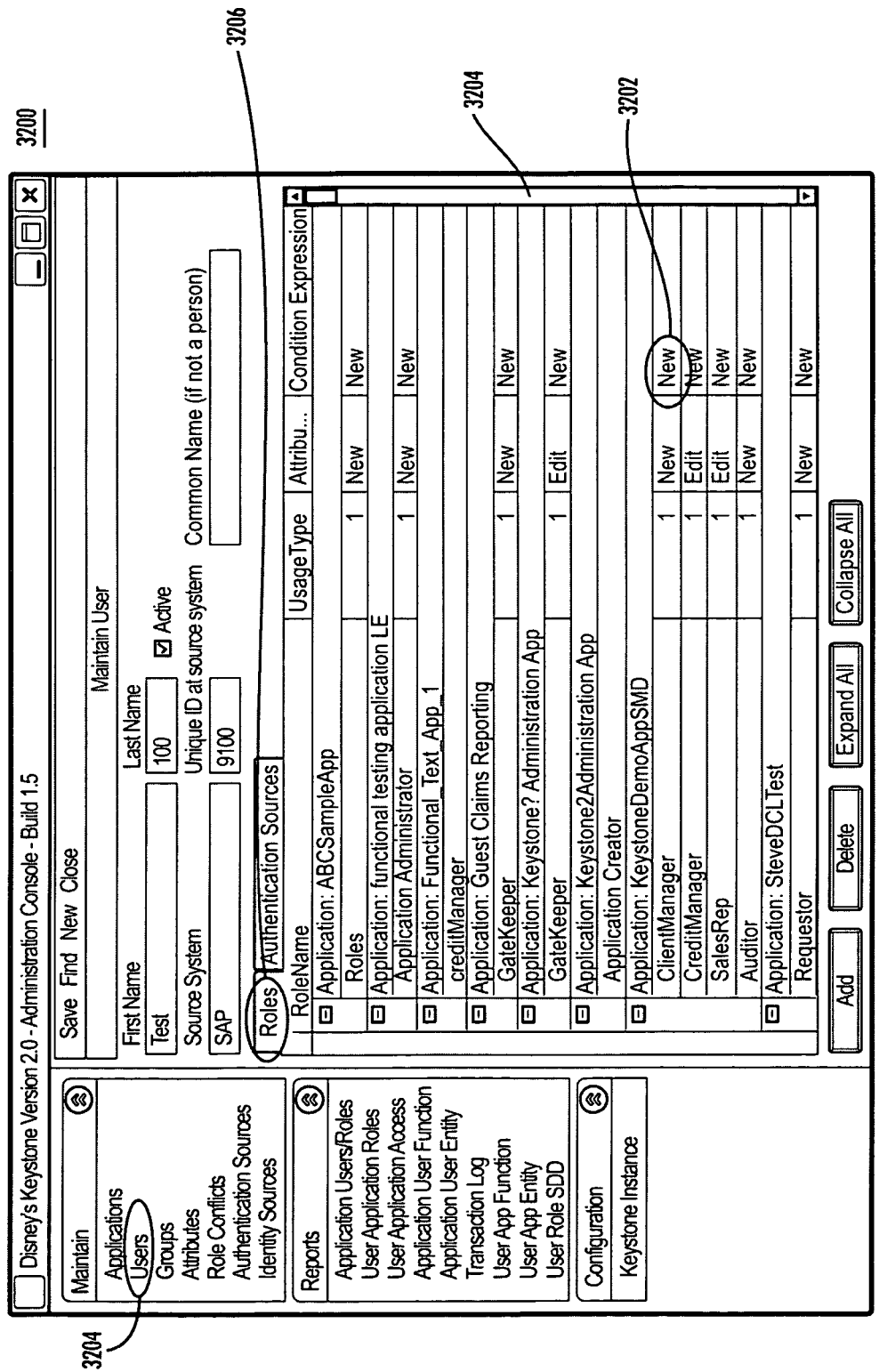
FIG. 25 is a GUI screen shot illustrating setting conditions of a role associated with an application for a particular user according to an embodiment.

According to an embodiment, an administrator may be capable of placing conditions on the assignment of an application role to particular users. FIG. 25 is a GUI screen shot 3200 illustrating setting conditions of a role associated with an application for a particular user according to an embodiment. Upon selection of button 3204 labeled "Users," selecting a particular user as illustrated with reference to FIG. 19 and selecting tab 3206 labeled "Roles," roles assigned to the currently selected user may be listed in box 3204. Here, for example, to place conditions on the assignment of a role to a user an administrator may select button 3202 corresponding to the assigned role, and then make appropriate entries to a GUI form as illustrated below with reference to FIGS. 26 and/or 27, for example.

Figure 26:
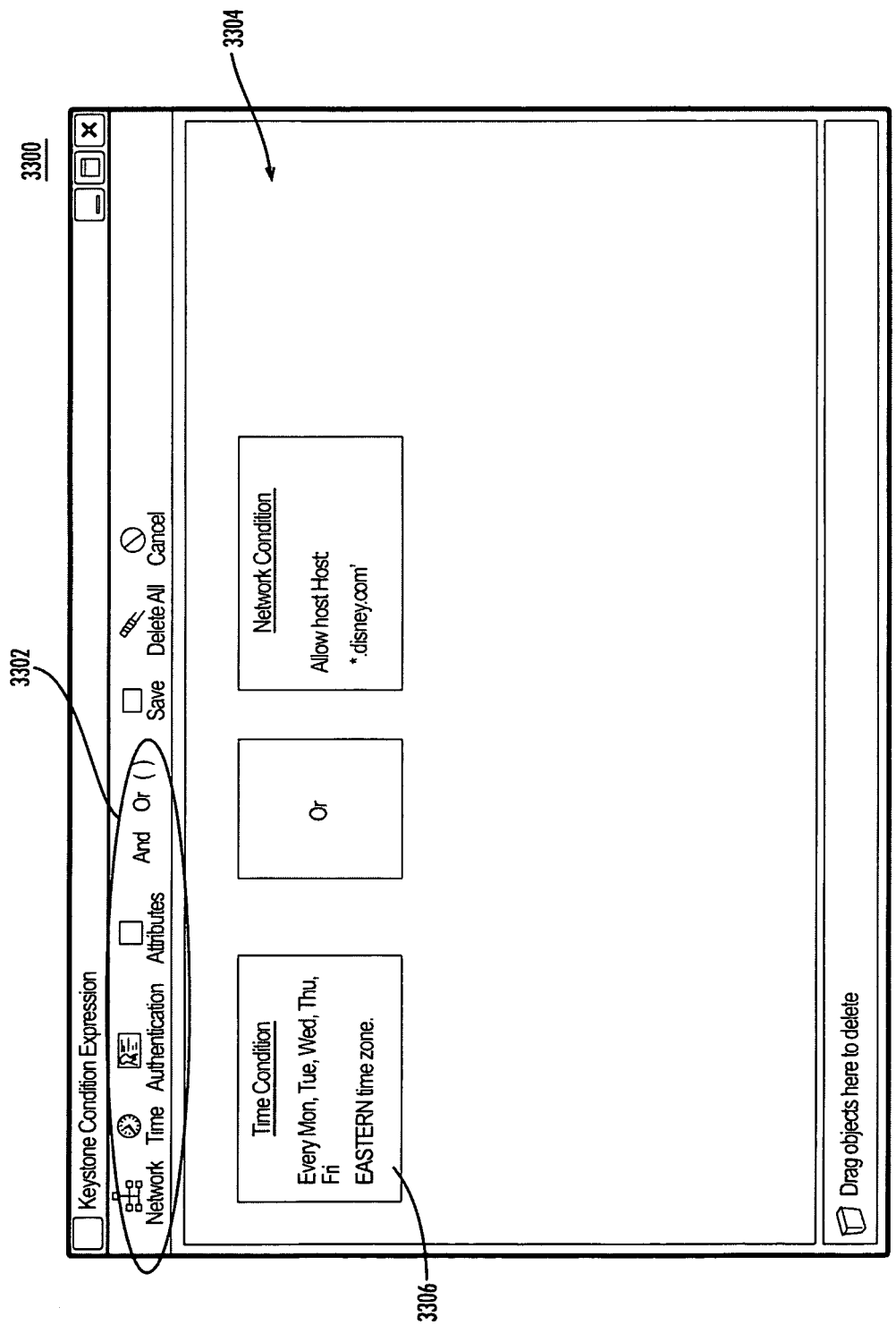
FIGS. 26 and 27 are GUI screen shots illustrating a creation of a condition associated with authorization metadata according to an embodiment.
Figure 27:
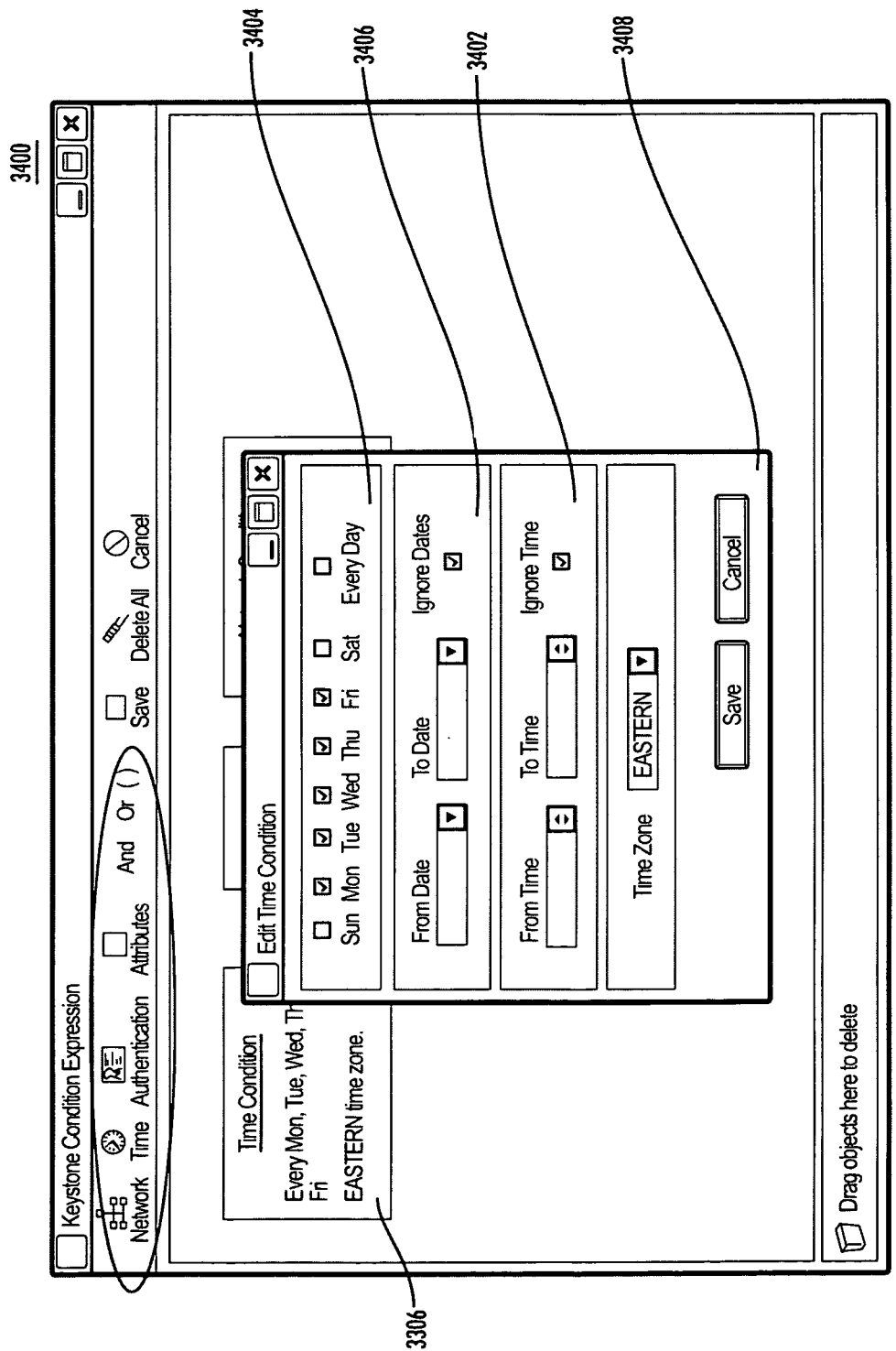

FIG. 26 is a GUI screen shot 3300 comprising a form to receive inputs to place conditions on roles defined for an application according to an embodiment. In a particular embodiment, although claimed subject matter is not limited in this respect, GUI screen shot 3300 may be provided in response to selection of button 3102, 3104 and/or 3202. Here, tool bar 3302 permits the selection of Boolean operators including AND, OR and grouping symbol pair "( )" to provide a "true" or "false" indications defining conditions in box 3304 as to whether a selected role or functional ability exists. Selection of time condition box 3306 may overlay box 3408 as shown in GUI screen shot 3400 of FIG. 27 to receive entries for specifying time conditions. Here, days of the week may be selected and/or unselected at box 3404. Particular times of day may be selected through drop-down menus in lock 3402 and particular dates may be selected at box 3406. It should be understood, however, that these are merely examples of how an administrator may conditionally set a role and/or functional ability based, at least in part, on time conditions and claimed subject matter is not limited in these respects.

As illustrated above with reference to FIG. 1C, according to a particular embodiment, authorization for access to an application may be based, at least in part, on attributes associated with a user. As illustrated above according to a particular embodiment, user attributes may be provided with an authentication assertion from an authentication source and then forwarded to an authentication server for authentication. FIGS. 28 through 31 illustrate, according to a particular embodiment, how an administrator may define conditions and/or rules in an authorization database (e.g., authorization database 30, 170 and/or 220) to determine authorization metadata in response to an authorization request.

Figure 28:
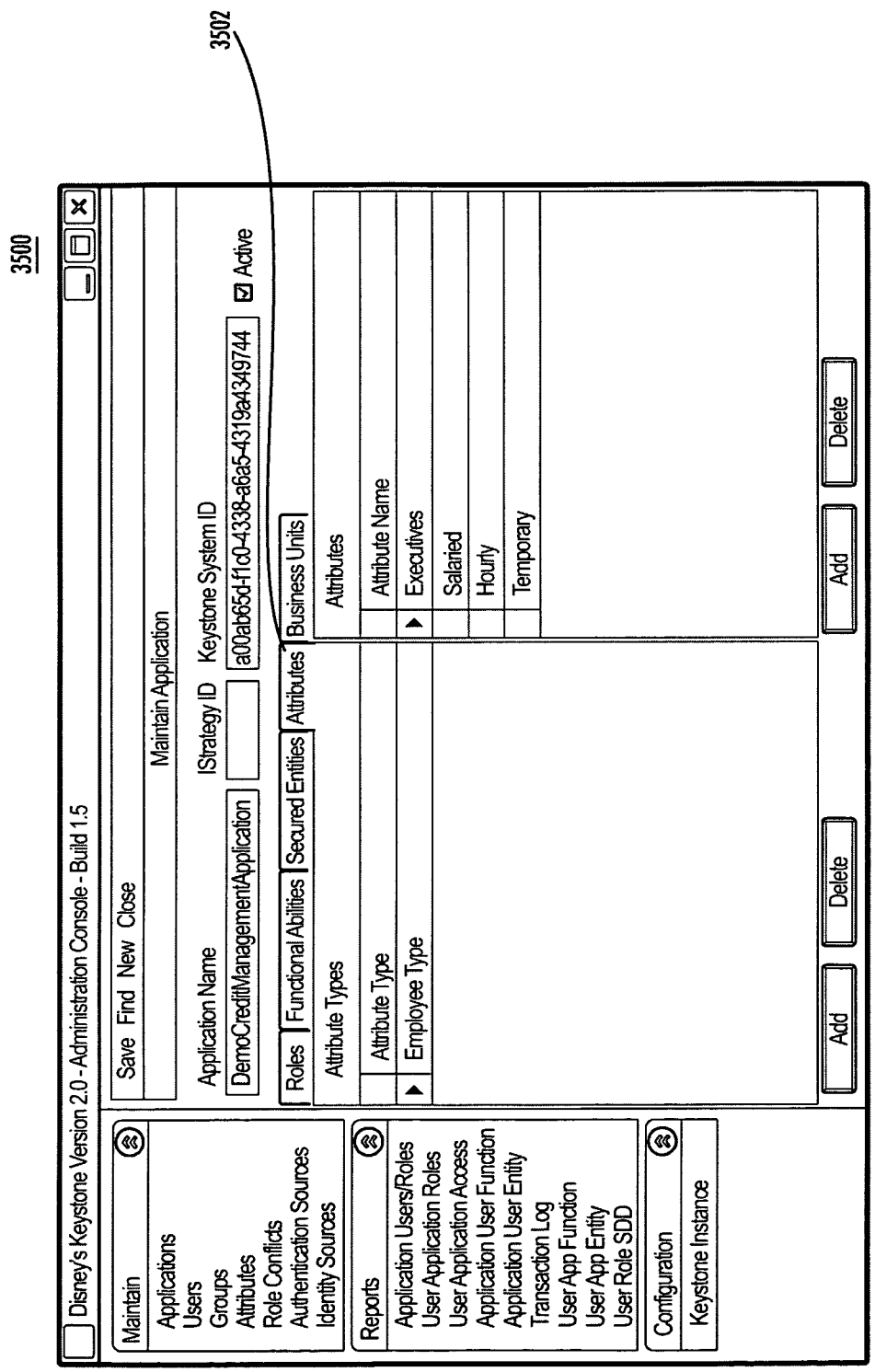
FIGS. 28 and 29 are GUI screen shots illustrating an association of attributes with users according to an embodiment.

FIG. 28 is a GUI screen shot 3500 with tab 3502 labeled "Attributes" selected illustrating definition of an "Employee Type" attribute as "Executive," "Salaried," "Hourly" and "Temporary." Here, a role and/or functional ability assigned to a user may be based, at least in part, on which of these attributes is associated with the user.

Figure 29:
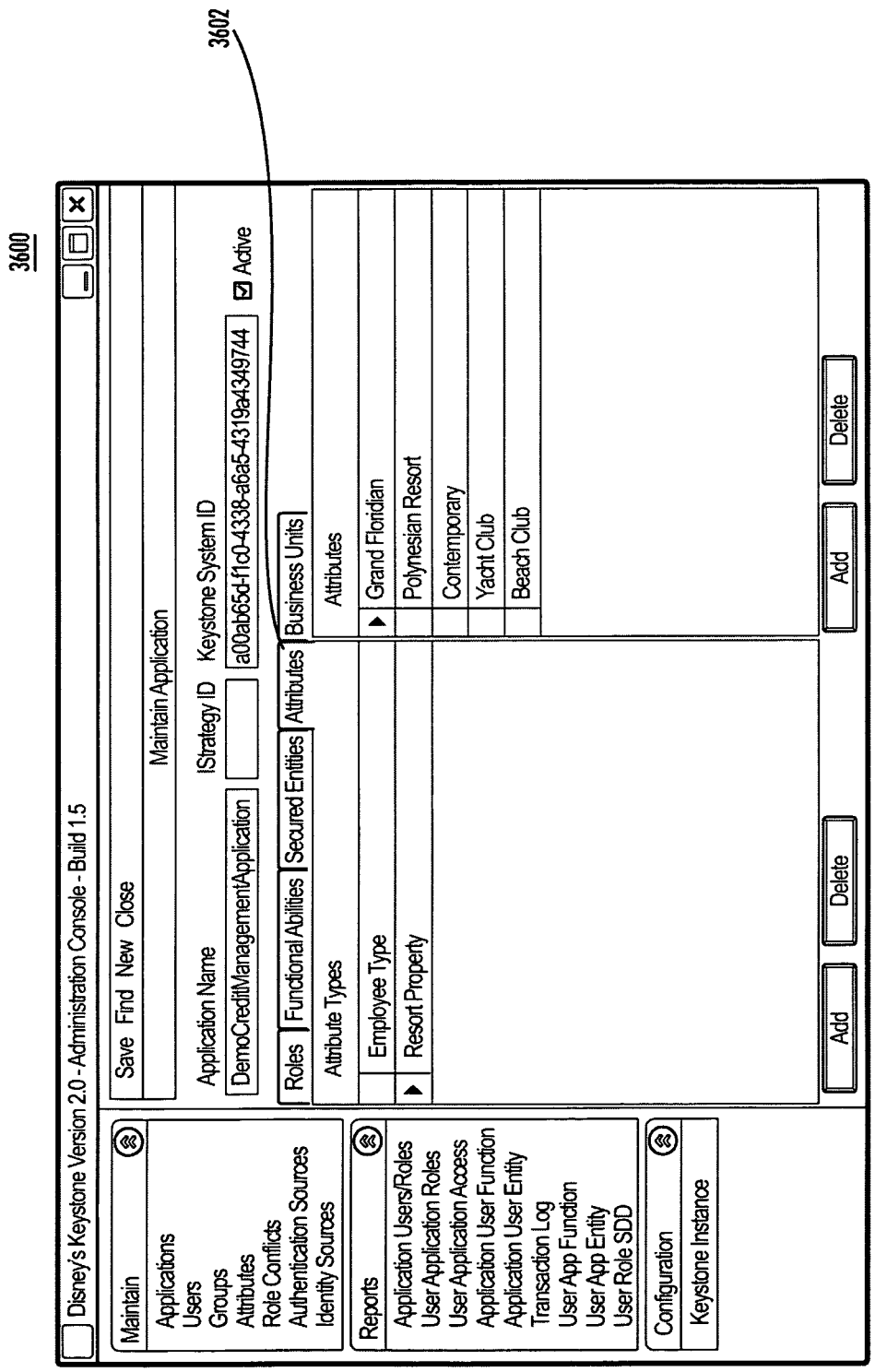
Figure 31:
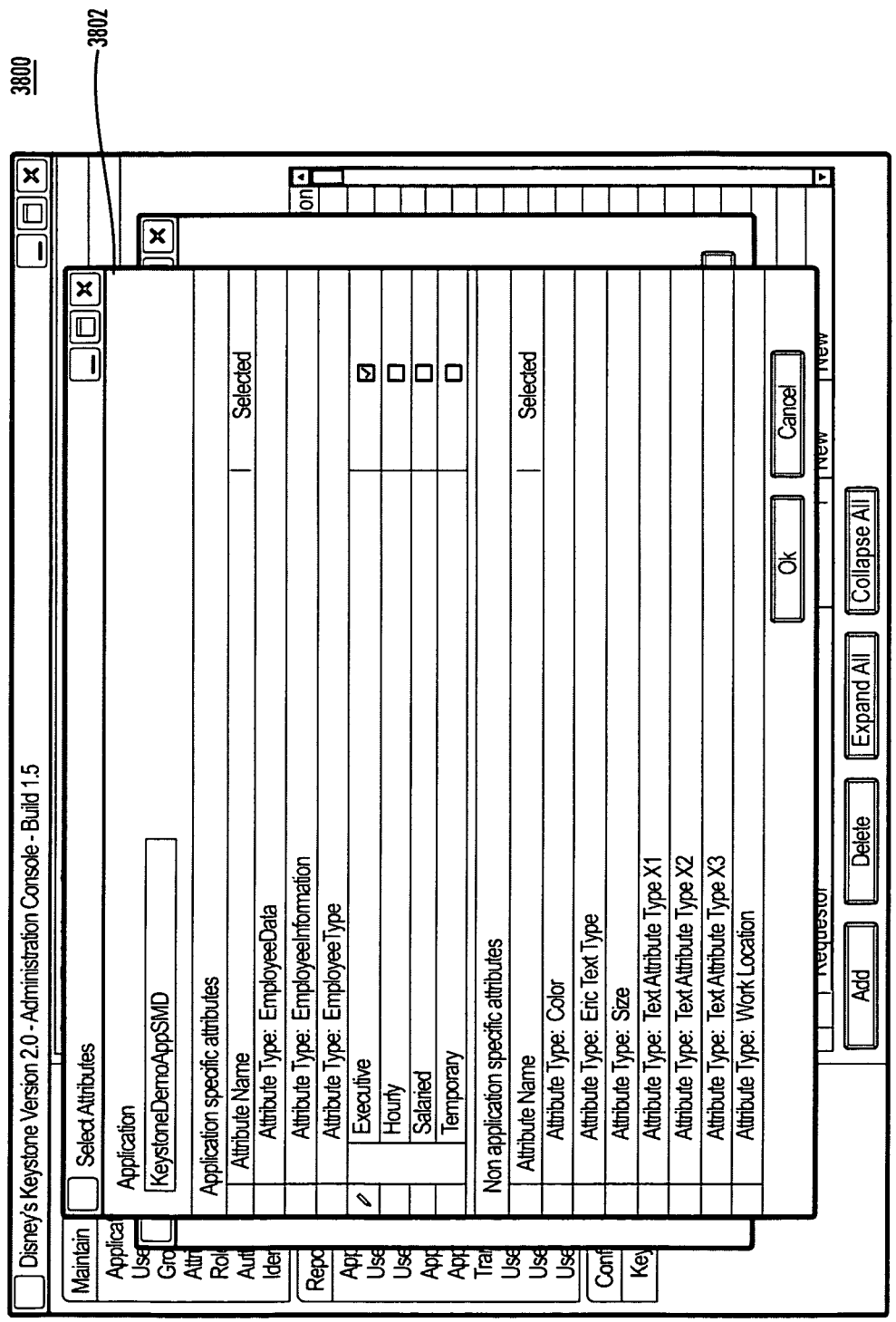

Similarly, FIG. 29 is a GUI screen shot 3600 illustrating definition of a "Resort Property" attribute as "Grand Floridian," "Polynesian Resort," "Contemporary," "Yacht Club" and "Beach Club." In this particular embodiment, these attributes may be associated with where a user is geographically located on an enterprise network when attempting to access the currently selected application. Here, a role and/or functional ability assigned to a user may be based, at least in part, on where the user is geographically located on an enterprise network (e.g., at either Grand Floridian, Polynesian Resort, Contemporary, Yacht Club or Beach Club geographic locations) when attempting to access the currently selected application.

Figure 30:
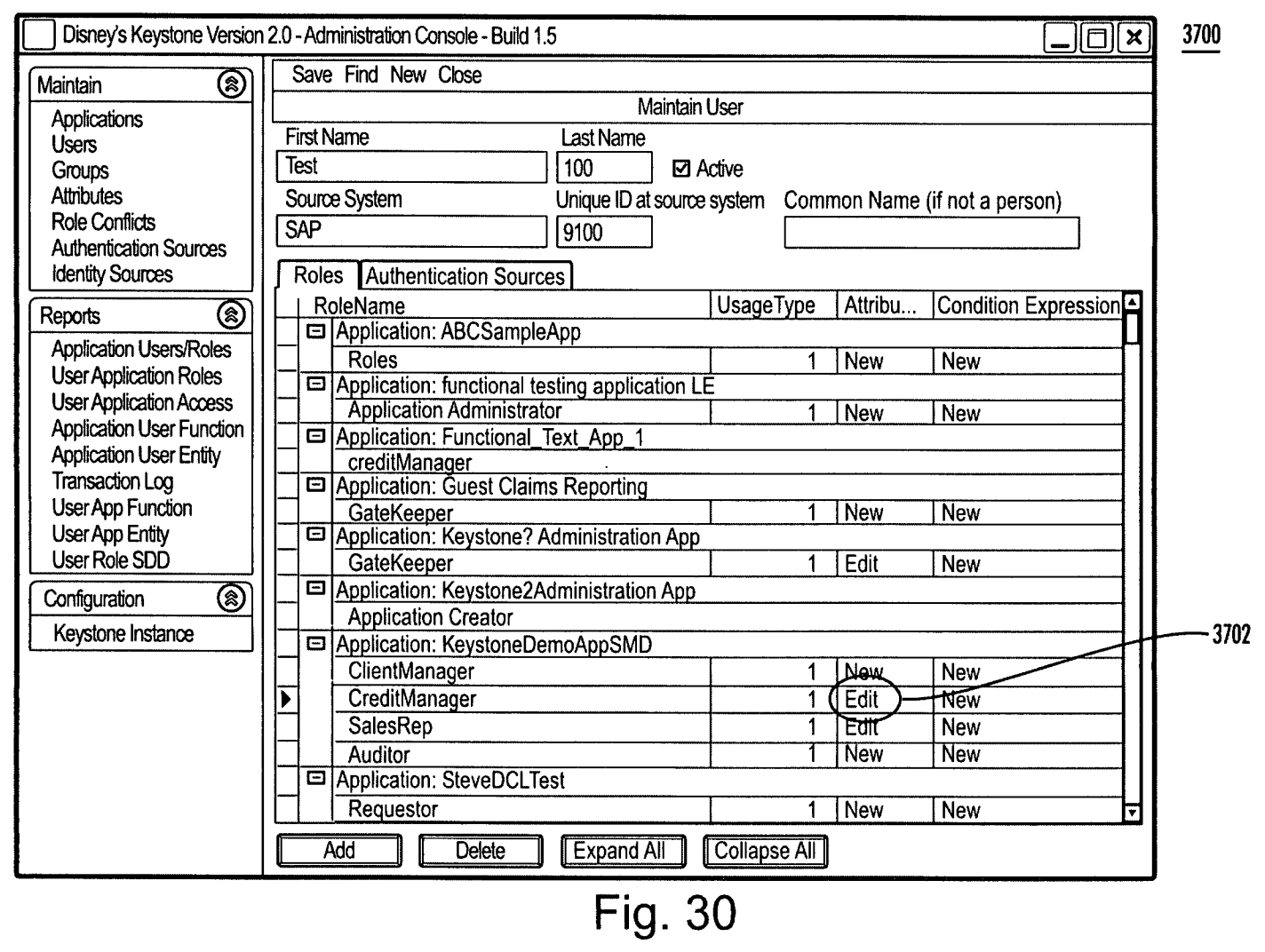

FIG. 30 is a GUI screen shot 3700 illustrating an assignment of attributes to a user in connection with an application role according to an embodiment. GUI screen shot 3700 may be provided as illustrated above with reference to FIGS. 18 and 19. For the currently selected user, an administrator may assign an attribute in connection with a role defined for an application by selecting button 3702 corresponding with the role. This selection of button 3702 may overlay box 3802 as shown in GUI screen shot 3800 of FIG. 31. In the particular illustrated embodiment, an administrator may assign attributes to the currently selected user which are specific to the application and/or role, or assign attributes that are not specific to an application. Here, the currently selected user is assigned an application and/or role specific "Employee Type" attribute "Executive." Accordingly, in response to a request from the currently selected user for authorization to access the currently selected application, an authorization service may base any such authorization, at least in part, on the Executive attribute assigned to the user.

Figure 32:
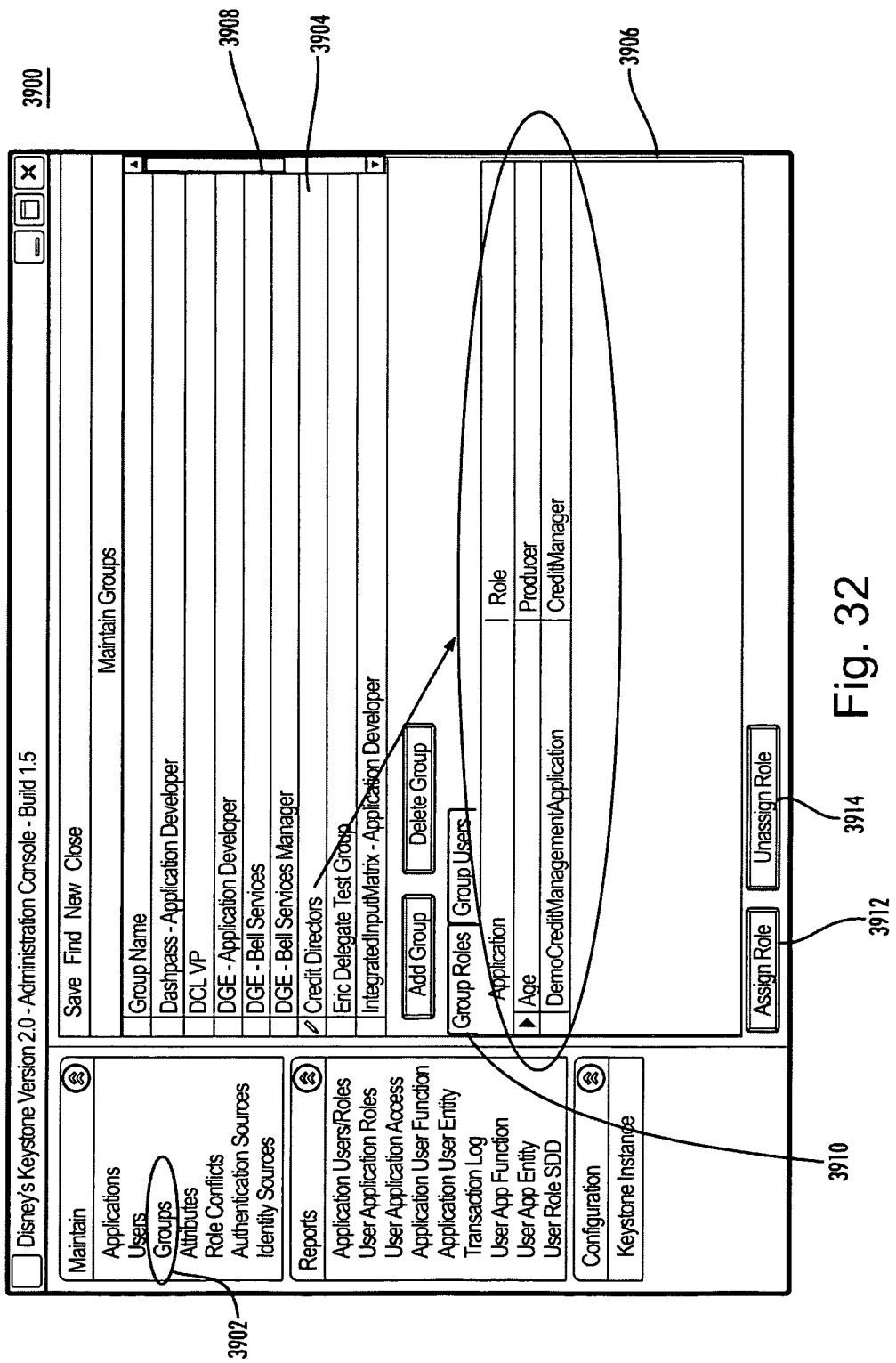
FIG. 32 is a GUI screen shot illustrating an association of groups of users with roles according to an embodiment.
Figure 33:
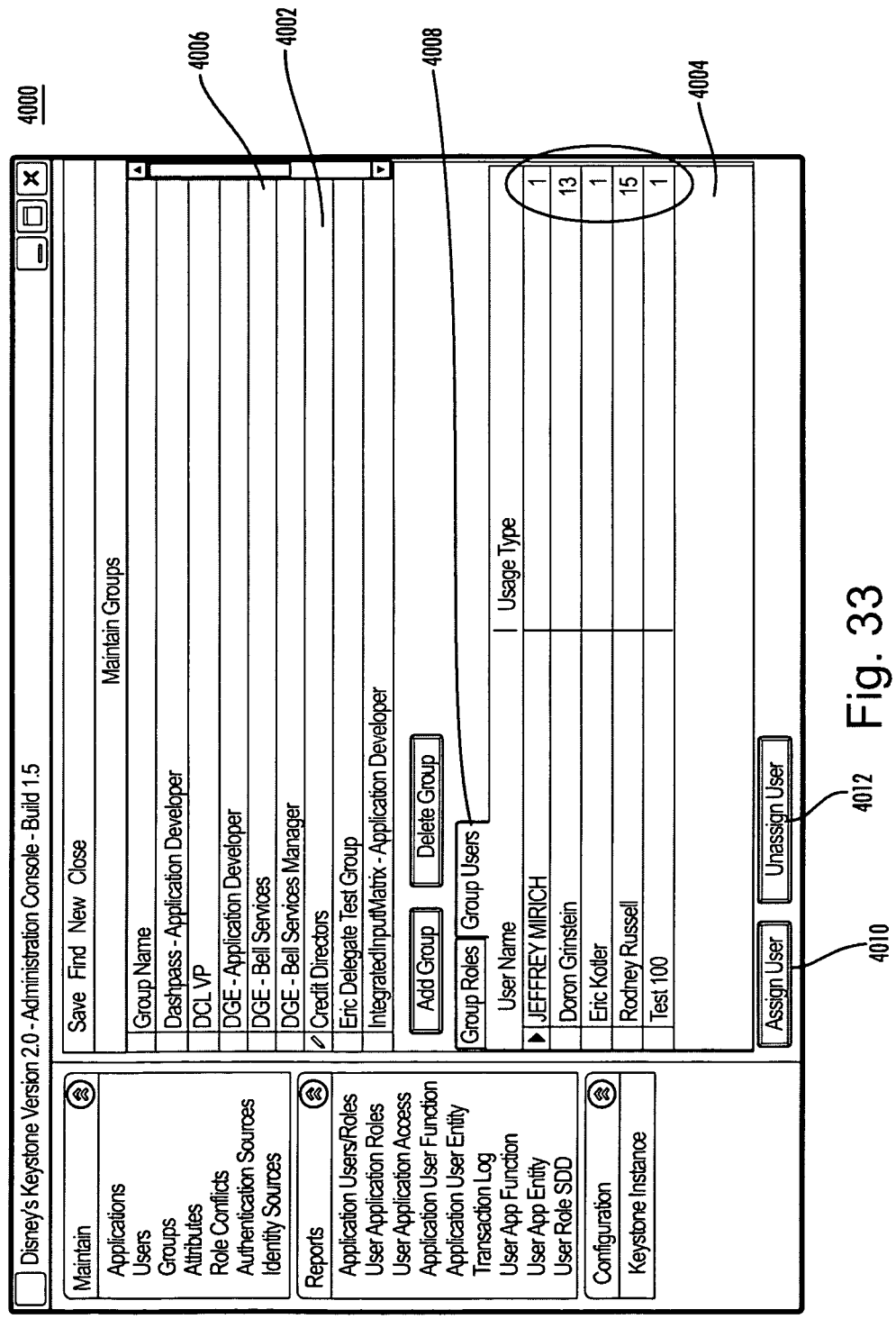
FIG. 33 is a GUI screen shot illustrating an addition of one or more users to a group according to an embodiment.
Figure 34:
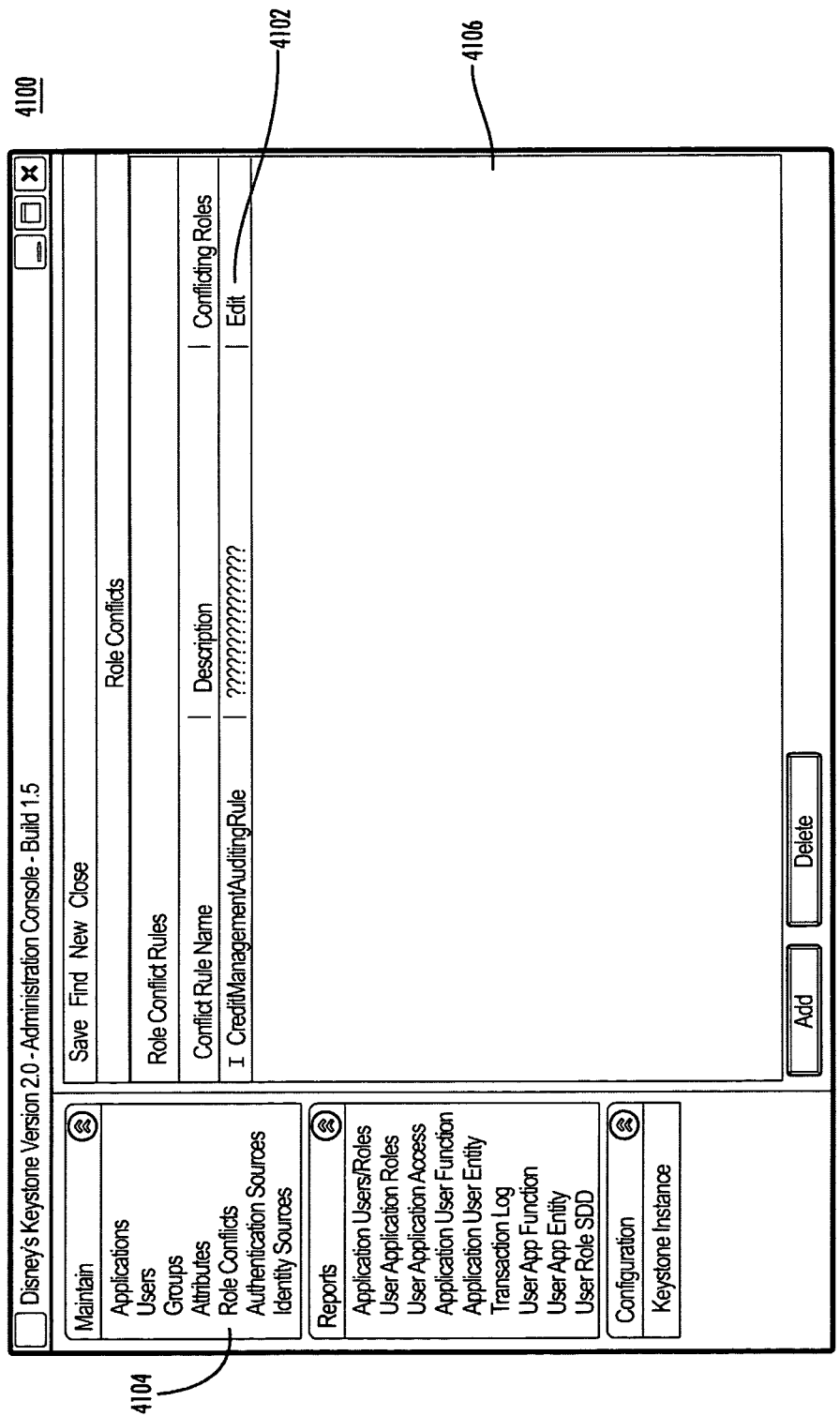
FIGS. 34 and 35 are GUI screen shots illustrating an establishment of role conflicts according to an embodiment.
Figure 35:
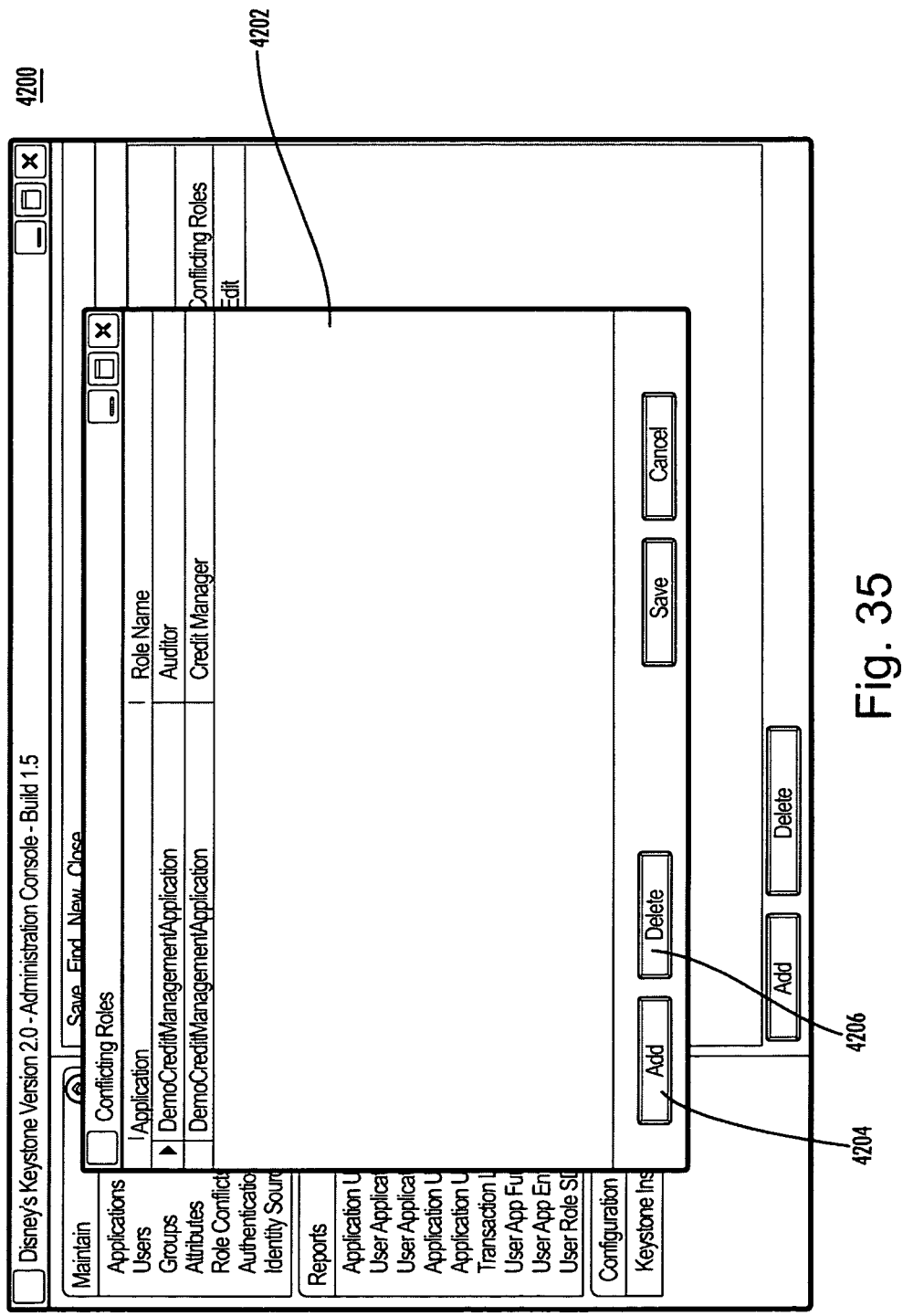

According to an embodiment, an administrator may define one or more "groups" of users, and assign one or more roles to such a group in an authorization database. Here, for example, by assigning a role to a group of users, an administrator may assign the role to individual user members of the group. FIG. 32 is a GUI screen shot 3900 that may be provided by selecting button 3902 labeled "Groups," illustrating an association of groups of users with roles according to an embodiment. Box 3908 may provide a list of groups that are defined in an authorization database. With tab 3910 labeled "Group Roles" selected, roles of a selected group 3904 are shown in box 3906. Roles may be assigned or unassigned to a group using buttons 3912 and 3914 labeled "Assign Role" and "Unassign Role." As shown in GUI screen shot 4000 of FIG. 33, with tab 4008 labeled "Group Users" selected, box 4004 lists users that are members of a selected group 4002. Here, users may be assigned and/or unassigned by selecting and/or unselecting buttons 4010 and 4012 labeled "Assign User" and "Unassign User."

According to an embodiment, an administrator may define conflicting roles in an authorization database. By defining two roles that conflict, for example, a user may be permitted to assume both roles. Selection of button 4104 labeled "Roles Conflicts" may provide GUI screen shot 4100 shown in FIG. 34 with box 4106 listing defined conflict rules. A listed conflict rule may be modified by selection of a corresponding button 4102 labeled "Edit" to overlay box 4202 shown in GUI screen shot 4200 of FIG. 35. Here, roles may be added or deleted to a list of conflicting roles of the selected conflict rule by appropriate selection of buttons 4204 and 4206 labeled "Add" and "Delete."

Figure 36:
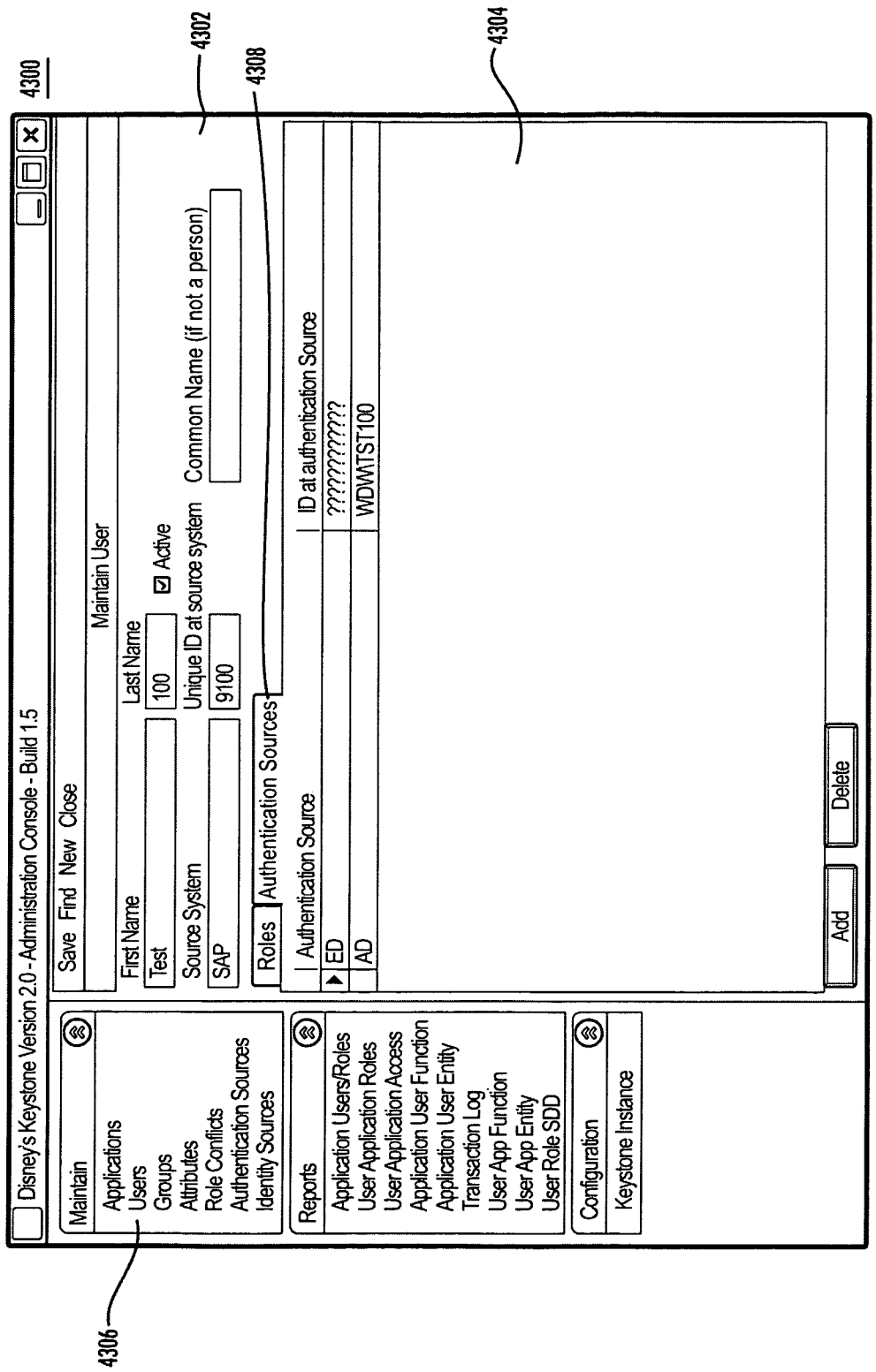
FIG. 36 is a GUI screen shot illustrating a selection of one or more authentication sources for a user according to an embodiment.

According to an embodiment, an administrator may determine a manner and/or sources that may be used for authenticating a user. FIG. 36 is a GUI screen shot 4300 which may be provided in response to selecting button 4306 labeled "Users," selecting tab 4308 labeled "Authentication Sources" and selecting a user in box 4302. Box 4304 lists authentication sources that may be used for authentication of the selected user. However, this is merely an example of how an authentication source may be selected for authenticating a user and claimed subject matter is not limited in this respect.

In an alternative embodiment, although claimed subject matter is not limited in these respects, authentication sources for used for authenticating a user may conditionally defined. Here, for example, an authentication source may be selected based, at least in part, on a time of day, day of the week, and/or location of user on an enterprise network.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
    connecting a computing platform to a network;
    communicating with said network via said computing platform to authenticate one or more users attempting to access at least a portion of an application and/or authorize said one or more users to access said at least a portion of said application;
    receiving authorization metadata from said network responsive to authentication and/or authorization of said one or more users;
    receiving security metadata from said network responsive to the attempt to access the portion of the application, the portion of the application being controlled by a security policy;
    locally storing said received authorization metadata at said computing platform to enable said one or more users to access said at least a portion of said application through said computing platform following a disconnection of said computing platform from said network; and
    modifying the authorization metadata according to the security metadata without modifying source code of the application.

2. The method of claim 1, wherein said at least a portion of said application comprises one or more secured entities.

3. The method of claim 2, wherein said authorization metadata is associated with said one or more secured entities and said one or more users.

4. The method of claim 3, wherein said authorization metadata associates said one or more secured entities with one or more functional abilities.

5. The method of claim 4, wherein said authorization metadata associates said one or more functional abilities with one or more roles associated with said one or more users.

6. The method of claim 1, and further comprising:
    communicating with a Web service to obtain said authorization metadata, said authorization metadata being indicative of authorization of said one or more users to access said at least a portion of said application.

7. The method of claim 1, and further comprising:
    affecting run-time behavior of said application following said disconnection from said network based, at least in part, on said stored authorization metadata.

8. An apparatus comprising:
    a computing platform comprising a communication adapter for communicating with a network, said computing platform being adapted to:
    host one or more applications;
    communicate with said network through said communication adapter to authenticate and/or authorize one or more users attempting to access at least a portion of at least one of said applications, and/or authorize said one or more users to access said at least a portion of said at least one of said applications, and to receive authorization metadata responsive to authentication and/or authorization of said one or more users;
    receive security metadata from said network responsive to the attempt to access the portion of the application, the portion of the application being controlled by a security policy;
    locally store said received authorization metadata at said computing platform to enable said one or more users to access said at least a portion of said at least one of said applications through said computing platform following a disconnection of said computing platform from said network; and
    modify the authorization metadata according to the security metadata without modifying source code of the application.

9. The apparatus of claim 8, wherein said at least a portion of said at least one of said applications comprises one or more secured entities.

10. The apparatus of claim 9, wherein said authorization metadata is associated with said one or more secured entities and said one or more users.

11. The apparatus of claim 10, wherein said authorization metadata associates said one or more secured entities with one or more functional abilities.

12. The apparatus of claim 11, wherein said authorization metadata associates said one or more functional abilities with one or more roles associated with said one or more users.

13. The apparatus of claim 8, wherein said computing platform is further adapted to:
    communicate with a Web service to obtain said authorization metadata, said authorization metadata being indicative of authorization of said one or more users to access said at least a portion of said at least one of said applications.

14. The apparatus of claim 8, wherein said computing platform is further adapted to:
    affect run-time behavior of said at least one application following said disconnection from said network based, at least in part, on said stored authorization metadata.

15. An apparatus comprising:
    means for connecting a computing platform to a network;
    means for communicating with said network via said computing platform to authenticate one or more users attempting to access at least a portion of an application, and/or authorize said one or more users to access said at least a portion of said application;
    means for receiving authorization metadata from said network responsive to authentication and/or authorization of said one or more users;
    means for receiving security metadata from said network responsive to the attempt to access the portion of the application, the portion of the application being controlled by a security policy;
    means for locally storing said received authorization metadata to enable said one or more users to access said at least a portion of said application through said computing platform following a disconnection of said computing platform from said network; and
    means for modifying the authorization metadata according to the security metadata without modifying source code of the application.

16. The apparatus of claim 15, wherein said at least a portion of said application comprises one or more secured entities.

17. The apparatus of claim 16, wherein said authorization metadata is associated with said one or more secured entities and said one or more users.

18. An article comprising:
a storage device comprising machine-readable instructions stored thereon which are executable by a computing platform to:
communicate with a network to authenticate one or more users attempting to access at least a portion of at least one of one or more applications hosted on said computing platform, and/or authorize said one or more users to access said at least a portion of said at least one of said applications;
receive security metadata from said network responsive to the attempt to access the portion of the application, the portion of the application being controlled by a security policy;
locally store authorization metadata received responsive to authentication and/or authorization of said one or more users at said computing platform to enable said one or more users to access said at least a portion of said at least one of said applications through said computing platform following a disconnection of said computing platform from said network; and
modify the authorization metadata according to the security metadata without modifying source code of the application.

19. The article of claim 18, wherein said at least a portion of said at least one of said applications comprises one or more secured entities.

20. The article of claim 19, wherein said storage medium further comprises machine-readable instructions stored thereon to enable said access based, at least in part, on said stored authorization metadata, said authorization metadata being associated with said one or more secured entities and said one or more users.

21. The article of claim 20, wherein said authorization metadata associates said one or more secured entities with one or more functional abilities.

22. The article of claim 21, wherein said authorization metadata associates said one or more functional abilities with one or more roles associated with said one or more users.

23. The article of claim 18, wherein said storage medium further comprises machine-readable instructions stored thereon to:
communicate with a Web service to obtain said authorization metadata, said authorization metadata being indicative of authorization of said one or more users to access said at least a portion of said at least one of said applications.

24. The article of claim 18, wherein said storage medium further comprises machine-readable instructions stored thereon to affect run-time behavior of said at least one of said applications following said disconnection from said network based, at least in part, on said stored authorization metadata.

25. A method comprising:
obtaining security metadata through a Web service in response to an attempt by a user to access at least a portion of one or more applications hosted on a computing platform; and
locally storing said obtained security metadata on said computing platform for use in response to subsequent attempts to access said at least a portion of said one or more applications through said computing platform; and
modifying authorization metadata according to the security metadata without modifying source code of the application, the authorization metadata being received from said Web service in response to authentication and/or authorization of said one or more users.

26. The method of claim 25, wherein said security metadata comprises at least authorization metadata.

27. The method of claim 25, and further comprising:
obtaining a USID associated with said user attempting to access at least a portion of a first application in response to an authentication procedure; and
storing said USID on a computing platform hosting said first application.

28. The method of claim 27, wherein said first application substantially comprises a Web application and said storing said USID comprises storing said USID in a cookie accessible for use in accessing at least a portion of a second application by said user.

29. The method of claim 28, wherein said cookie comprises a persistent cookie.

30. The method of claim 27, wherein said first application comprises a rich-client application and wherein said storing said USID comprises storing said USID as a command line parameter accessible for use in accessing at least a portion of a second application by said user.

31. The method of claim 25, and further comprising accessing said locally stored security metadata in response to an attempt to access at least a portion of an application.

32. The method of claim 25, and further comprising receiving said security metadata from said Web service according to one more of a SOAP, XML and/or HTTP protocols.

33. The method of claim 25, and further comprising affecting runtime behavior of said one or more applications on said computing platform based, at least in part, on said locally stored security metadata.

34. The method of claim 25, wherein said at least a portion of said one or more applications comprises a secured entity associated with at least one of said one or more applications.

35. The method of claim 34, wherein said security metadata comprises information representing a role associated with said user and said one or more applications, said role being associated with one or more functional abilities associated with said secured entity.

36. An apparatus comprising:
means for obtaining security metadata through a Web service in response to an attempt by a user to access at least a portion of one or more applications hosted on a computing platform; and
means for locally storing said obtained security metadata on said computing platform for use in response to subsequent attempts to access said at least a portion of said one or more applications through said computing platform; and
means for modifying authorization metadata according to the security metadata without modifying source code of the application, the authorization metadata being received from said Web service in response to authentication and/or authorization of said one or more users.

37. The apparatus of claim 36, wherein said security metadata comprises at least authorization metadata.

38. The apparatus of claim 36, and further comprising:
means for obtaining a USID associated with said user attempting to access at least a portion of a first application in response to an authentication procedure; and
means for storing said USID on a computing platform hosting said first application.

39. The apparatus of claim 38, wherein said first application substantially comprises a Web application and said means for storing said USID comprises means for storing said USID in a cookie accessible for use in accessing at least a portion of a second application by said user.

40. The apparatus of claim 39, wherein said cookie comprises a persistent cookie.

41. The apparatus of claim 38, wherein said first application comprises a rich-client application and wherein said means for storing said USID comprises means for storing said USID as a command line parameter accessible for use in accessing at least a portion of a second application by said user.

42. The apparatus of claim 36, and further comprising means for accessing said locally stored security metadata in response to an attempt to access at least a portion of an application.

43. The apparatus of claim 36, and further comprising receiving said security metadata from said Web service according to one more of a SOAP, XML and/or HTTP protocols.

44. The apparatus of claim 36, and further comprising affecting runtime behavior of said one or more applications on said computing platform based, at least in part, on said stored security metadata.

45. The apparatus of claim 36, wherein said at least a portion of said one or more applications comprises a secured entity associated with at least one or said one or more of said applications.

46. The apparatus of claim 45, wherein said security metadata comprises information representing a role associated with said user and said one or more applications, said role being associated with one or more functional abilities associated with said secured entity.

47. A computing platform comprising:
one or more processors;
a storage medium accessible by said one or more processors and storing instructions executable by said one or more processors to provide:
a software component capable of accessing security metadata through a Web service in response to an attempt to access at least a portion of one or more applications; and
an agent of said Web service to locally store said security metadata for use in response to subsequent attempts to access said at least a portion of said one or more applications through said computing platform and modify authorization metadata according to the security metadata without modifying source code of the application, the authorization metadata being received from said Web service in response to authentication and/or authorization of said one or more users.

48. The computing platform of claim 47, wherein said security metadata comprises at least authorization metadata.

49. The computing platform of claim 47, wherein said software component is capable of obtaining a USID associated with a user attempting to access at least a portion of a first application in response to an authentication procedure and wherein said agent locally stores said USID.

50. The computing platform of claim 49, wherein said first application comprises a Web application and said agent stores said USID in a cookie accessible for use in accessing at least a portion of a second application by said user.

51. The computing platform of claim 50, wherein said cookie comprises a persistent cookie.

52. The computing platform of claim 49, wherein said first application comprises a rich-client application and wherein said agent stores said USID as a command line parameter accessible for use in accessing at least a portion of a second application by said user.

53. The computing platform of claim 47, wherein said software component is capable of accessing said security metadata in response to an attempt to access at least a portion of at least one of said one or more applications.

54. The computing platform of claim 47, wherein said computing platform is further adapted to receive said security metadata from said Web service according to one more of a SOAP, XML and/or HTTP protocols.

55. The computing platform of claim 47, wherein said computing platform is further adapted to affect runtime behavior of said one or more applications based, at least in part, on said locally stored security metadata.

56. The computing platform of claim 47, wherein said at least a portion of said one or more applications comprises a secured entity.

57. The computing platform of claim 56, wherein said security metadata comprises information representing a role associated with said user and said one or more applications, said role being associated with one or more functional abilities associated with said secured entity.

58. An article comprising:
a storage device comprising machine-readable instructions executable by a processor to:
obtain security metadata through a Web service in response to an attempt by a user to access at least a portion of one or more applications hosted on a computing platform;
locally store said obtained security metadata for use in response to subsequent attempts to access said at least a portion of one or more applications through said computing platform; and
modify authorization metadata according to the security metadata without modifying source code of the application, the authorization metadata being received from said Web service in response to authentication and/or authorization of said one or more users.

59. The article of claim 58, wherein said security metadata comprises at least authorization metadata.

60. The article of claim 58, wherein said instructions are further executable by said processor to obtain a USID associated with a user attempting to access at least a portion of a first application in response to an authentication procedure and wherein said agent locally stores said USID.

61. The article of claim 60, wherein said first application substantially comprises a Web application and said agent stores said USID in a cookie accessible for use in accessing at least a portion of a second application by said user.

62. The article of claim 61, wherein said cookie comprises a persistent cookie.

63. The article of claim 60, wherein said first application substantially comprises a rich-client application and wherein said instructions are further executable by said processor to store said USID as a command line parameter accessible for use in accessing at least a portion of a second application by said user.

64. The article of claim 58, wherein said instructions are further executable by said processor to access said security metadata in response to a request for access of at least a portion of at least one of said one or more applications through said computing platform.

65. The article of claim 58, wherein said instructions are further executable by said processor to receive said security metadata from said Web service according to one more of a SOAP, XML and/or HTTP protocols.

66. The article of claim 58, wherein said instructions are further executable by said processor to affect runtime behavior of said one or more applications based, at least in part, on said security metadata.

67. The article of claim 58, wherein said at least a portion of said one or more applications comprises a secured entity.

68. The article of claim 67, wherein said security metadata comprises information representing a role associated with said user and said one or more applications, said role being associated with one or more functional abilities associated with said secured entity.

* * * * *